US008023002B2

(12) United States Patent
Kinoshita et al.

(10) Patent No.: US 8,023,002 B2
(45) Date of Patent: Sep. 20, 2011

(54) IMAGER, IMAGING CIRCUIT, AND IMAGE PROCESSING CIRCUIT

(75) Inventors: Masaya Kinoshita, Kanagawa (JP); Takashi Kameya, Kanagawa (JP)

(73) Assignee: Sony Corporation, Tokyo (JP)

( * ) Notice: Subject to any disclaimer, the term of this patent is extended or adjusted under 35 U.S.C. 154(b) by 481 days.

(21) Appl. No.: 12/303,379

(22) PCT Filed: Feb. 19, 2008

(86) PCT No.: PCT/JP2008/052724
§ 371 (c)(1),
(2), (4) Date: Dec. 4, 2008

(87) PCT Pub. No.: WO2008/139761
PCT Pub. Date: Nov. 20, 2008

(65) Prior Publication Data
US 2009/0244303 A1    Oct. 1, 2009

(30) Foreign Application Priority Data
May 9, 2007   (JP) .................... 2007-124136

(51) Int. Cl.
| H04N 5/235 | (2006.01) |
| H04N 5/232 | (2006.01) |
| H04N 7/01  | (2006.01) |
| H04N 5/16  | (2006.01) |
| H04L 12/50 | (2006.01) |
| H04L 7/212 | (2006.01) |
| H04L 12/28 | (2006.01) |
| G06F 13/12 | (2006.01) |

(52) U.S. Cl. ............... 348/222.1; 348/211.5; 348/207.1; 348/441; 348/676; 370/366; 370/324; 370/395.62; 710/71; 710/65

(58) Field of Classification Search ............... 348/222.1, 348/207.1, 211.3, 211.5, 441, 676; 710/71, 710/1, 65; 370/366, 304, 324, 395.62, 503
See application file for complete search history.

(56) References Cited

U.S. PATENT DOCUMENTS
7,171,106 B2 * 1/2007 Elberbaum ................ 386/202
(Continued)

FOREIGN PATENT DOCUMENTS
JP        2000 224464      8/2000
(Continued)

*Primary Examiner* — Lin Ye
*Assistant Examiner* — Marly Camargo
(74) *Attorney, Agent, or Firm* — Oblon, Spivak, McClelland, Maier & Neustadt, L.L.P.

(57) ABSTRACT

The number of channels is changed in accordance with an operation mode in an image pickup apparatus. An image-pickup control unit 240 determines the number of operation channels W in accordance with an operation mode. A sensor unit 210 outputs an image pickup signal corresponding to each pixel in accordance with the number of operation channels W. A data sending unit 220 performs serial conversion on image pickup signals, and transfers them to the image processing unit 300 using a high-speed interface (a signal line 229) such as an LVDS in accordance with the number of operation channels W. A data receiving unit 311 performs parallel conversion on the transferred serial signal for each of the channels in units of M bits. A data reconstruction unit 500 detects a synchronization code embedded in the parallel signals, extracts data windows, and supplies, to a signal line 319, image pickup signals of bit length n which are reconstructed from the data windows. A clock gating circuit 330 supplies a clock CLK3 to a signal line 337 only during a period in which a valid flag (a signal line 316) indicates validity.

11 Claims, 53 Drawing Sheets

U.S. PATENT DOCUMENTS

| | | |
|---|---|---|
| 7,443,426 B2 * | 10/2008 | Endo .......................... 348/222.1 |
| 7,610,419 B2 * | 10/2009 | Hashimoto et al. ............. 710/71 |
| 7,822,143 B2 * | 10/2010 | Kikuchi ....................... 375/288 |
| 2005/0018064 A1 | 1/2005 | Itoh et al. |
| 2005/0062864 A1 * | 3/2005 | Mabuchi ....................... 348/294 |
| 2006/0013291 A1 | 1/2006 | Hashimoto et al. |

FOREIGN PATENT DOCUMENTS

| | | |
|---|---|---|
| JP | 2004 328671 | 11/2004 |
| JP | 2005 86224 | 3/2005 |
| JP | 2005 244709 | 9/2005 |
| JP | 2005244709 A * | 9/2005 |
| JP | 2006 24972 | 1/2006 |
| JP | 2007 300521 | 11/2007 |

* cited by examiner

| OPERATION MODE | NUMBER OF CHANNELS |
|---|---|
| MODE 1 | L |
| MODE 2 | L-1 |
| MODE 3 | L-2 |
| ⋮ | ⋮ |

HIGH ↑
READOUT BIT RATE
↓ LOW (a)

| | FIRST | SECOND | THIRD | FOURTH | |
|---|---|---|---|---|---|
| 11 | 1 | 0 | 0 | 1 | |
| 10 | 1 | 0 | 0 | F | 1: EVEN NUMBER (FIELD 2) / 0: ODD NUMBER (FIELD 1) |
| 9 | 1 | 0 | 0 | V | 1: VERTICAL BLANKING PERIOD / 0: VALID VIDEO AREA |
| 8 | 1 | 0 | 0 | H | 1: END (EAV) / 0: START (SAV) |
| 7 | 1 | 0 | 0 | P3 | |
| 6 | 1 | 0 | 0 | P2 | PROTECTION BITS |
| 5 | 1 | 0 | 0 | P1 | |
| 4 | 1 | 0 | 0 | P0 | |
| 3 | 1 | 0 | 0 | 0 | |
| 2 | 1 | 0 | 0 | 0 | |
| 1 | 1 | 0 | 0 | 0 | |
| 0 | 1 | 0 | 0 | 0 | |

(a)

| CORRESPONDENCE TABLE FOR PROTECTION BITS | | | | | | | | |
|---|---|---|---|---|---|---|---|---|
| 1 | 1 | 1 | 1 | 1 | 1 | 1 | 1 | 1 |
| F | 0 | 0 | 0 | 0 | 1 | 1 | 1 | 1 |
| V | 0 | 0 | 1 | 1 | 0 | 0 | 1 | 1 |
| H | 0 | 1 | 0 | 1 | 0 | 1 | 0 | 1 |
| P3 | 0 | 1 | 1 | 0 | 0 | 1 | 1 | 0 |
| P2 | 0 | 1 | 0 | 1 | 1 | 0 | 1 | 0 |
| P1 | 0 | 0 | 1 | 1 | 1 | 1 | 0 | 0 |
| P0 | 0 | 1 | 1 | 0 | 1 | 0 | 0 | 1 |

| R1[11] | R1[7] | R1[3] | Gr1[11] | Gr1[7] | Gr1[3] | R2[11] | R2[7] | R2[3] | Gr2[11] | Gr2[7] | Gr2[3] |
|---|---|---|---|---|---|---|---|---|---|---|---|
| R1[10] | R1[6] | R1[2] | Gr1[10] | Gr1[6] | Gr1[2] | R2[10] | R2[6] | R2[2] | Gr2[10] | Gr2[6] | Gr2[2] |
| R1[9] | R1[5] | R1[1] | Gr1[9] | Gr1[5] | Gr1[1] | R2[9] | R2[5] | R2[1] | Gr2[9] | Gr2[5] | Gr2[1] |
| R1[8] | R1[4] | R1[0] | Gr1[8] | Gr1[4] | Gr1[0] | R2[8] | R2[4] | R2[0] | Gr2[8] | Gr2[4] | Gr2[0] | x  x  x  R1  x  x  Gr1  x  x  R2  x  x  Gr2

| Row | | | | | | | | | | | | | | |
|---|---|---|---|---|---|---|---|---|---|---|---|---|---|---|
| 39 | | | | | | | | Blank | 1 | 1 | 0 | 0 | 0 | 0 |
| 38 | | | | | | | | 1 | 1 | 1 | 0 | 0 | 0 | 0 |
| 37 | | | | | | | | 1 | 1 | 1 | 0 | 0 | 0 | 0 |
| 36 | | | | | | | | 1 | 1 | 0 | 0 | 0 | 0 | 0 |
| 35 | | | | | | | Blank | 1 | 1 | 0 | 0 | 0 | 0 | 0 |
| 34 | | | | | | | 1 | 1 | 1 | 0 | 0 | 0 | 0 | 0 |
| 33 | | | | | | | 1 | 1 | 1 | 0 | 0 | 0 | 0 | 0 |
| 32 | | | | | | | 1 | 1 | 0 | 0 | 0 | 0 | 0 | 1 |
| 31 | | | | | | Blank | 1 | 1 | 0 | 0 | 0 | 0 | 0 | F |
| 30 | | | | | | 1 | 1 | 1 | 0 | 0 | 0 | 0 | 0 | V |
| 29 | | | | | | 1 | 1 | 1 | 0 | 0 | 0 | 0 | 0 | H |
| 28 | | | | | | 1 | 1 | 0 | 0 | 0 | 0 | 0 | 1 | P3 |
| 27 | | | | | Blank | 1 | 1 | 0 | 0 | 0 | 0 | 0 | F | P2 |
| 26 | | | | | 1 | 1 | 1 | 0 | 0 | 0 | 0 | 0 | V | P1 |
| 25 | | | | | 1 | 1 | 1 | 0 | 0 | 0 | 0 | 0 | H | P0 |
| 24 | | | | | 1 | 1 | 0 | 0 | 0 | 0 | 0 | 1 | P3 | 0 |
| 23 | | | | Blank | 1 | 1 | 0 | 0 | 0 | 0 | 0 | F | P2 | 0 |
| 22 | | | | 1 | 1 | 1 | 0 | 0 | 0 | 0 | 0 | V | P1 | R1 |
| 21 | | | | 1 | 1 | 1 | 0 | 0 | 0 | 0 | 0 | H | P0 | R1 |
| 20 | | | | 1 | 1 | 0 | 0 | 0 | 0 | 0 | 1 | P3 | 0 | R1 |
| 19 | | | Blank | 1 | 1 | 0 | 0 | 0 | 0 | 0 | F | P2 | 0 | R1 |
| 18 | | | 1 | 1 | 1 | 0 | 0 | 0 | 0 | 0 | V | P1 | R1 | R1 |
| 17 | | | 1 | 1 | 1 | 0 | 0 | 0 | 0 | 0 | H | P0 | R1 | R1 |
| 16 | | | 1 | 1 | 0 | 0 | 0 | 0 | 0 | 1 | P3 | 0 | R1 | R1 |
| 15 | | Blank | 1 | 1 | 0 | 0 | 0 | 0 | 0 | F | P2 | 0 | R1 | R1 |
| 14 | | 1 | 1 | 1 | 0 | 0 | 0 | 0 | 0 | V | P1 | R1 | R1 | R1 |
| 13 | | 1 | 1 | 1 | 0 | 0 | 0 | 0 | 0 | H | P0 | R1 | R1 | R1 |
| 12 | | 1 | 1 | 0 | 0 | 0 | 0 | 0 | 1 | P3 | 0 | R1 | R1 | R5 |
| 11 | Blank | 1 | 1 | 0 | 0 | 0 | 0 | 0 | F | P2 | 0 | R1 | R1 | R5 |
| 10 | 1 | 1 | 1 | 0 | 0 | 0 | 0 | 0 | V | P1 | R1 | R1 | R1 | R5 |
| 9 | 1 | 1 | 1 | 0 | 0 | 0 | 0 | 0 | H | P0 | R1 | R1 | R1 | R5 |
| 8 | 1 | 1 | 0 | 0 | 0 | 0 | 0 | 1 | P3 | 0 | R1 | R1 | R5 | R5 |
| 7 | Blank | 1 | 1 | 0 | 0 | 0 | 0 | 0 | F | P2 | 0 | R1 | R1 | R5 | R5 |
| 6 | 1 | 1 | 1 | 0 | 0 | 0 | 0 | 0 | V | P1 | R1 | R1 | R1 | R5 | R5 |
| 5 | 1 | 1 | 1 | 0 | 0 | 0 | 0 | 0 | H | P0 | R1 | R1 | R1 | R5 | R5 |
| 4 | 1 | 1 | 0 | 0 | 0 | 0 | 0 | 1 | P3 | 0 | R1 | R1 | R5 | R5 | R5 |
| 3 | Blank | 1 | 1 | 0 | 0 | 0 | 0 | 0 | F | P2 | 0 | R1 | R1 | R5 | R5 | R5 |
| 2 | 1 | 1 | 1 | 0 | 0 | 0 | 0 | 0 | V | P1 | R1 | R1 | R1 | R5 | R9 |
| 1 | 1 | 1 | 1 | 0 | 0 | 0 | 0 | 0 | H | P0 | R1 | R1 | R1 | R5 | R9 |
| 0 | 1 | 1 | 0 | 0 | 0 | 0 | 0 | 1 | P3 | 0 | R1 | R1 | R5 | R5 | R9 |

| Row | | | | | | | | | | | | | | |
|---|---|---|---|---|---|---|---|---|---|---|---|---|---|---|
| 39 | | | | | | | Blank | 1 | 1 | 1 | 0 | 0 | 0 | 0 |
| 38 | | | | | | | Blank | 1 | 1 | 0 | 0 | 0 | 0 | 0 |
| 37 | | | | | | | Blank | 1 | 1 | 0 | 0 | 0 | 0 | 0 |
| 36 | | | | | | | | 1 | 1 | 1 | 0 | 0 | 0 | 0 |
| 35 | | | | | | Blank | 1 | 1 | 1 | 0 | 0 | 0 | 0 | 0 |
| 34 | | | | | | Blank | 1 | 1 | 0 | 0 | 0 | 0 | 0 | 0 |
| 33 | | | | | | Blank | 1 | 1 | 0 | 0 | 0 | 0 | 0 | 0 |
| 32 | | | | | | | 1 | 1 | 1 | 0 | 0 | 0 | 0 | 0 |
| 31 | | | | | Blank | 1 | 1 | 1 | 0 | 0 | 0 | 0 | 0 | 0 |
| 30 | | | | | Blank | 1 | 1 | 0 | 0 | 0 | 0 | 0 | 0 | 1 |
| 29 | | | | | Blank | 1 | 1 | 0 | 0 | 0 | 0 | 0 | 0 | F |
| 28 | | | | | | 1 | 1 | 1 | 0 | 0 | 0 | 0 | 0 | V |
| 27 | | | | Blank | 1 | 1 | 1 | 0 | 0 | 0 | 0 | 0 | 0 | H |
| 26 | | | | Blank | 1 | 1 | 0 | 0 | 0 | 0 | 0 | 1 | P3 | |
| 25 | | | | Blank | 1 | 1 | 0 | 0 | 0 | 0 | 0 | F | P2 | |
| 24 | | | | | 1 | 1 | 1 | 0 | 0 | 0 | 0 | V | P1 | |
| 23 | | | Blank | 1 | 1 | 1 | 0 | 0 | 0 | 0 | 0 | H | P0 | |
| 22 | | | Blank | 1 | 1 | 0 | 0 | 0 | 0 | 0 | 1 | P3 | 0 | |
| 21 | | | Blank | 1 | 1 | 0 | 0 | 0 | 0 | 0 | F | P2 | 0 | |
| 20 | | | | 1 | 1 | 1 | 0 | 0 | 0 | 0 | V | P1 | R1 | |
| 19 | | Blank | 1 | 1 | 1 | 0 | 0 | 0 | 0 | 0 | H | P0 | R1 | |
| 18 | | Blank | 1 | 1 | 0 | 0 | 0 | 0 | 0 | 1 | P3 | 0 | R1 | |
| 17 | | Blank | 1 | 1 | 0 | 0 | 0 | 0 | 0 | F | P2 | 0 | R1 | |
| 16 | | | 1 | 1 | 1 | 0 | 0 | 0 | 0 | V | P1 | R1 | R1 | |
| 15 | Blank | 1 | 1 | 1 | 0 | 0 | 0 | 0 | 0 | H | P0 | R1 | R1 | |
| 14 | Blank | 1 | 1 | 0 | 0 | 0 | 0 | 0 | 1 | P3 | 0 | R1 | R1 | |
| 13 | Blank | 1 | 1 | 0 | 0 | 0 | 0 | 0 | F | P2 | 0 | R1 | R1 | |
| 12 | | 1 | 1 | 1 | 0 | 0 | 0 | 0 | V | P1 | R1 | R1 | R1 | |
| 11 | Blank | 1 | 1 | 1 | 0 | 0 | 0 | 0 | H | P0 | R1 | R1 | R1 | |
| 10 | Blank | 1 | 1 | 0 | 0 | 0 | 0 | 1 | P3 | 0 | R1 | R1 | R5 | |
| 9 | Blank | 1 | 1 | 0 | 0 | 0 | 0 | F | P2 | 0 | R1 | R1 | R5 | |
| 8 | | 1 | 1 | 1 | 0 | 0 | 0 | 0 | V | P1 | R1 | R1 | R1 | R5 |
| 7 | Blank | 1 | 1 | 1 | 0 | 0 | 0 | 0 | H | P0 | R1 | R1 | R1 | R5 |
| 6 | Blank | 1 | 1 | 0 | 0 | 0 | 0 | 1 | P3 | 0 | R1 | R1 | R5 | R5 |
| 5 | Blank | 1 | 1 | 0 | 0 | 0 | 0 | F | P2 | 0 | R1 | R1 | R5 | R5 |
| 4 | | 1 | 1 | 1 | 0 | 0 | 0 | 0 | V | P1 | R1 | R1 | R1 | R5 |
| 3 | Blank | 1 | 1 | 1 | 0 | 0 | 0 | 0 | H | P0 | R1 | R1 | R1 | R5 | R5 |
| 2 | Blank | 1 | 1 | 0 | 0 | 0 | 0 | 1 | P3 | 0 | R1 | R1 | R5 | R5 |
| 1 | Blank | 1 | 1 | 0 | 0 | 0 | 0 | F | P2 | 0 | R1 | R1 | R5 | R5 |
| 0 | 1 | 1 | 1 | 0 | 0 | 0 | 0 | 0 | V | P1 | R1 | R1 | R1 | R5 | R5 | R9 |

FIG. 27

| | | | | | | | | | | | | | |
|---|---|---|---|---|---|---|---|---|---|---|---|---|---|
| 39 | | | | | | | | 1 | 1 | 1 | 0 | 0 | 0 | 0 |
| 38 | | | | | | | | 1 | 1 | 1 | 0 | 0 | 0 | 0 |
| 37 | | | | | | | | 1 | 1 | 0 | 0 | 0 | 0 | 0 |
| 36 | | | | | | | | 1 | 1 | 0 | 0 | 0 | 0 | 0 |
| 35 | | | | | | | 1 | 1 | 1 | 0 | 0 | 0 | 0 | 0 |
| 34 | | | | | | | 1 | 1 | 1 | 0 | 0 | 0 | 0 | 0 |
| 33 | | | | | | | 1 | 1 | 0 | 0 | 0 | 0 | 0 | 1 |
| 32 | | | | | | | 1 | 1 | 0 | 0 | 0 | 0 | 0 | F |
| 31 | | | | | | 1 | 1 | 1 | 0 | 0 | 0 | 0 | 0 | V |
| 30 | | | | | | 1 | 1 | 1 | 0 | 0 | 0 | 0 | 0 | H |
| 29 | | | | | | 1 | 1 | 0 | 0 | 0 | 0 | 0 | 1 | P3 |
| 28 | | | | | | 1 | 1 | 0 | 0 | 0 | 0 | 0 | F | P2 |
| 27 | | | | | 1 | 1 | 1 | 0 | 0 | 0 | 0 | 0 | V | P1 |
| 26 | | | | | 1 | 1 | 1 | 0 | 0 | 0 | 0 | 0 | H | P0 |
| 25 | | | | | 1 | 1 | 0 | 0 | 0 | 0 | 0 | 1 | P3 | 0 |
| 24 | | | | | 1 | 1 | 0 | 0 | 0 | 0 | 0 | F | P2 | 0 |
| 23 | | | | 1 | 1 | 1 | 0 | 0 | 0 | 0 | 0 | V | P1 | R1 |
| 22 | | | | 1 | 1 | 1 | 0 | 0 | 0 | 0 | 0 | H | P0 | R1 |
| 21 | | | | 1 | 1 | 0 | 0 | 0 | 0 | 0 | 1 | P3 | 0 | R1 |
| 20 | | | | 1 | 1 | 0 | 0 | 0 | 0 | 0 | F | P2 | 0 | R1 |
| 19 | | | 1 | 1 | 1 | 0 | 0 | 0 | 0 | 0 | V | P1 | R1 | R1 |
| 18 | | | 1 | 1 | 1 | 0 | 0 | 0 | 0 | 0 | H | P0 | R1 | R1 |
| 17 | | | 1 | 1 | 0 | 0 | 0 | 0 | 0 | 1 | P3 | 0 | R1 | R1 |
| 16 | | | 1 | 1 | 0 | 0 | 0 | 0 | 0 | F | P2 | 0 | R1 | R1 |
| 15 | | 1 | 1 | 1 | 0 | 0 | 0 | 0 | 0 | V | P1 | R1 | R1 | R1 |
| 14 | | 1 | 1 | 1 | 0 | 0 | 0 | 0 | 0 | H | P0 | R1 | R1 | R1 |
| 13 | | 1 | 1 | 0 | 0 | 0 | 0 | 0 | 1 | P3 | 0 | R1 | R1 | R5 |
| 12 | | 1 | 1 | 0 | 0 | 0 | 0 | 0 | F | P2 | 0 | R1 | R1 | R5 |
| 11 | 1 | 1 | 1 | 0 | 0 | 0 | 0 | 0 | V | P1 | R1 | R1 | R1 | R5 |
| 10 | 1 | 1 | 1 | 0 | 0 | 0 | 0 | 0 | H | P0 | R1 | R1 | R1 | R5 |
| 9 | 1 | 1 | 0 | 0 | 0 | 0 | 0 | 1 | P3 | 0 | R1 | R1 | R5 | R5 |
| 8 | 1 | 1 | 0 | 0 | 0 | 0 | 0 | F | P2 | 0 | R1 | R1 | R5 | R5 |
| 7 | 1 | 1 | 1 | 0 | 0 | 0 | 0 | 0 | V | P1 | R1 | R1 | R1 | R5 | R5 |
| 6 | 1 | 1 | 1 | 0 | 0 | 0 | 0 | 0 | H | P0 | R1 | R1 | R1 | R5 | R5 |
| 5 | 1 | 1 | 0 | 0 | 0 | 0 | 0 | 1 | P3 | 0 | R1 | R1 | R5 | R5 | R5 |
| 4 | 1 | 1 | 0 | 0 | 0 | 0 | 0 | F | P2 | 0 | R1 | R1 | R5 | R5 | R5 |
| 3 | 1 | 1 | 1 | 0 | 0 | 0 | 0 | 0 | V | P1 | R1 | R1 | R5 | R5 | R9 |
| 2 | 1 | 1 | 1 | 0 | 0 | 0 | 0 | 0 | H | P0 | R1 | R1 | R5 | R5 | R9 |
| 1 | 1 | 1 | 0 | 0 | 0 | 0 | 0 | 1 | P3 | 0 | R1 | R1 | R5 | R5 | R9 |
| 0 | 1 | 1 | 0 | 0 | 0 | 0 | 0 | F | P2 | 0 | R1 | R1 | R5 | R5 | R9 |

CASE 1

| Blank | 1 | 1 | 1 | 0 | 0 | 0 | 0 | 0 | 0 | H | P0 | 0 | R1[8] | R1[4] | R1[0] | R5[8] | R5[4] | R5[0] |
| 1 | 1 | 1 | 1 | 0 | 0 | 0 | 0 | 0 | 1 | P3 | 0 | R1[11] | R1[7] | R1[3] | R5[11] | R5[7] | R5[3] | R9[11] |
| 1 | 1 | 1 | 1 | 0 | 0 | 0 | 0 | 0 | F | P2 | 0 | R1[10] | R1[6] | R1[2] | R5[10] | R5[6] | R5[2] | R9[10] |
| 1 | 1 | 1 | 1 | 0 | 0 | 0 | 0 | 0 | V | P1 | 0 | R1[9] | R1[5] | R1[1] | R5[9] | R5[5] | R5[1] | R9[9] |

CASE 2

| Blank | 1 | 1 | 1 | 0 | 0 | 0 | 0 | 0 | 0 | V | P1 | 0 | R1[9] | R1[5] | R1[1] | R5[9] | R5[5] | R5[1] |
| Blank | 1 | 1 | 1 | 0 | 0 | 0 | 0 | 0 | 0 | H | P0 | 0 | R1[8] | R1[4] | R1[0] | R5[8] | R5[4] | R5[0] |
| 1 | 1 | 1 | 1 | 0 | 0 | 0 | 0 | 0 | 1 | P3 | 0 | R1[11] | R1[7] | R1[3] | R5[11] | R5[7] | R5[3] | R9[11] |
| 1 | 1 | 1 | 1 | 0 | 0 | 0 | 0 | 0 | F | P2 | 0 | R1[10] | R1[6] | R1[2] | R5[10] | R5[6] | R5[2] | R9[10] |

CASE 3

| Blank | 1 | 1 | 1 | 0 | 0 | 0 | 0 | 0 | 0 | F | P2 | 0 | R1[10] | R1[6] | R1[2] | R5[10] | R5[6] | R5[2] |
| Blank | 1 | 1 | 1 | 0 | 0 | 0 | 0 | 0 | 0 | V | P1 | 0 | R1[9] | R1[5] | R1[1] | R5[9] | R5[5] | R5[1] |
| Blank | 1 | 1 | 1 | 0 | 0 | 0 | 0 | 0 | 0 | H | P0 | 0 | R1[8] | R1[4] | R1[0] | R5[8] | R5[4] | R5[0] |
| 1 | 1 | 1 | 1 | 0 | 0 | 0 | 0 | 0 | 1 | P3 | 0 | R1[11] | R1[7] | R1[3] | R5[11] | R5[7] | R5[3] | R9[11] |

CASE 4

| 1 | 1 | 1 | 0 | 0 | 0 | 0 | 0 | 0 | 1 | P3 | 0 | R1[11] | R1[7] | R1[3] | R5[11] | R5[7] | R5[3] | R9[11] |
| 1 | 1 | 1 | 0 | 0 | 0 | 0 | 0 | 0 | F | P2 | 0 | R1[10] | R1[6] | R1[2] | R5[10] | R5[6] | R5[2] | R9[10] |
| 1 | 1 | 1 | 0 | 0 | 0 | 0 | 0 | 0 | V | P1 | 0 | R1[9] | R1[5] | R1[1] | R5[9] | R5[5] | R5[1] | R9[9] |
| 1 | 1 | 1 | 0 | 0 | 0 | 0 | 0 | 0 | H | P0 | 0 | R1[8] | R1[4] | R1[0] | R5[8] | R5[4] | R5[0] | R9[8] |

FIG. 29

| Row | | | | | | | | | | | | | | | | |
|---|---|---|---|---|---|---|---|---|---|---|---|---|---|---|---|---|
| 47 | | | | | | | | | Blank | 1 | 1 | 1 | 0 | 0 | 0 | 0 |
| 46 | | | | | | | | | | 1 | 1 | 1 | 0 | 0 | 0 | 0 |
| 45 | | | | | | | | | | 1 | 1 | 1 | 0 | 0 | 0 | 0 |
| 44 | | | | | | | | | | 1 | 1 | 1 | 0 | 0 | 0 | 0 |
| 43 | | | | | | | | | Blank | 1 | 1 | 1 | 0 | 0 | 0 | 0 |
| 42 | | | | | | | | | | 1 | 1 | 1 | 0 | 0 | 0 | 0 |
| 41 | | | | | | | | | | 1 | 1 | 1 | 0 | 0 | 0 | 0 |
| 40 | | | | | | | | | | 1 | 1 | 1 | 0 | 0 | 0 | 0 |
| 39 | | | | | | | | Blank | 1 | 1 | 1 | 0 | 0 | 0 | 0 | 0 |
| 38 | | | | | | | | | 1 | 1 | 1 | 0 | 0 | 0 | 0 | 1 |
| 37 | | | | | | | | | 1 | 1 | 1 | 0 | 0 | 0 | 0 | F |
| 36 | | | | | | | | | 1 | 1 | 1 | 0 | 0 | 0 | 0 | V |
| 35 | | | | | | | | Blank | 1 | 1 | 1 | 0 | 0 | 0 | 0 | H |
| 34 | | | | | | | | | 1 | 1 | 1 | 0 | 0 | 0 | 0 | 1 | P3 |
| 33 | | | | | | | | | 1 | 1 | 1 | 0 | 0 | 0 | 0 | F | P2 |
| 32 | | | | | | | | | 1 | 1 | 1 | 0 | 0 | 0 | 0 | V | P1 |
| 31 | | | | | | | Blank | 1 | 1 | 1 | 0 | 0 | 0 | 0 | 0 | H | P0 |
| 30 | | | | | | | | 1 | 1 | 1 | 0 | 0 | 0 | 0 | 1 | P3 | 0 |
| 29 | | | | | | | | 1 | 1 | 1 | 0 | 0 | 0 | 0 | F | P2 | 0 |
| 28 | | | | | | | | 1 | 1 | 1 | 0 | 0 | 0 | 0 | V | P1 | 0 |
| 27 | | | | | | | Blank | 1 | 1 | 1 | 0 | 0 | 0 | 0 | H | P0 | 0 |
| 26 | | | | | | | | 1 | 1 | 1 | 0 | 0 | 0 | 0 | 1 | P3 | 0 | R1 |
| 25 | | | | | | | | 1 | 1 | 1 | 0 | 0 | 0 | 0 | F | P2 | 0 | R1 |
| 24 | | | | | | | | 1 | 1 | 1 | 0 | 0 | 0 | 0 | V | P1 | 0 | R1 |
| 23 | | | | | | Blank | 1 | 1 | 1 | 0 | 0 | 0 | 0 | 0 | H | P0 | 0 | R1 |
| 22 | | | | | | | 1 | 1 | 1 | 0 | 0 | 0 | 0 | 0 | 1 | P3 | 0 | R1 | R1 |
| 21 | | | | | | | 1 | 1 | 1 | 0 | 0 | 0 | 0 | 0 | F | P2 | 0 | R1 | R1 |
| 20 | | | | | | | 1 | 1 | 1 | 0 | 0 | 0 | 0 | 0 | V | P1 | 0 | R1 | R1 |
| 19 | | | | | Blank | 1 | 1 | 1 | 0 | 0 | 0 | 0 | 0 | 0 | H | P0 | 0 | R1 | R1 |
| 18 | | | | | | 1 | 1 | 1 | 0 | 0 | 0 | 0 | 0 | 0 | 1 | P3 | 0 | R1 | R1 | R1 |
| 17 | | | | | | 1 | 1 | 1 | 0 | 0 | 0 | 0 | 0 | 0 | F | P2 | 0 | R1 | R1 | R1 |
| 16 | | | | | | 1 | 1 | 1 | 0 | 0 | 0 | 0 | 0 | 0 | V | P1 | 0 | R1 | R1 | R1 |
| 15 | | | | Blank | 1 | 1 | 1 | 0 | 0 | 0 | 0 | 0 | 0 | 0 | H | P0 | 0 | R1 | R1 | R1 |
| 14 | | | | | 1 | 1 | 1 | 0 | 0 | 0 | 0 | 0 | 0 | 0 | 1 | P3 | 0 | R1 | R1 | R1 | R5 |
| 13 | | | | | 1 | 1 | 1 | 0 | 0 | 0 | 0 | 0 | 0 | 0 | F | P2 | 0 | R1 | R1 | R1 | R5 |
| 12 | | | | | 1 | 1 | 1 | 0 | 0 | 0 | 0 | 0 | 0 | 0 | V | P1 | 0 | R1 | R1 | R1 | R5 |
| 11 | | | Blank | 1 | 1 | 1 | 0 | 0 | 0 | 0 | 0 | 0 | 0 | 0 | H | P0 | 0 | R1 | R1 | R1 | R5 |
| 10 | | | | 1 | 1 | 1 | 0 | 0 | 0 | 0 | 0 | 0 | 0 | 0 | 1 | P3 | 0 | R1 | R1 | R1 | R5 | R5 |
| 9 | | | | 1 | 1 | 1 | 0 | 0 | 0 | 0 | 0 | 0 | 0 | 0 | F | P2 | 0 | R1 | R1 | R1 | R5 | R5 |
| 8 | | | | 1 | 1 | 1 | 0 | 0 | 0 | 0 | 0 | 0 | 0 | 0 | V | P1 | 0 | R1 | R1 | R1 | R5 | R5 |
| 7 | | Blank | 1 | 1 | 1 | 0 | 0 | 0 | 0 | 0 | 0 | 0 | 0 | 0 | H | P0 | 0 | R1 | R1 | R1 | R5 | R5 |
| 6 | | | 1 | 1 | 1 | 0 | 0 | 0 | 0 | 0 | 0 | 0 | 0 | 0 | 1 | P3 | 0 | R1 | R1 | R1 | R5 | R5 |
| 5 | | | 1 | 1 | 1 | 0 | 0 | 0 | 0 | 0 | 0 | 0 | 0 | 0 | F | P2 | 0 | R1 | R1 | R1 | R5 | R5 |
| 4 | | | 1 | 1 | 1 | 0 | 0 | 0 | 0 | 0 | 0 | 0 | 0 | 0 | V | P1 | 0 | R1 | R1 | R1 | R5 | R5 |
| 3 | Blank | 1 | 1 | 1 | 0 | 0 | 0 | 0 | 0 | 0 | 0 | 0 | 0 | 0 | H | P0 | 0 | R1 | R1 | R1 | R5 | R5 |
| 2 | | 1 | 1 | 1 | 0 | 0 | 0 | 0 | 0 | 0 | 0 | 0 | 0 | 0 | 1 | P3 | 0 | R1 | R1 | R1 | R5 | R5 | R9 |
| 1 | | 1 | 1 | 1 | 0 | 0 | 0 | 0 | 0 | 0 | 0 | 0 | 0 | 0 | F | P2 | 0 | R1 | R1 | R5 | R5 | R5 | R9 |
| 0 | | 1 | 1 | 1 | 0 | 0 | 0 | 0 | 0 | 0 | 0 | 0 | 0 | 0 | V | P1 | 0 | R1 | R1 | R1 | R5 | R5 | R9 |

FIG. 30

| Row | | | | | | | | | | | | | | | |
|---|---|---|---|---|---|---|---|---|---|---|---|---|---|---|---|
| 47 | | | | | | | | Blank | 1 | 1 | 1 | 0 | 0 | 0 | 0 |
| 46 | | | | | | | | Blank | 1 | 1 | 1 | 0 | 0 | 0 | 0 |
| 45 | | | | | | | | 1 | 1 | 1 | 0 | 0 | 0 | 0 | 0 |
| 44 | | | | | | | | 1 | 1 | 1 | 0 | 0 | 0 | 0 | 0 |
| 43 | | | | | | | Blank | 1 | 1 | 1 | 0 | 0 | 0 | 0 | 0 |
| 42 | | | | | | | Blank | 1 | 1 | 1 | 0 | 0 | 0 | 0 | 0 |
| 41 | | | | | | | 1 | 1 | 1 | 0 | 0 | 0 | 0 | 0 | 0 |
| 40 | | | | | | | 1 | 1 | 1 | 0 | 0 | 0 | 0 | 0 | 0 |
| 39 | | | | | | Blank | 1 | 1 | 1 | 0 | 0 | 0 | 0 | 0 | 0 |
| 38 | | | | | | Blank | 1 | 1 | 1 | 0 | 0 | 0 | 0 | 0 | 0 |
| 37 | | | | | | 1 | 1 | 1 | 0 | 0 | 0 | 0 | 0 | 0 | 1 |
| 36 | | | | | | 1 | 1 | 1 | 0 | 0 | 0 | 0 | 0 | 0 | F |
| 35 | | | | | Blank | 1 | 1 | 1 | 0 | 0 | 0 | 0 | 0 | 0 | V |
| 34 | | | | | Blank | 1 | 1 | 1 | 0 | 0 | 0 | 0 | 0 | 0 | H |
| 33 | | | | | 1 | 1 | 1 | 0 | 0 | 0 | 0 | 0 | 0 | 1 | P3 |
| 32 | | | | | 1 | 1 | 1 | 0 | 0 | 0 | 0 | 0 | 0 | F | P2 |
| 31 | | | | Blank | 1 | 1 | 1 | 0 | 0 | 0 | 0 | 0 | 0 | V | P1 |
| 30 | | | | Blank | 1 | 1 | 1 | 0 | 0 | 0 | 0 | 0 | 0 | H | P0 |
| 29 | | | | 1 | 1 | 1 | 0 | 0 | 0 | 0 | 0 | 0 | 1 | P3 | 0 |
| 28 | | | | 1 | 1 | 1 | 0 | 0 | 0 | 0 | 0 | 0 | F | P2 | 0 |
| 27 | | | Blank | 1 | 1 | 1 | 0 | 0 | 0 | 0 | 0 | 0 | V | P1 | 0 |
| 26 | | | Blank | 1 | 1 | 1 | 0 | 0 | 0 | 0 | 0 | 0 | H | P0 | 0 |
| 25 | | | 1 | 1 | 1 | 0 | 0 | 0 | 0 | 0 | 0 | 1 | P3 | 0 | R1 |
| 24 | | | 1 | 1 | 1 | 0 | 0 | 0 | 0 | 0 | 0 | F | P2 | 0 | R1 |
| 23 | | Blank | 1 | 1 | 1 | 0 | 0 | 0 | 0 | 0 | 0 | V | P1 | 0 | R1 |
| 22 | | Blank | 1 | 1 | 1 | 0 | 0 | 0 | 0 | 0 | 0 | H | P0 | 0 | R1 |
| 21 | | 1 | 1 | 1 | 0 | 0 | 0 | 0 | 0 | 0 | 1 | P3 | 0 | R1 | R1 |
| 20 | | 1 | 1 | 1 | 0 | 0 | 0 | 0 | 0 | 0 | F | P2 | 0 | R1 | R1 |
| 19 | Blank | 1 | 1 | 1 | 0 | 0 | 0 | 0 | 0 | 0 | V | P1 | 0 | R1 | R1 |
| 18 | Blank | 1 | 1 | 1 | 0 | 0 | 0 | 0 | 0 | 0 | H | P0 | 0 | R1 | R1 |
| 17 | 1 | 1 | 1 | 0 | 0 | 0 | 0 | 0 | 0 | 1 | P3 | 0 | R1 | R1 | R1 |
| 16 | 1 | 1 | 1 | 0 | 0 | 0 | 0 | 0 | 0 | F | P2 | 0 | R1 | R1 | R1 |
| 15 | Blank | 1 | 1 | 1 | 0 | 0 | 0 | 0 | 0 | 0 | V | P1 | 0 | R1 | R1 | R1 |
| 14 | Blank | 1 | 1 | 1 | 0 | 0 | 0 | 0 | 0 | 0 | H | P0 | 0 | R1 | R1 | R1 |
| 13 | 1 | 1 | 1 | 0 | 0 | 0 | 0 | 0 | 0 | 1 | P3 | 0 | R1 | R1 | R1 | R5 |
| 12 | 1 | 1 | 1 | 0 | 0 | 0 | 0 | 0 | 0 | F | P2 | 0 | R1 | R1 | R1 | R5 |
| 11 | Blank | 1 | 1 | 1 | 0 | 0 | 0 | 0 | 0 | 0 | V | P1 | 0 | R1 | R1 | R1 | R5 |
| 10 | Blank | 1 | 1 | 1 | 0 | 0 | 0 | 0 | 0 | 0 | H | P0 | 0 | R1 | R1 | R1 | R5 |
| 9 | 1 | 1 | 1 | 0 | 0 | 0 | 0 | 0 | 0 | 1 | P3 | 0 | R1 | R1 | R1 | R5 | R5 |
| 8 | 1 | 1 | 1 | 0 | 0 | 0 | 0 | 0 | 0 | F | P2 | 0 | R1 | R1 | R1 | R5 | R5 |
| 7 | Blank | 1 | 1 | 1 | 0 | 0 | 0 | 0 | 0 | 0 | V | P1 | 0 | R1 | R1 | R1 | R5 | R5 |
| 6 | Blank | 1 | 1 | 1 | 0 | 0 | 0 | 0 | 0 | 0 | H | P0 | 0 | R1 | R1 | R1 | R5 | R5 |
| 5 | 1 | 1 | 1 | 0 | 0 | 0 | 0 | 0 | 0 | 1 | P3 | 0 | R1 | R1 | R1 | R5 | R5 | R5 |
| 4 | 1 | 1 | 1 | 0 | 0 | 0 | 0 | 0 | 0 | F | P2 | 0 | R1 | R1 | R1 | R5 | R5 | R5 |
| 3 | Blank | 1 | 1 | 1 | 0 | 0 | 0 | 0 | 0 | 0 | V | P1 | 0 | R1 | R1 | R1 | R5 | R5 | R5 |
| 2 | Blank | 1 | 1 | 1 | 0 | 0 | 0 | 0 | 0 | 0 | H | P0 | 0 | R1 | R1 | R1 | R5 | R5 | R5 |
| 1 | 1 | 1 | 1 | 0 | 0 | 0 | 0 | 0 | 0 | 1 | P3 | 0 | R1 | R1 | R1 | R5 | R5 | R5 | R9 |
| 0 | 1 | 1 | 1 | 0 | 0 | 0 | 0 | 0 | 0 | F | P2 | 0 | R1 | R1 | R1 | R5 | R5 | R5 | R9 |

| Row | | | | | | | | | | | | | | | | |
|---|---|---|---|---|---|---|---|---|---|---|---|---|---|---|---|---|
| 47 | | | | | | | | | 1 | 1 | 1 | 0 | 0 | 0 | 0 | 0 |
| 46 | | | | | | | | | 1 | 1 | 1 | 0 | 0 | 0 | 0 | 0 |
| 45 | | | | | | | | | 1 | 1 | 1 | 0 | 0 | 0 | 0 | 0 |
| 44 | | | | | | | | | 1 | 1 | 1 | 0 | 0 | 0 | 0 | 0 |
| 43 | | | | | | | | 1 | 1 | 1 | 0 | 0 | 0 | 0 | 0 | 0 |
| 42 | | | | | | | | 1 | 1 | 1 | 0 | 0 | 0 | 0 | 0 | 0 |
| 41 | | | | | | | | 1 | 1 | 1 | 0 | 0 | 0 | 0 | 0 | 0 |
| 40 | | | | | | | | 1 | 1 | 1 | 0 | 0 | 0 | 0 | 0 | 0 |
| 39 | | | | | | | 1 | 1 | 1 | 0 | 0 | 0 | 0 | 0 | 0 | 1 |
| 38 | | | | | | | 1 | 1 | 1 | 0 | 0 | 0 | 0 | 0 | 0 | F |
| 37 | | | | | | | 1 | 1 | 1 | 0 | 0 | 0 | 0 | 0 | 0 | V |
| 36 | | | | | | | 1 | 1 | 1 | 0 | 0 | 0 | 0 | 0 | 0 | H |
| 35 | | | | | | 1 | 1 | 1 | 0 | 0 | 0 | 0 | 0 | 0 | 1 | P3 |
| 34 | | | | | | 1 | 1 | 1 | 0 | 0 | 0 | 0 | 0 | 0 | F | P2 |
| 33 | | | | | | 1 | 1 | 1 | 0 | 0 | 0 | 0 | 0 | 0 | V | P1 |
| 32 | | | | | | 1 | 1 | 1 | 0 | 0 | 0 | 0 | 0 | 0 | H | P0 |
| 31 | | | | | 1 | 1 | 1 | 0 | 0 | 0 | 0 | 0 | 0 | 1 | P3 | 0 |
| 30 | | | | | 1 | 1 | 1 | 0 | 0 | 0 | 0 | 0 | 0 | F | P2 | 0 |
| 29 | | | | | 1 | 1 | 1 | 0 | 0 | 0 | 0 | 0 | 0 | V | P1 | 0 |
| 28 | | | | | 1 | 1 | 1 | 0 | 0 | 0 | 0 | 0 | 0 | H | P0 | 0 |
| 27 | | | | 1 | 1 | 1 | 0 | 0 | 0 | 0 | 0 | 0 | 1 | P3 | 0 | R1 |
| 26 | | | | 1 | 1 | 1 | 0 | 0 | 0 | 0 | 0 | 0 | F | P2 | 0 | R1 |
| 25 | | | | 1 | 1 | 1 | 0 | 0 | 0 | 0 | 0 | 0 | V | P1 | 0 | R1 |
| 24 | | | | 1 | 1 | 1 | 0 | 0 | 0 | 0 | 0 | 0 | H | P0 | 0 | R1 |
| 23 | | | 1 | 1 | 1 | 0 | 0 | 0 | 0 | 0 | 0 | 1 | P3 | 0 | R1 | R1 |
| 22 | | | 1 | 1 | 1 | 0 | 0 | 0 | 0 | 0 | 0 | F | P2 | 0 | R1 | R1 |
| 21 | | | 1 | 1 | 1 | 0 | 0 | 0 | 0 | 0 | 0 | V | P1 | 0 | R1 | R1 |
| 20 | | | 1 | 1 | 1 | 0 | 0 | 0 | 0 | 0 | 0 | H | P0 | 0 | R1 | R1 |
| 19 | | 1 | 1 | 1 | 0 | 0 | 0 | 0 | 0 | 0 | 1 | P3 | 0 | R1 | R1 | R1 |
| 18 | | 1 | 1 | 1 | 0 | 0 | 0 | 0 | 0 | 0 | F | P2 | 0 | R1 | R1 | R1 |
| 17 | | 1 | 1 | 1 | 0 | 0 | 0 | 0 | 0 | 0 | V | P1 | 0 | R1 | R1 | R1 |
| 16 | | 1 | 1 | 1 | 0 | 0 | 0 | 0 | 0 | 0 | H | P0 | 0 | R1 | R1 | R1 |
| 15 | 1 | 1 | 1 | 0 | 0 | 0 | 0 | 0 | 0 | 1 | P3 | 0 | R1 | R1 | R1 | R5 |
| 14 | 1 | 1 | 1 | 0 | 0 | 0 | 0 | 0 | 0 | F | P2 | 0 | R1 | R1 | R1 | R5 |
| 13 | 1 | 1 | 1 | 0 | 0 | 0 | 0 | 0 | 0 | V | P1 | 0 | R1 | R1 | R1 | R5 |
| 12 | 1 | 1 | 1 | 0 | 0 | 0 | 0 | 0 | 0 | H | P0 | 0 | R1 | R1 | R1 | R5 |
| 11 | 1 | 1 | 1 | 0 | 0 | 0 | 0 | 0 | 0 | 1 | P3 | 0 | R1 | R1 | R5 | R5 |
| 10 | 1 | 1 | 1 | 0 | 0 | 0 | 0 | 0 | 0 | F | P2 | 0 | R1 | R1 | R5 | R5 |
| 9 | 1 | 1 | 1 | 0 | 0 | 0 | 0 | 0 | 0 | V | P1 | 0 | R1 | R1 | R5 | R5 |
| 8 | 1 | 1 | 1 | 0 | 0 | 0 | 0 | 0 | 0 | H | P0 | 0 | R1 | R1 | R5 | R5 |
| 7 | 1 | 1 | 1 | 0 | 0 | 0 | 0 | 0 | 1 | P3 | 0 | R1 | R1 | R1 | R5 | R5 |
| 6 | 1 | 1 | 1 | 0 | 0 | 0 | 0 | 0 | F | P2 | 0 | R1 | R1 | R5 | R5 | R5 |
| 5 | 1 | 1 | 1 | 0 | 0 | 0 | 0 | 0 | V | P1 | 0 | R1 | R1 | R1 | R5 | R5 |
| 4 | 1 | 1 | 1 | 0 | 0 | 0 | 0 | 0 | H | P0 | 0 | R1 | R1 | R1 | R5 | R5 |
| 3 | 1 | 1 | 1 | 0 | 0 | 0 | 0 | 0 | 1 | P3 | 0 | R1 | R1 | R5 | R5 | R9 |
| 2 | 1 | 1 | 1 | 0 | 0 | 0 | 0 | 0 | F | P2 | 0 | R1 | R1 | R5 | R5 | R9 |
| 1 | 1 | 1 | 1 | 0 | 0 | 0 | 0 | 0 | V | P1 | 0 | R1 | R1 | R5 | R5 | R9 |
| 0 | 1 | 1 | 1 | 0 | 0 | 0 | 0 | 0 | H | P0 | 0 | R1 | R1 | R5 | R5 | R9 |

FIG. 33

| | 0 | 1 | 2 | 3 | 4 | 5 | 6 | 7 |
|---|---|---|---|---|---|---|---|---|
| 11 | 0 | 0 | 0 | V | P1 | R1[9] | R1[5] | R1[1] | R5[7] |
| 10 | 0 | 0 | 0 | H | P0 | R1[8] | R1[4] | R1[0] | R5[6] |
| 9 | 0 | 0 | 1 | P3 | 0 | R1[7] | R1[3] | R5[9] | R5[5] |
| 8 | 0 | 0 | F | P2 | 0 | R1[6] | R1[2] | R5[8] | R5[4] |
| 7 | 0 | 0 | V | P1 | R1[9] | R1[5] | R1[1] | R5[7] | R5[3] |
| 6 | 0 | 0 | H | P0 | R1[8] | R1[4] | R1[0] | R5[6] | R5[2] |
| 5 | 0 | 1 | P3 | 0 | R1[7] | R1[3] | R5[9] | R5[5] | R5[1] |
| 4 | 0 | F | P2 | 0 | R1[6] | R1[2] | R5[8] | R5[4] | R5[0] |
| 3 | 0 | V | P1 | R1[9] | R1[5] | R1[1] | R5[7] | R5[3] | R9[9] |
| 2 | 0 | H | P0 | R1[8] | R1[4] | R1[0] | R5[6] | R5[2] | R9[8] |
| 1 | 1 | P3 | 0 | R1[7] | R1[3] | R5[9] | R5[5] | R5[1] | R9[7] |
| 0 | F | P2 | 0 | R1[6] | R1[2] | R5[8] | R5[4] | R5[0] | R9[6] |
| | 0 | 1 | 2 | 3 | 4 | 0 | 1 | | |

(a) 10 BITS

| | 0 | 1 | 2 | 3 | 4 | 5 | 6 | 7 |
|---|---|---|---|---|---|---|---|---|
| 11 | 0 | 0 | 1 | P3 | 0 | R1[11] | R1[7] | R1[3] | R5[11] |
| 10 | 0 | 0 | F | P2 | 0 | R1[10] | R1[6] | R1[2] | R5[10] |
| 9 | 0 | 0 | V | P1 | 0 | R1[9] | R1[5] | R1[1] | R5[9] |
| 8 | 0 | 0 | H | P0 | 0 | R1[8] | R1[4] | R1[0] | R5[8] |
| 7 | 0 | 1 | P3 | 0 | R1[11] | R1[7] | R1[3] | R5[11] | R5[7] |
| 6 | 0 | F | P2 | 0 | R1[10] | R1[6] | R1[2] | R5[10] | R5[6] |
| 5 | 0 | V | P1 | 0 | R1[9] | R1[5] | R1[1] | R5[9] | R5[5] |
| 4 | 0 | H | P0 | 0 | R1[8] | R1[4] | R1[0] | R5[8] | R5[4] |
| 3 | 1 | P3 | 0 | R1[11] | R1[7] | R1[3] | R5[11] | R5[7] | R5[3] |
| 2 | F | P2 | 0 | R1[10] | R1[6] | R1[2] | R5[10] | R5[6] | R5[2] |
| 1 | V | P1 | 0 | R1[9] | R1[5] | R1[1] | R5[9] | R5[5] | R5[1] |
| 0 | H | P0 | 0 | R1[8] | R1[4] | R1[0] | R5[8] | R5[4] | R5[0] |
| | 0 | 1 | 2 | 3 | 4 | 5 | 0 | | |

(b) 12 BITS

| Ch1 | R1 | R3 | R5 | R7 |
|---|---|---|---|---|
| Ch2 | Gr1 | Gr3 | Gr5 | Gr7 |
| Ch3 | R2 | R4 | R6 | R8 |
| Ch4 | Gr2 | Gr4 | Gr6 | Gr8 |

(a) W=4

| Ch1 | R1 | Gr2 | R4 | Gr5 |
|---|---|---|---|---|
| Ch2 | Gr1 | R3 | Gr4 | R6 |
| Ch3 | R2 | Gr3 | R5 | Gr6 |
| Ch4 | - | - | - | - |

(b) W=3

| Ch1 | R1 | R2 | R3 | R4 |
|---|---|---|---|---|
| Ch2 | Gr1 | Gr2 | Gr3 | Gr4 |
| Ch3 | - | - | - | - |
| Ch4 | - | - | - | - |

(c) W=2

| Ch1 | R1 | Gr1 | R2 | Gr2 |
|---|---|---|---|---|
| Ch2 | - | - | - | - |
| Ch3 | - | - | - | - |
| Ch4 | - | - | - | - |

| NUMBER OF OPERATION CHANNELS | SELECTION SIGNAL | | | | |
|---|---|---|---|---|---|
| | COUNTER ="0" | COUNTER ="1" | COUNTER ="2" | COUNTER ="3" | COUNTER ="4" |
| 4 | 1 | 3 | 1 | 3 | * |
| 3 | 1 | 3 | 2 | * | * |
| 2 | 1 | * | 1 | * | * |
| 1 | 1 | * | * | * | * |

(a) 10 BITS

| NUMBER OF OPERATION CHANNELS | SELECTION SIGNAL | | | | | |
|---|---|---|---|---|---|---|
| | COUNTER ="0" | COUNTER ="1" | COUNTER ="2" | COUNTER ="3" | COUNTER ="4" | COUNTER ="5" |
| 4 | 1 | 3 | * | 1 | 3 | * |
| 3 | 1 | 3 | * | 2 | * | * |
| 2 | 1 | * | * | 1 | * | * |
| 1 | 1 | * | * | * | * | * |

(b) 12 BITS

FIG. 43

| NUMBER OF OPERATION CHANNELS | SELECTION SIGNAL | | | | |
|---|---|---|---|---|---|
| | COUNTER ="0" | COUNTER ="1" | COUNTER ="2" | COUNTER ="3" | COUNTER ="4" |
| 4 | 2 | 4 | 2 | 4 | * |
| 3 | 2 | * | 1 | 3 | * |
| 2 | 2 | * | 2 | * | * |
| 1 | * | * | 1 | * | * |

(a) 10 BITS

| NUMBER OF OPERATION CHANNELS | SELECTION SIGNAL | | | | | |
|---|---|---|---|---|---|---|
| | COUNTER ="0" | COUNTER ="1" | COUNTER ="2" | COUNTER ="3" | COUNTER ="4" | COUNTER ="5" |
| 4 | 2 | 4 | * | 2 | 4 | * |
| 3 | 2 | * | * | 1 | 3 | * |
| 2 | 2 | * | * | 2 | * | * |
| 1 | * | * | * | 1 | * | * |

(b) 12 BITS

FIG. 47

| NUMBER OF OPERATION CHANNELS | SELECTION SIGNAL | | | | |
|---|---|---|---|---|---|
| | COUNTER ="0" | COUNTER ="1" | COUNTER ="2" | COUNTER ="3" | COUNTER ="4" |
| 4 | 1 | 1 | 1 | 1 | 1 |
| 3 | 1 | * | 2 | 2 | * |
| 2 | 1 | * | 1 | * | * |
| 1 | * | * | 3 | * | * |

(a) 10 BITS

| NUMBER OF OPERATION CHANNELS | SELECTION SIGNAL | | | | | |
|---|---|---|---|---|---|---|
| | COUNTER ="0" | COUNTER ="1" | COUNTER ="2" | COUNTER ="3" | COUNTER ="4" | COUNTER ="5" |
| 4 | 1 | 1 | * | 1 | 1 | * |
| 3 | 1 | * | * | 3 | 2 | * |
| 2 | 1 | * | * | 1 | * | * |
| 1 | * | * | * | 4 | * | * |

(b) 12 BITS (a) W=4

(b) W=3

(c) W=2

(d) W=1

(a) W=4

(b) W=3

(c) W=2

(d) W=1

(a) W=4

(b) W=3

(c) W=2

(d) W=1

(a) W=4

(b) W=3

(c) W=2

(d) W=1

IMAGER, IMAGING CIRCUIT, AND IMAGE PROCESSING CIRCUIT

TECHNICAL FIELD

The present invention relates to an image pickup apparatus, and more particularly to an image pickup apparatus which transmits an image pickup signal, an image pickup circuit in the image pickup apparatus, an image processing circuit, and a processing method performed in the apparatus and circuits, and a program which causes a computer to execute the method.

BACKGROUND ART

In recent years, as semiconductor technology progresses, an image sensor in an image pickup apparatus has been speeded up. Because of this, a high-speed interface has been employed in order to improve the data transmission speed from the image sensor to a signal processing unit. As such an image pickup apparatus, for example, an apparatus employing an LVDS (Low Voltage Differential Signaling) transmission scheme for data transmission from an image sensor to a signal processing unit has been proposed (for example, see Japanese Unexamined Patent Application Publication No. 2005-244709 (FIG. 1)). This LVDS transmission scheme is a scheme used to speed up the transmission speed and reduce power consumption by using differential signals of small amplitude which are opposite to each other (are different in polarity).

The above-described existing technology enables low-amplitude signals to be transmitted at high speed by using a differential amplifier.

However, there are various operation modes for such an image pickup apparatus, and there may be a case in which the transmission speed is not important such as an operation mode for picking up a low-resolution image. Even in such a case, some power is consumed in order to drive a differential amplifier. Thus, even if the frequency of the differential amplifier is lowered, it has little effect in reducing power consumption.

On the other hand, since image pickup signals supplied from the image sensor are in a certain order, if the number of active differential amplifiers, that is, the number of channels is simply changed according to an operation mode, the loss of an image pickup signal may occur.

The present invention has been made in light of such circumstances, and it is an object of the present invention to change the number of channels in accordance with an operation mode of an image pickup apparatus.

DISCLOSURE OF INVENTION

The present invention is made so as to solve the above-described problems. A first aspect of the present invention is an image pickup apparatus characterized by including image pickup means for outputting image pickup signals generated by a plurality of image pickup elements which photoelectrically convert light from a subject, serial conversion means for converting each of the image pickup signals, each of which is generated from one of the plurality of image pickup elements, into a serial signal, synchronization-code generation means for generating a synchronization code regarding the image pickup signals before or after the conversion into the serial signal and for embedding the synchronization code into the serial signals, transfer means for transferring the serial signals using at least one operation channel from among a plurality of channels, parallel conversion means for performing parallel conversion on each of the transferred serial signals, thereby outputting parallel signals in a number equal to the number of operation channels, reconstruction means for detecting the embedded synchronization code in the parallel signals, thereby reconstructing the image pickup signals in accordance with the timing of the synchronization code and the number of operation channels, and control means for performing the setting of the number of operation channels in the transfer means in accordance with an operation mode. This provides an effect of controlling the number of operation channels in the transfer means in accordance with an operation mode of the image pickup apparatus.

Then, a second aspect of the present invention is an image pickup apparatus including image pickup means having a plurality of image pickup elements, each of which generates an image pickup signal of n bits (n is a natural number) by photoelectrically converting light from a subject, image processing means for performing predetermined signal processing on the image pickup signal, transfer means for transferring the image pickup signals using L channels (L is a natural number) at the maximum from the image pickup means to the image processing means, and control means for performing the setting of the number of channels W (W is a natural number) used for the transfer from among the L channels in the transfer means in accordance with an operation mode, the image pickup apparatus characterized in that the image pickup means includes serial conversion means for converting each of W image pickup signals, each of which is generated from one of the plurality of image pickup elements, into a serial signal, and synchronization-code generation means for generating an n-bit synchronization code regarding the image pickup signals before or after the conversion into the serial signal and for embedding the n-bit synchronization code into the serial signals, the transfer means includes means for serially transferring, via the W channels, the serial signals which are converted from the image pickup signals, and the image processing means includes parallel conversion means for performing parallel conversion on each of the serial signals transferred via the W channels, thereby outputting W parallel signals of M bits (M is a natural number), and reconstruction means for detecting the synchronization code embedded in the parallel signals, thereby reconstructing the image pickup signals of n bits in accordance with the timing of the synchronization code. This provides an effect of controlling the number of operation channels in the transfer means from the image pickup means to the image processing means in accordance with an operation mode of the image pickup apparatus.

Moreover, in this second aspect, the image pickup apparatus may further includes number-of-channel holding means for holding the operation mode in association with the number of channels corresponding to the operation mode, and the control means may perform the setting of the number of channels corresponding to the operation mode held in the number-of-channel holding means as the number of channels W used for the transfer. This provides an effect of controlling the number of operation channels in the transfer means in accordance with information stored in the number-of-channel holding means.

Moreover, in this second aspect, the transfer means may perform the serial transfer using differential signals which are opposite to each other (that is, opposite in polarity). In this case, particularly, the serial transfer may be performed according to an LVDS transmission scheme.

Moreover, in this second aspect, the reconstruction means may include data-window extraction means for detecting the synchronization code embedded in the parallel signals and for extracting W data windows of N bits (N is a natural number greater than or equal to n) in accordance with the timing of the synchronization code, and image-pickup-signal extracting means for extracting the W image pickup signals from the data windows in accordance with the bit length n of the image pickup signals. This provides an effect of extracting data windows in accordance with the timing of the synchronization code and extracting image pickup signals from the data windows. In this case, the reconstruction means may further include sorting means for sorting the W image pickup signals in a format necessary for the signal processing. Moreover, the reconstruction means may further include bit-length adjusting means for adding a random number at a predetermined bit position of each of the W image pickup signals so as to obtain the bit length necessary for the signal processing. Moreover, the image processing means may further include a counter for counting clocks periodically in accordance with the timing of the synchronization code, valid-flag generation means for generating a valid flag indicating the presence or absence of the image pickup signals according to a count value held by the counter, and clock control means for controlling the occurrence of a clock for the signal processing according to the valid flag.

Then, a third aspect of the present invention is an image pickup circuit in an image pickup apparatus including an image pickup circuit having a plurality of image pickup elements, each of which generates an image pickup signal of n bits (n is a natural number) by photoelectrically converting light from a subject, an image processing circuit for performing predetermined signal processing on the image pickup signals, a transfer circuit for serially transferring the image pickup signals using L channels (L is a natural number) at the maximum from the image pickup circuit to the image processing circuit, and a control circuit for performing the setting of the number of channels W (W is a natural number) used for performing the transfer from among the L channels in the transfer circuit in accordance with an operation mode, the image pickup circuit characterized by including serial conversion means for converting each of W image pickup signals, each of which is generated from one of the plurality of image pickup elements, into a serial signal, and synchronization-code generation means for generating an n-bit synchronization code regarding the image pickup signals before or after the conversion into the serial signal and for embedding the n-bit synchronization code into the serial signals. This makes the number of operation channels from the image pickup circuit to the image processing circuit be adjustable in the transfer circuit and provides an effect of causing the image pickup signals in the image processing circuit to be easily extracted.

Then, a fourth aspect of the present invention is an image processing circuit in an image pickup apparatus including an image pickup circuit having a plurality of image pickup elements, each of which generates an image pickup signal of n bits (n is a natural number) by photoelectrically converting light from a subject, an image processing circuit for performing predetermined signal processing on the image pickup signals, a transfer circuit for serially transferring the image pickup signals using L channels (L is a natural number) at the maximum from the image pickup circuit to the image processing circuit, and a control circuit for performing the setting of the number of channels W (W is a natural number) used for performing the transfer from among the L channels in the transfer circuit in accordance with an operation mode, the image processing circuit characterized by including parallel conversion means for performing parallel conversion on each of serial signals transferred via the W channels, thereby outputting W parallel signals of M bits (M is a natural number), and reconstruction means for detecting the synchronization code embedded in the parallel signals and for reconstructing the image pickup signals of n bits in accordance with the timing of the synchronization code. This provides an effect of performing the extraction of valid image pickup signals in a number so as to match the number of operation channels in the transfer circuit from the image pickup circuit to the image processing circuit.

According to the present invention, a preferable advantage that the number of channels can be changed in accordance with an operation mode in the image pickup apparatus can be obtained.

BRIEF DESCRIPTION OF DRAWINGS

FIG. 3 is a diagram showing an exemplary structure of a number-of-channel table 241 in the embodiment of the present invention.

FIG. 8 includes diagrams showing an exemplary format of a synchronization code in the embodiment of the present invention.

FIG. 10 includes diagrams showing an example of the correspondence relationship between operation channels and the bit arrangement of image pickup signals in the embodiment of the present invention.

FIG. 11 includes diagrams showing another example of the correspondence relationship between operation channels and the bit arrangement of image pickup signals in the embodiment of the present invention.

FIG. 20 is a diagram showing an eighth example of timings for image pickup signals at the time of data reception in the embodiment of the present invention.

FIG. 24 is a diagram showing an example in a case in which parallel signals are held by a shift register 512 at timings corresponding to case 1 of FIG. 23.

FIG. 25 is a diagram showing an example in a case in which parallel signals are held by the shift register 512 at timings corresponding to case 2 of FIG. 23.

FIG. 26 is a diagram showing an example in a case in which parallel signals are held by the shift register 512 at timings corresponding to case 3 of FIG. 23.

FIG. 27 is a diagram showing an example in a case in which parallel signals are held by the shift register 512 at timings corresponding to case 4 of FIG. 23.

FIG. 29 is a diagram showing an example in a case in which parallel signals are held by the shift register 512 at timings corresponding to case 1 of FIG. 28.

FIG. 30 is a diagram showing an example in a case in which parallel signals are held by the shift register 512 at timings corresponding to case 2 of FIG. 28.

FIG. 31 is a diagram showing an example in a case in which parallel signals are held by the shift register 512 at timings corresponding to case 3 of FIG. 28.

FIG. 32 is a diagram showing an example in a case in which parallel signals are held by the shift register 512 at timings corresponding to case 4 of FIG. 28.

FIG. 33 includes diagrams showing examples of data windows for a signal line 529 in the embodiment of the present invention.

FIG. 42 includes diagrams showing an example of the occurrence of a selection signal generated by a selection-signal generator 555 in the embodiment of the present invention.

FIG. 43 includes diagrams showing an example of the occurrence of a selection signal generated by a selection-signal generator 556 in the embodiment of the present invention.

FIG. 47 includes diagrams showing an example of the occurrence of a selection signal generated by a selection-signal generator 564 in the embodiment of the present invention.

BEST MODES FOR CARRYING OUT THE INVENTION

Next, an embodiment of the present invention will be described in detail with reference to the drawings.

Figure 1:
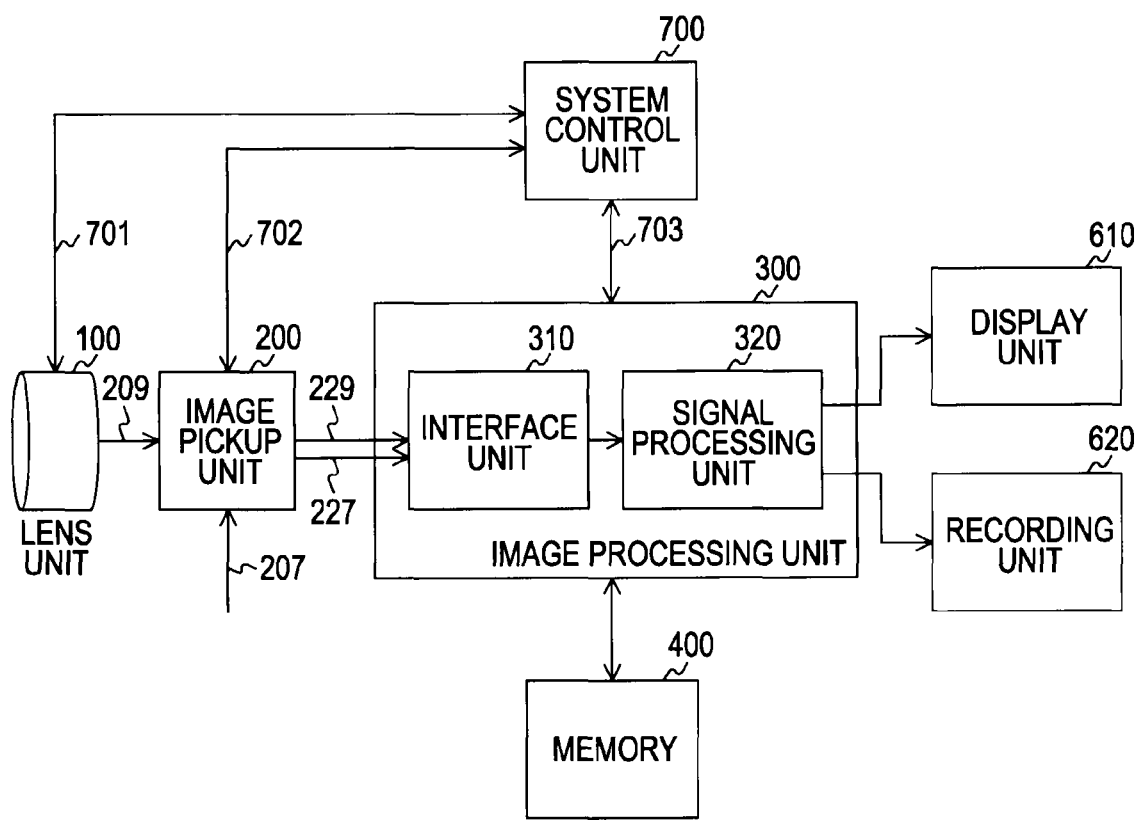
FIG. 1 is a diagram showing an exemplary structure of a whole image pickup apparatus in an embodiment of the present invention.

FIG. 1 is a diagram showing an exemplary structure of a whole image pickup apparatus in an embodiment of the present invention. This image pickup apparatus includes a lens unit 100, an image pickup unit 200, an image processing unit 300, a memory 400, a display unit 610, a recording unit 620, and a system control unit 700.

The lens unit 100 is an optical-system unit that leads light from a subject to a light receiving surface of the image pickup unit 200, and includes a group of lenses such as a focus lens, a zoom lens, and the like, a diaphragm (an iris), and a driving unit for driving these lenses and the like. The driving unit causes a subject image to be formed on the light receiving surface of the image pickup unit 200 via an optical path 209 while driving the group of lenses and the diaphragm in accordance with a command coming from the system control unit 700 via a signal line 701.

The image pickup unit 200 is a unit that photoelectrically converts the light supplied from the lens unit 100 into an image pickup signal and transfers the image pickup signal to the image processing unit 300 through a signal line 229. The image pickup unit 200, in accordance with a command coming from the system control unit 700 via a signal line 702, causes an exposure parameter such as a shutter speed, and an operation mode such as the number of channels of the signal line 229 and the data bit length to be changed. A reference clock (CLK0) is supplied to this image pickup unit 200 via a signal line 207, and the reference clock is frequency-multiplied by a PLL (Phase Locked Loop) circuit inside and is converted into a high-speed clock (CLK1). This high-speed clock is supplied to the image processing unit 300 via a signal line 227.

The image processing unit 300 is a unit that receives the image pickup signal transferred from the image pickup unit 200 and performs predetermined signal processing. This image processing unit 300 includes an interface unit 310 for receiving the image pickup signal and a signal processing unit 320 for performing signal processing. The image processing unit 300, in accordance with a command coming from the system control unit 700 via a signal line 703, causes an operation mode such as the number of channels of the signal line 229 and the data bit length to be changed.

The memory 400 is a work area used for the operation of the image processing unit 300, and is utilized for digital clamp, defect correction, white balance, gamma correction, YC processing, and the like mainly in the signal processing unit 320.

The display unit 610 is a unit that displays an image output from the image processing unit 300, and is realized by, for example, an LCD (Liquid Crystal Display). The recording unit 620 is a recording medium on which the image output from the image processing unit 300 is recorded, and is realized by, for example, a hard disk or a flash memory.

The system control unit 700 is a unit that is responsible for the control of the whole image pickup apparatus. That is, as described above, the system control unit 700 causes the group of lenses and diaphragm of the lens unit 100 to be driven via the signal line 701, causes the exposure parameter such as the shutter speed of the image pickup unit 200 to be changed via the signal line 702, and causes an operation mode such as the number of channels of the signal line 229 and the data bit length to be changed via the signal lines 702 and 703.

Figure 2:
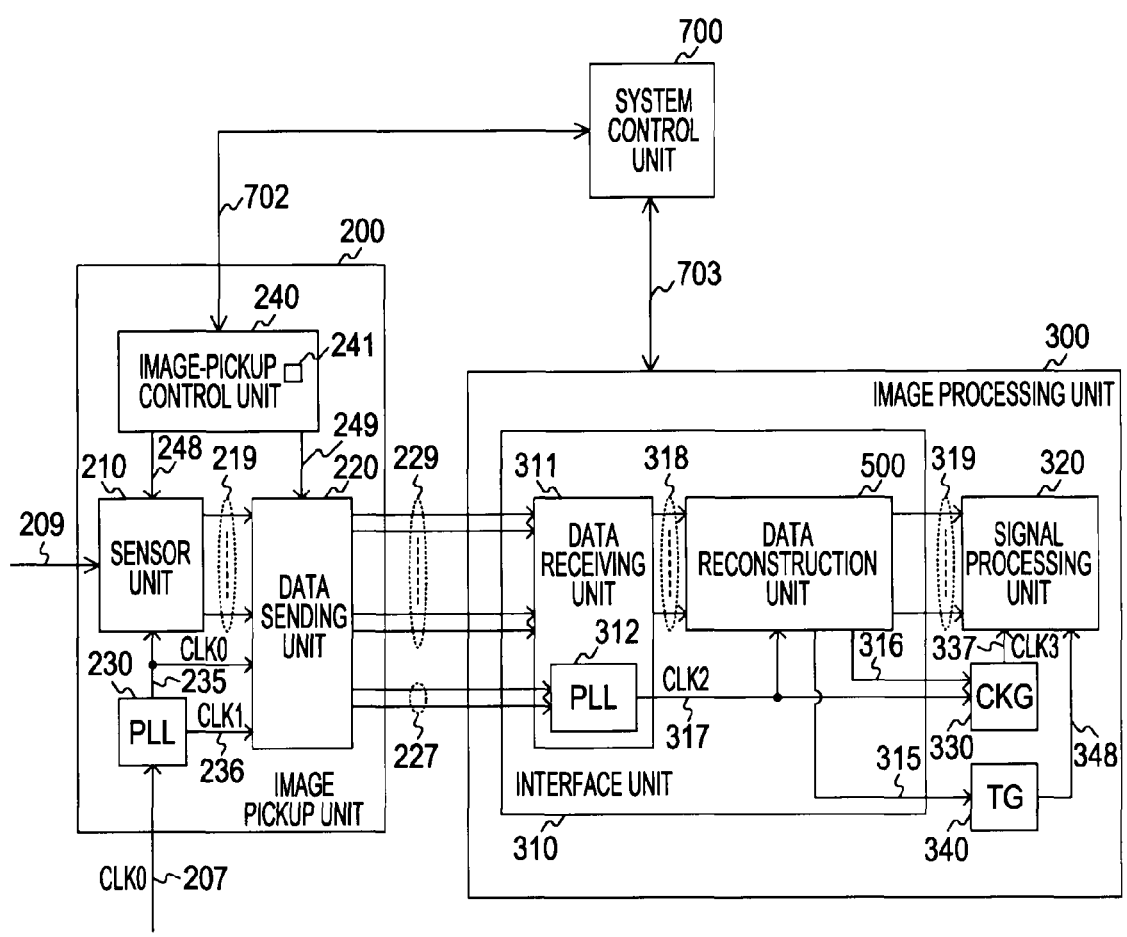
FIG. 2 is a diagram showing an exemplary structure of an essential part of the image pickup apparatus in the embodiment of the present invention.

FIG. 2 is a diagram showing an exemplary structure of an essential part of the image pickup apparatus in the embodiment of the present invention. The above-described image pickup unit 200 includes a sensor unit 210, a data sending unit 220, a PLL circuit 230, and an image-pickup control unit 240. Moreover, the above-described image processing unit 300 includes the interface unit 310, the signal processing unit 320, a clock gating circuit 330, and a timing generation circuit 340. Furthermore, the interface unit 310 includes a data receiving unit 311 and a data reconstruction unit 500.

The sensor unit 210 is a semiconductor device which photoelectrically converts light of an image which has been formed on the receiving surface via the optical path 209 and outputs an electric signal. This image pickup unit 200 has image pickup elements (image sensors), such as CMOSs (Complementary Metal Oxide Semiconductors), arranged in a two-dimensional manner on the receiving surface thereof. Image pickup signals converted into electric signals by the sensor unit 210 are supplied to the data sending unit 220 via a signal line 219. The signal line 219 is a signal line of L channels in total (L is a natural number), N bits per one channel (N is a natural number).

The data sending unit 220 is a unit that performs serial conversion on the image pickup signals supplied from the sensor unit 210 through the signal line 219 and sends the converted image pickup signal to the image processing unit 300 via the signal line 229. The signal line 229 is a serial signal line of L channels. Each of the channels has a plurality of physical signal lines in order to be able to transmit differential signals according to, for example, the LVDS transmission scheme at high speed.

The PLL circuit 230 is a circuit that synchronizes clock signals in terms of phase. According to the reference clock (CLK0) supplied from the signal line 207, this PLL circuit 230 supplies a clock which is in phase with the CLK0 to a signal line 235, and supplies the high-speed clock (CLK1) to a signal line 236. This high-speed clock is converted into differential signals at the data sending unit 220, and the differential signals are supplied to the image processing unit 300 via the signal line 227.

The image-pickup control unit 240 is a unit that controls image-pickup processing in the image pickup unit 200. For an operation mode specified by the system control unit 700 via the signal line 702, this image-pickup control unit 240 determines the number of channels which matches the operation mode. Then, the image-pickup control unit 240 sends a command, through a signal line 249, to the data sending unit 220 as to which channels to operate in accordance with this determined number of channels. Moreover, the image-pickup control unit 240 sends a command, through a signal line 248, to the sensor unit 210 as to which pixel to send via which channel in accordance with this determined number of channels. For the determination of this number of channels, the image-pickup control unit 240 includes a number-of-channel table 241 inside or outside thereof, and can determine the most appropriate number of channels by referring to this number-of-channel table 241.

The data receiving unit 311 is a unit that receives the image pickup signals which have been serially transmitted, converts the image pickup signals into parallel signals, and supplies the parallel signals to the data reconstruction unit 500 via a signal line 318. The signal line 318 is a signal line of L channels in total, M bits per one channel (M is a natural number). Moreover, the data receiving unit 311 includes a PLL circuit 312, and the PLL circuit 312 converts the high-speed clock represented by the differential signals supplied from the image pickup unit 200 into a singular (not differential signals) high-speed clock signal (CLK1) and a clock (CLK2) which is in phase with the CLK0. The CLK2 is supplied to the data reconstruction unit 500 and the clock gating circuit 330 via a signal line 317.

The data reconstruction unit 500 is a unit that reconstructs image pickup signals from the parallel signals supplied from the data receiving unit 311, and supplies the image pickup signals to the signal processing unit 320 via a signal line 319. The signal line 319 is a signal line of K channels in total (K is a natural number smaller than or equal to L), N' bits per one channel (N' is a natural number greater than or equal to N). Moreover, the data reconstruction unit 500 supplies a valid flag indicating the presence or absence of an image pickup signal and a synchronization signal for the vertical direction or the horizontal direction of the image signal to a signal line 316 and a signal line 315, respectively.

The signal processing unit 320 is a unit that performs signal processing on the image pickup signals supplied from the data reconstruction unit 500. The operation performed in this signal processing is similar to that performed in a general image pickup apparatus.

The clock gating circuit 330 is a circuit that masks the CLK2 supplied from the PLL circuit 312 according to the valid flag supplied from the data reconstruction unit 500. This masked clock CLK3 is supplied to the signal processing unit 320 via a signal line 337.

The timing generation circuit 340 is a circuit that supplies a timing signal to the signal processing unit 320 using the synchronization signal supplied from the data reconstruction unit 500 as a standard. This timing signal is supplied to the signal processing unit 320 via a signal line 348.

Figure 3:
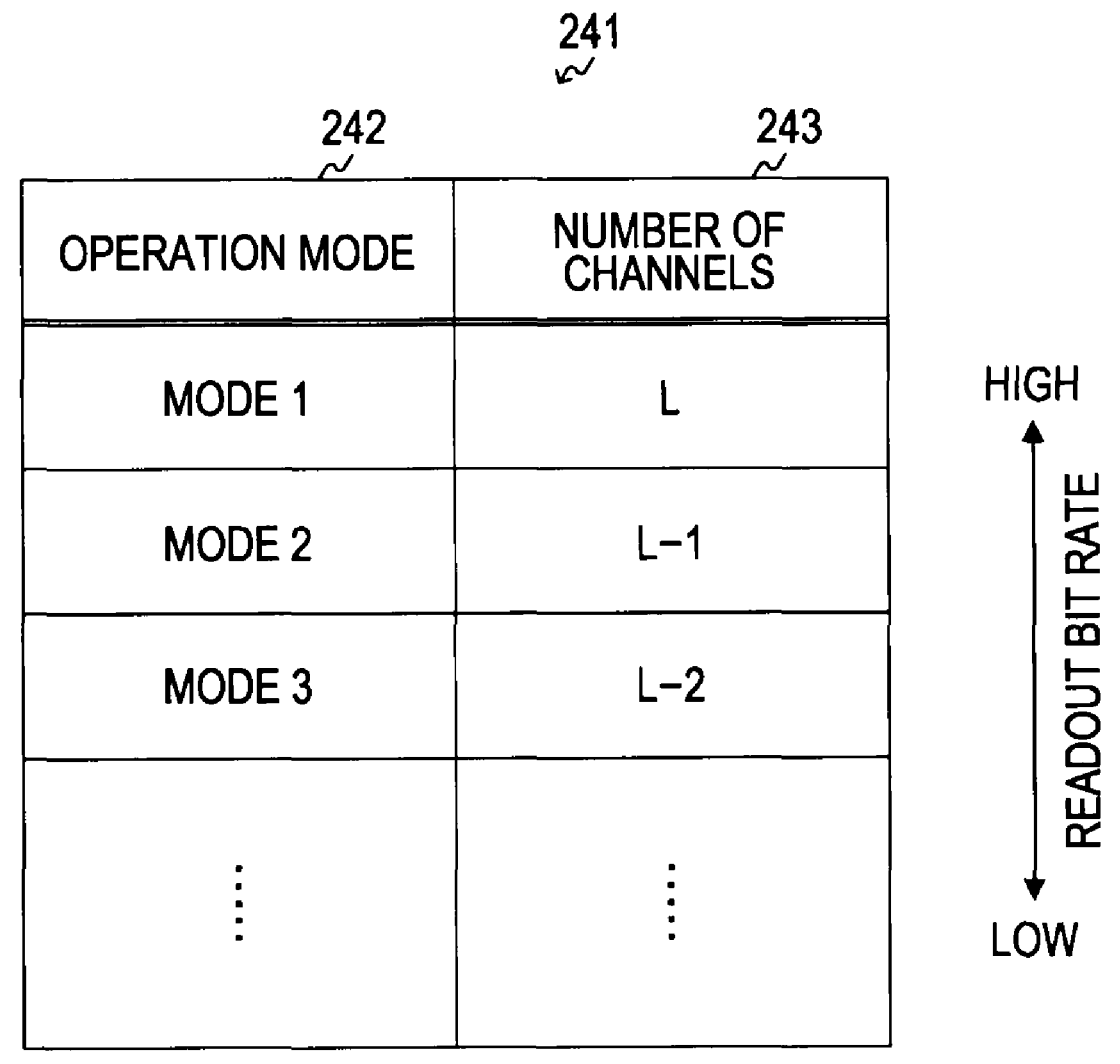

FIG. 3 is a diagram showing an exemplary structure of the number-of-channel table 241 in the embodiment of the present invention. This number-of-channel table 241 is a table which holds an operation mode 242 in association with the number of channels 243 corresponding to the operation mode 242. This number-of-channel table 241 is realized by, for example, a ROM (Read Only Memory).

The operation mode 242 is a field which holds operation modes for image pickup processing. As this operation mode 242, for example, a still-image recording mode for recording a still image, a moving-image recording mode for recording moving images, a monitoring mode for a standby state in which an image pickup signal is not being recorded, a high-speed image pickup mode for picking up an image at high speed by thinning out the number of pixels, a strobe mode for performing pre-flash for the strobe, a high-speed image pickup mode for speeding up the recording frequency for moving images, and the like can be thought of.

The number of channels 243 is a field which holds the number of operation channels of the signal line 229 appropriate for each of the operation modes. In this example, the numbers of operation channels are listed in descending order from the number of operation channels whose readout bit rate is the highest, and the numbers of operation channels listed in the higher ranks of the number-of-channel table 241 are large. That is, in the case of mode 1, "L" which is the maximum number of channels of the signal line 229 is held; however, as the mode is changed to mode 2 and to mode 3, the number of channels decreases to "L−1" and to "L−2". Although the more specific number of channels differs in accordance with an actual data rate of the image pickup apparatus, as an example, the following association can generally be assumed. That is, a moving-image and still-image recording mode supporting progressive high definition (1080 p or the like) corresponds to the mode 1. This is because a progressive method is employed and moreover it is necessary to transfer 30 frames or 60 frames per second, whereby a high data rate is required. Then, a moving-image and still-image recording mode supporting standard definition corresponds to the mode 2. In this case, this is because the angle of view is narrow, whereby the data rate decreases compared with the case of the mode 1. Then, a monitoring mode and a high-speed image pickup mode correspond to the mode 3. In the monitoring mode, this is because frames are thinned out or the frame rate is low, whereby the data rate decreases. In the high-speed image pickup mode, this is because, although the frame rate is high, the number of pixels is thinned out, whereby the data rate decreases. Then, a pre-flash strobe mode corresponds to mode 4. In this case, this is because the details of an image pickup signal are not necessary, whereby there is no problem even if data is significantly thinned out.

The image-pickup control unit 240 searches the operation mode 242 of the number-of-channel table 241 according to the operation mode specified by the system control unit 700, and determines the corresponding number of channels 243 as the number of operation channels of the signal line 229.

The number of channels determined in this way is supplied to the sensor unit 210 and the data sending unit 220 through the signal line 248 and the signal line 249, respectively. Moreover, the image-pickup control unit 240 may supply the determined number of channels to the system control unit 700 through the signal line 702.

Figure 4:
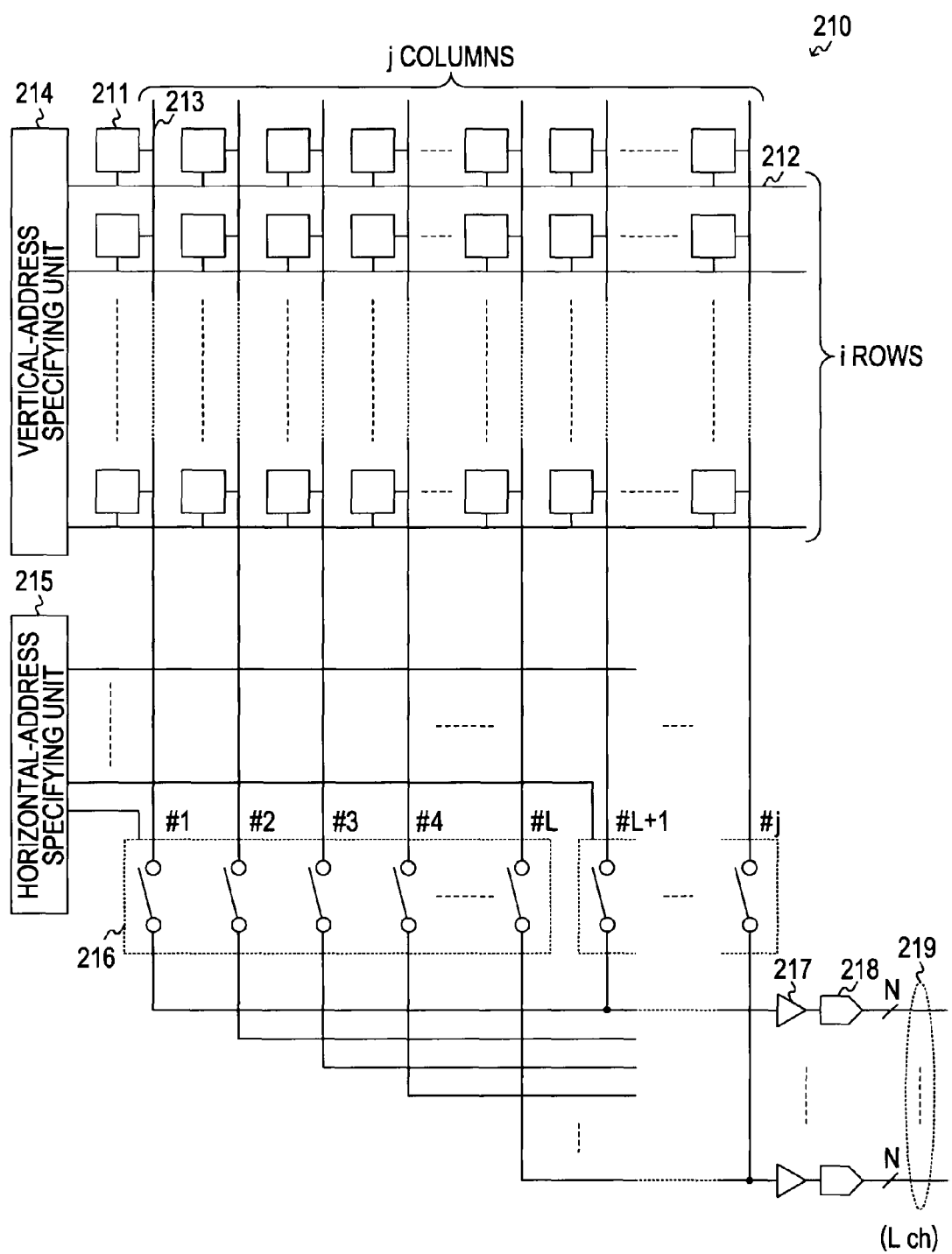
FIG. 4 is a diagram showing one exemplary structure of a sensor unit 210 in the embodiment of the present invention.

FIG. 4 is a diagram showing one exemplary structure of the sensor unit 210 in the embodiment of the present invention. In this, the sensor unit 210 includes image pickup elements 211 arranged on an i lines×j columns two-dimensional surface (i and j are natural numbers), i vertical-address selection lines 212, j readout signal lines 213, a vertical-address specifying unit 214, a horizontal-address specifying unit 215, an output selection switch 216, L buffers 217, and L A/D (analog/digital) converters 218.

According to a command coming from the image-pickup control unit 240, only a specific vertical-address selection line 212 is selected by the vertical-address specifying unit 214. From each of image pickup elements 211 connected to the selected vertical-address selection line 212, an analog image pickup signal corresponding to the pixel is output to a readout signal line 213.

The output selection switch 216 is wired so as to connect every set of L readout signal lines 213 to the buffers 217, each of the L readout signal lines 213 being connected to a different one of the buffers 217. That is, the first readout signal line 213 is wired so as to be connected to the first buffer 217, and the L-th readout signal line 213 is wired so as to be connected to the L-th buffer 217. Then, the L+1-th readout signal line 213 is wired so as to be connected to the first buffer 217. Thereafter, readout signal lines 213 are wired in order in a similar manner. The output selection switch 216 is divided into (j/L) groups (here, fractions are rounded up), and for each of the groups, one group-address selection line is distributed from the horizontal-address specifying unit 215. Because of this, L image pickup signals which belong to one of the groups are supplied to the L buffers 217.

Outputs of the L buffers 217 are converted into digital signals by corresponding L A/D converters 218. The digital-converted image pickup signals are output to the signal line 219 of L channels. For each of the channels of the signal line 219, although the bit width of the channel is N bits, there may be a case in which the bit length n of the image pickup signals is shorter than N.

Figure 5:
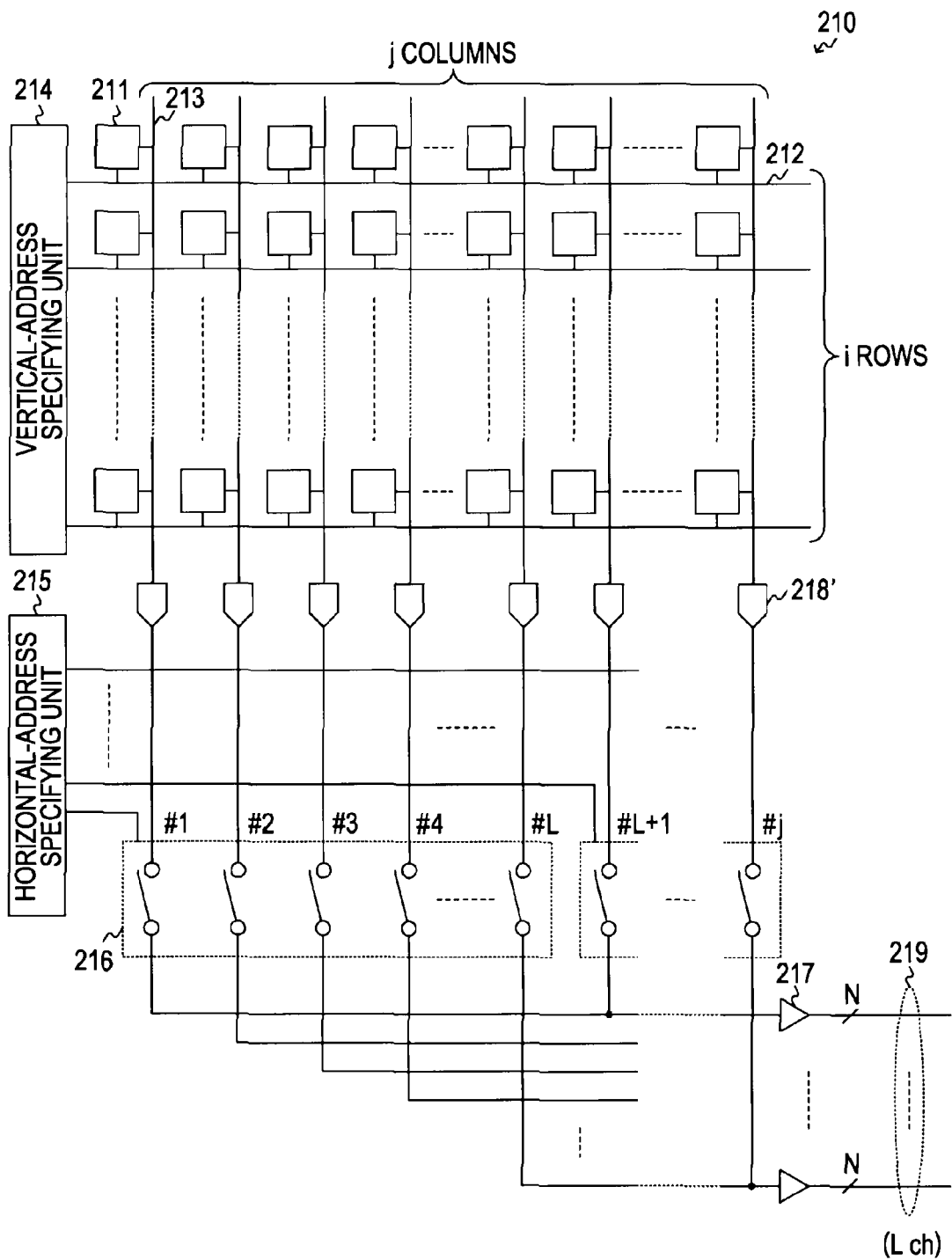
FIG. 5 is a diagram showing another exemplary structure of the sensor unit 210 in the embodiment of the present invention.

FIG. 5 is a diagram showing another exemplary structure of the sensor unit 210 in the embodiment of the present invention. In this exemplary structure, instead of the L A/D converters 218 in FIG. 4, j A/D converters 218' are provided for corresponding readout signal lines 213. That is, only the connection position of the A/D converters is different, and the image pickup signals obtained in the signal line 219 are equivalent.

Here, in any of the exemplary structures shown in FIG. 4 and FIG. 5, the sensor unit 210 outputs image pickup signals in accordance with a clock which is in phase with the reference clock (CLK0) supplied from the signal line 235. Moreover, the sensor unit 210 can change the number of channels to be used for output in accordance with the readout bit rate which changes according to an operation mode. For example, in a case in which pixels are thinned out and read, since the amount of data to be read significantly decreases, all the L channels are not always necessary to be used to output. In such a mode, only necessary pixels can be accessed by controlling the vertical-address specifying unit 214 and the horizontal-address specifying unit 215 and read-out image pickup signals can be output using minimally necessary channels. Moreover, in an operation mode in which a smoothing operation is performed by adding pieces of pixel information and thus the number of data to be read is substantially decreased, only the image pickup signals after the smoothing operation can be selected as necessary, and can be divided into minimally necessary channels and output.

Figure 6:
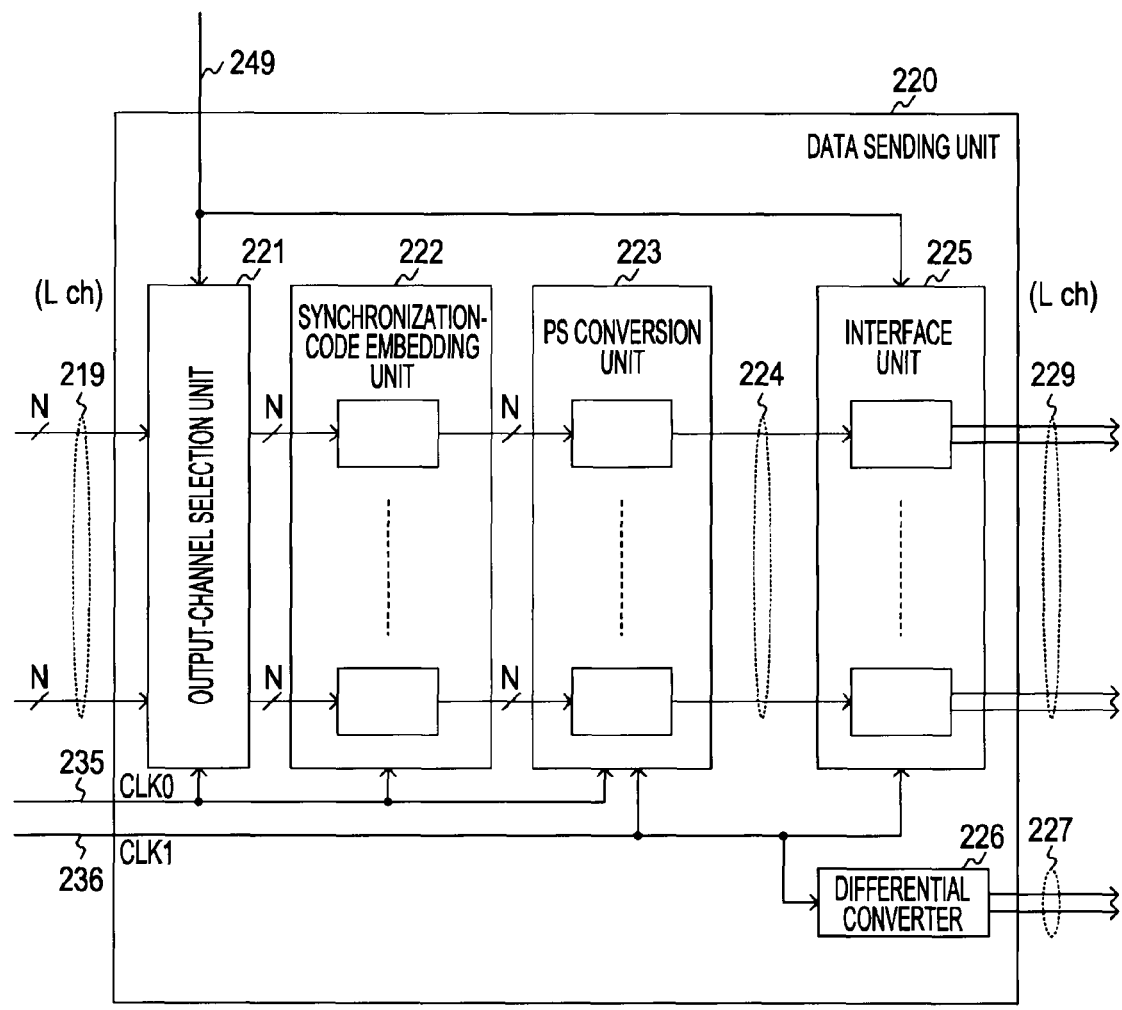
FIG. 6 is a diagram showing an exemplary structure of a data sending unit 220 in the embodiment of the present invention.

FIG. 6 is a diagram showing an exemplary structure of the data sending unit 220 in the embodiment of the present invention. This data sending unit 220 includes an output-channel selection unit 221, a synchronization-code embedding unit 222, a PS (parallel/serial) conversion unit 223, an interface unit 225, and a differential converter 226.

The output-channel selection unit 221 is a unit that selects a channel to be used for output in accordance with a command coming from the image-pickup control unit 240 via the signal line 249. Here, this output-channel selection unit 221 may be provided in the sensor unit 210, or may be provided at the latter stage of the synchronization-code embedding unit 222 or PS conversion unit 223.

The synchronization-code embedding unit 222 is a unit that embeds a synchronization code as a breakpoint of image pickup signals. This synchronization code is a code that indicates the start and end of data valid as image pickup signals. Here, this synchronization-code embedding unit 222 may be arranged at the latter stage of the PS conversion unit 223.

For each of the L channels, the PS conversion unit 223 is a unit that performs serial conversion on an n-bit parallel signal in the N-bit signal line of the channel so as to be one bit. This serial-conversion result is output to a signal line 224. The signal line 224 is constituted by L channels in total, one bit per channel.

The interface unit 225 is a unit that converts signals, one bit per channel, in the signal line 224 into differential signals and outputs the differential signals to the signal line 229. The signal line 229 is, as described above, a high-speed interface which transmits differential signals according to, for example, the LVDS transmission scheme. Moreover, the signal line 249 from the image-pickup control unit 240 is supplied to the interface unit 225, and power is controlled not to be supplied to circuits relating to the channels except for necessary channels, among the circuits in the interface unit 225. Because of this, when the number of channels is decreased and an operation is performed, power consumption can be reduced.

The differential converter 226 is a converter that converts the high-speed clock CLK1 into differential signals, and outputs the differential signals to the signal line 227.

In this data sending unit 220, the output-channel selection unit 221 and the synchronization-code embedding unit 222 operate in accordance with the reference clock CLK0, the PS conversion unit 223 operates according to both the reference clock CLK0 and the high-speed clock CLK1, and the interface unit 225 operates in accordance with the high-speed clock CLK1.

Figure 7:
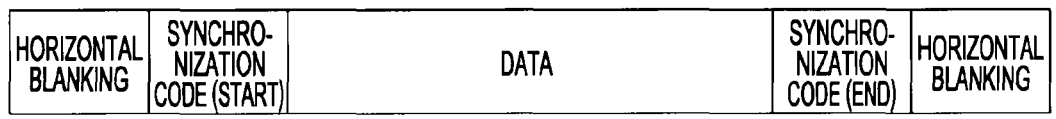
FIG. 7 includes diagrams showing an exemplary format of an image pickup signal in the embodiment of the present invention.
Figure 7:
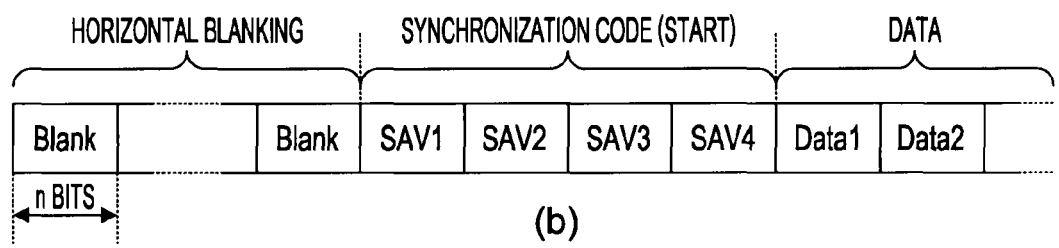
Figure 7:
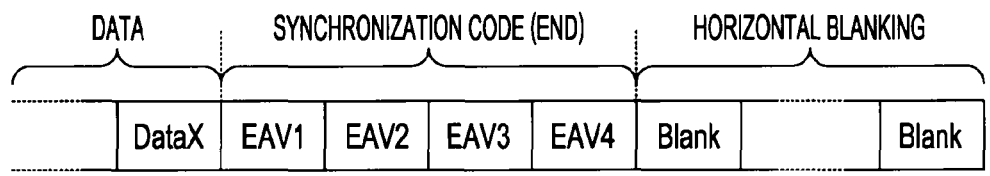
Figure 7:

FIG. 7 includes diagrams showing an exemplary format of an image pickup signal in the embodiment of the present invention. As shown in Part (a) of FIG. 7, in an image pickup signal for one line in the horizontal direction, it is assumed that horizontal blanking, a synchronization code (start), data, a synchronization code (end), and horizontal blanking are placed in this order. The horizontal blanking is a code indicating a period in which valid data is not included. The synchronization code is a code indicating the start and the end of the data for one line.

As shown in Part (b) and Part (c) of FIG. 7, each of the horizontal blanking, the synchronization code, and the data is arranged in units of n bits. In particular, the synchronization code indicates four n-bit codes (SAV (Start of Active Video) 1 through SAV4) at the start of the data, and indicates four n-bit codes (EAV (End of Active Video) 1 through EAV4) at the end of the data.

Moreover, as shown in Part (d) of FIG. 7, it is assumed that each data is sent from the MSB (Most Significant Bit) side. Here, if an agreement has been made between a receiving side and a sending side in advance, each data may be sent from the LSB (Least Significant Bit) side.

FIG. 8 includes diagrams showing an exemplary format of a synchronization code in the embodiment of the present invention. Here, as a synchronization code, it is assumed that a code based on standards (BT.656, BT.601) according to ITU (International Telecommunication Union) is utilized, and a case in which the bit length n is 12 bits will be described.

This synchronization code is constituted by four 12-bit codes. All 12 bits of the first code are "1". All 12 bits of the second and third codes are "0". As shown in Part (a) of FIG. 8, the bits of the fourth code are "1", F, V, H, P3, P2, P1, P0, "0", "0", "0", and "0" from the MSB side.

The bit F is a bit for classifying a field. If the bit F is "0", it indicates an odd field (field 1), and if the bit F is "1", it indicates an even field (field 2).

The bit V is a bit for indicating a timing in the vertical direction. If the bit V is "0", it indicates a valid video area except for vertical blanking, and if the bit V is "1", it indicates a vertical blanking period.

The bit H is a bit for indicating a timing in the horizontal direction. If the bit H is "0", it indicates the synchronization code for the start of the data, and if the bit H is "1", it indicates the synchronization code for the end of the data.

The bits P0 through P3 are protection bits, and hold a CRC (Cyclic Redundancy Check) code corresponding to each of the value of the bits F, V, and H, as shown in Part (b) of FIG. 8.

Figure 9:
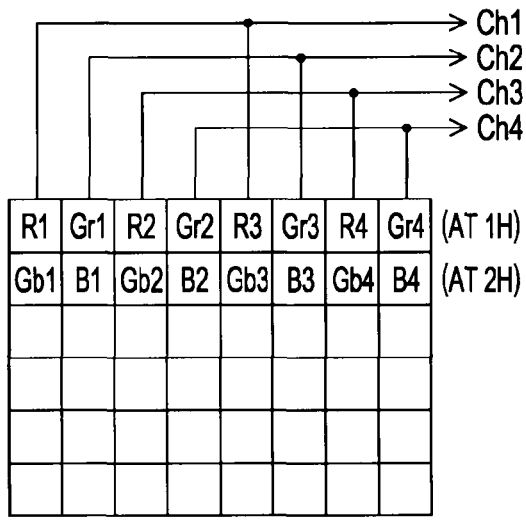
FIG. 9 includes diagrams showing an example of the correspondence relationship between operation channels and pixels in the embodiment of the present invention.
Figure 9:
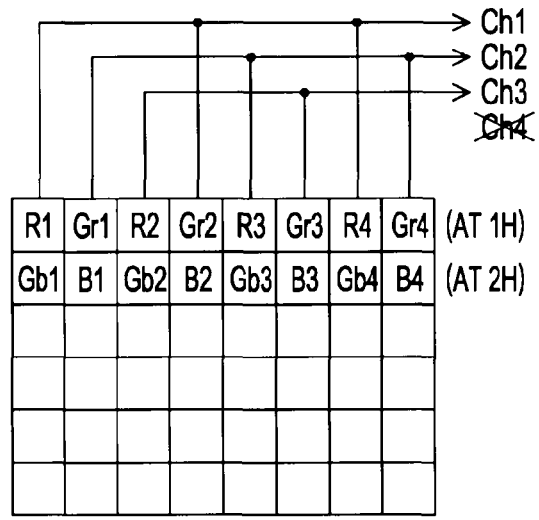
Figure 9:
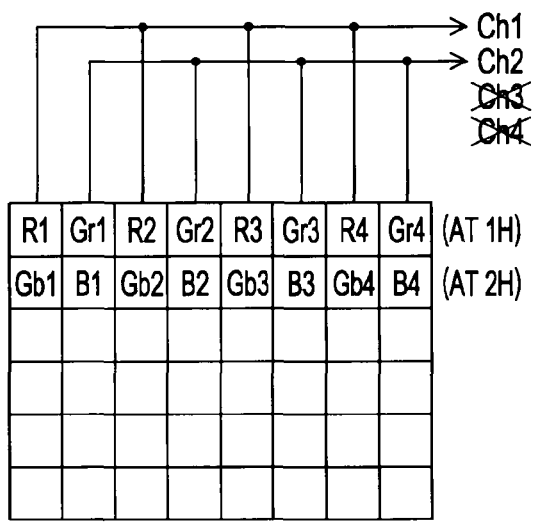
Figure 9:
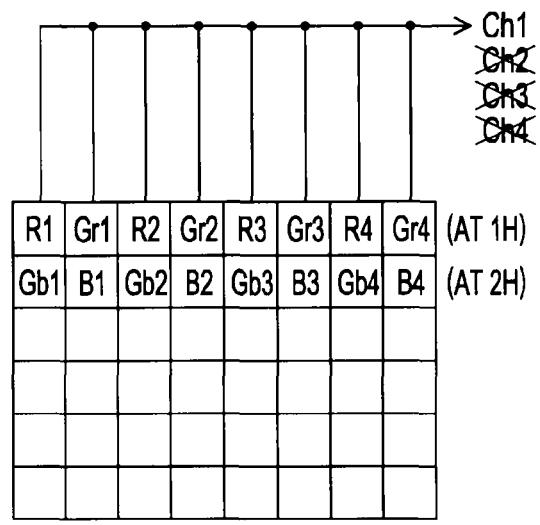

FIG. 9 includes diagrams showing an example of the correspondence relationship between operation channels and pixels in the embodiment of the present invention. Here, an example will be described in which the number of operation channels W (W is a natural number) of the signal line 229 is changed from "4" to "1" and each of the pixels in the Bayer pattern is transferred.

In a case in which the number of operation channels W is "4", as shown in Part (a) of FIG. 9, in the first line, the image pickup signal of a pixel R1, the image pickup signal of a pixel Gr1, the image pickup signal of a pixel R2, and the image pickup signal of a pixel Gr2 are output to a first channel, a second channel, a third channel, and a fourth channel, respectively. Next, the image pickup signal of a pixel R3, the image pickup signal of a pixel Gr3, the image pickup signal of a pixel R4, and the image pickup signal of a pixel Gr4 are output to the first channel, the second channel, the third channel and the fourth channel, respectively. Thereafter, in the second line, the image pickup signal of a pixel Gb1, the image pickup signal of a pixel B1, the image pickup signal of a pixel Gb2, and the image pickup signal of a pixel B2 are output to the first channel, the second channel, the third channel, and the fourth channel, respectively. Next, the image pickup signal of a pixel Gb3, the image pickup signal of a pixel B3, the image pickup signal of a pixel Gb4, and the image pickup signal of a pixel B4 are output to the first channel, the second channel, the third channel, and the fourth channel, respectively.

In a case in which the number of operation channels W is "3", as shown in Part (b) of FIG. 9, in the first line, the image pickup signal of the pixel R1, the image pickup signal of the pixel Gr1, and the image pickup signal of the pixel R2 are output to the first channel, the second channel, and the third channel, respectively. Next, the image pickup signal of the pixel Gr2, the image pickup signal of the pixel R3, and the image pickup signal of the pixel Gr3 are output to the first channel, the second channel, and the third channel, respectively. Thereafter, in the second line, the image pickup signal of the pixel Gb1, the image pickup signal of the pixel B9, and the image pickup signal of the pixel Gb2 are output to the first channel, the second channel, and the third channel, respectively. Next, the image pickup signal of the pixel B2, the image pickup signal of the pixel Gb3, and the image pickup signal of the pixel B3 are output to the first channel, the second channel, and the third channel, respectively.

In a case in which the number of operation channels W is "2", as shown in Part (c) of FIG. 9, in the first line, the image pickup signal of the pixel R1 and the image pickup signal of the pixel Gr1 are output to the first channel ant the second channel, respectively. Next, the image pickup signal of the pixel R2 and the image pickup signal of the pixel Gr2 are output to the first channel and the second channel, respectively. Thereafter, in the second line, the image pickup signal of the pixel Gb1 and the image pickup signal of the pixel B1 are output to the first channel and the second channel, respectively. Next, the image pickup signal of the pixel Gb2 and the image pickup signal of the pixel B2 are output to the first channel and the second channel, respectively.

In a case in which the number of operation channels W is "1", as shown in Part (d) of FIG. 9, in the first line, the pixels R1, Gr1, R2, and Gr2 are output to the first channel in this order. Thereafter, in the second line, the pixels Gb1, B1, Gb2, and B2 are output to the first channel in this order.

In this way, when the number of operation channels changes, for each of the pixels, a channel to which the pixel is output changes as necessary.

Figure 10:
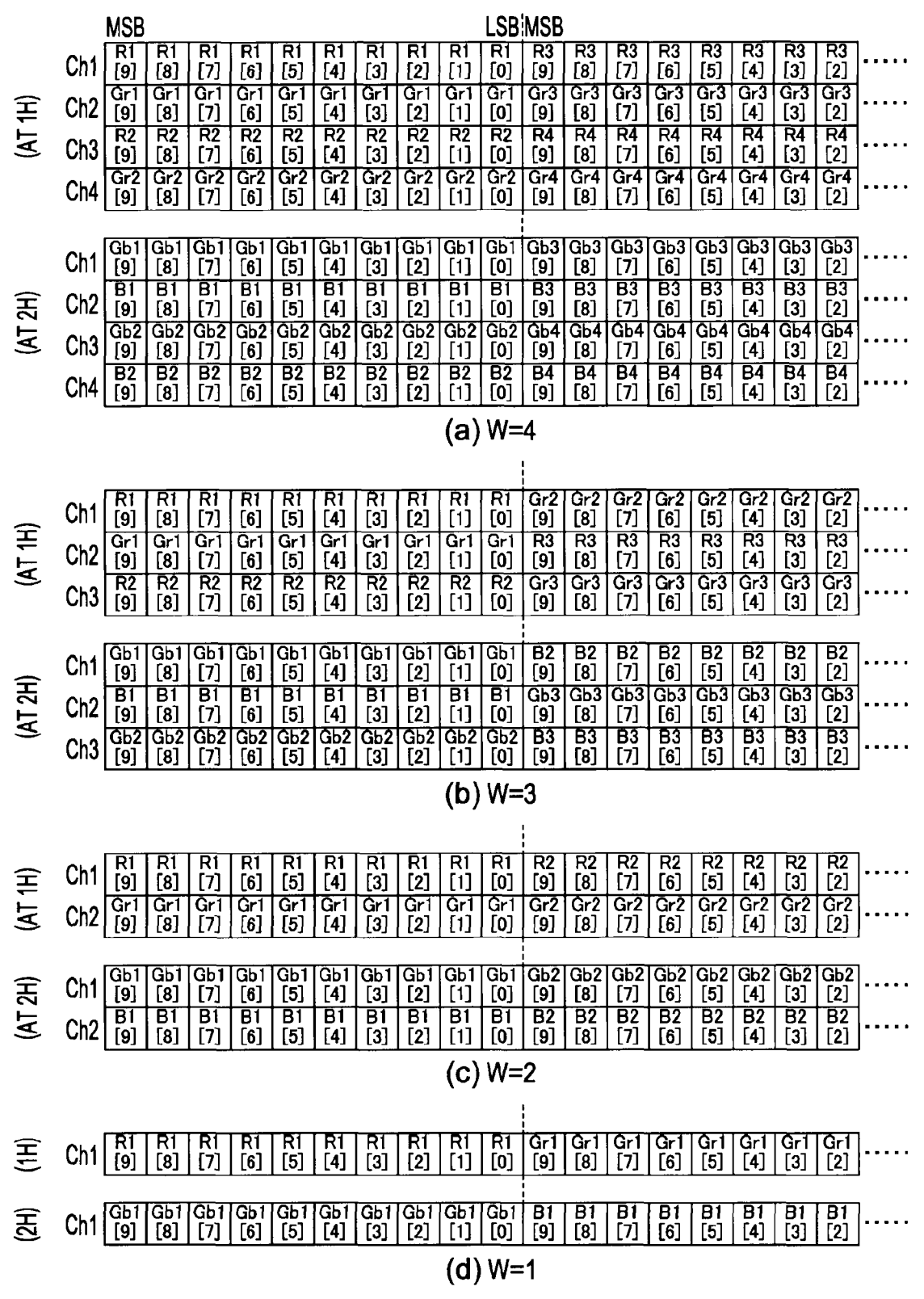

FIG. 10 includes diagrams showing an example of the correspondence relationship between operation channels and the bit arrangement of image pickup signals in the embodiment of the present invention. These diagrams show exemplary bit arrangements of image pickup signals output from the interface unit 225 in a case in which the bit length n of the data is 10 bits.

In a case in which the number of operation channels W is "4", as shown in Part (a) of FIG. 10, in the first line, the image pickup signal of the pixel R1, the image pickup signal of the pixel Gr1, the image pickup signal of the pixel R2, and the image pickup signal of the pixel Gr2 are output to the first channel, the second channel, the third channel, and the fourth channel, respectively, and each of the image pickup signals is output in order from the MSB side. Next, the image pickup signal of the pixel R3, the image pickup signal of the pixel Gr3, the image pickup signal of the pixel R4, and the image pickup signal of the pixel Gr4 are output to the first channel, the second channel, the third channel, and the fourth channel, respectively, and each of the image pickup signals is output in order from the MSB side. Thereafter, in the second line, the image pickup signal of the pixel Gb1, the image pickup signal of the pixel B1, the image pickup signal of the pixel Gb2, and the image pickup signal of the pixel B2 are output to the first channel, the second channel, the third channel, and the fourth channel, respectively, and each of the image pickup signals is output in order from the MSB side. Next, the image pickup signal of the pixel R1, the image pickup signal of the pixel Gr1, the image pickup signal of the pixel R2, and the image pickup signal of the pixel Gr2 are output to the first channel, the second channel, the third channel, and the fourth channel, respectively, and each of the image pickup signals is output in order from the MSB side. Next, the image pickup signal of the pixel Gb3, the image pickup signal of the pixel B3, the image pickup signal of the pixel Gb4, and the image pickup signal of the pixel B4 are output to the first channel, the second channel, the third channel, and the fourth channel, respectively, and each of the image pickup signals is output in order from the MSB side.

In a case in which the number of operation channels W is "3", as shown in Part (b) of FIG. 10, in the first line, the image pickup signal of the pixel R1, the image pickup signal of the pixel Gr1, and the image pickup signal of the pixel R2 are output to the first channel, the second channel, and the third channel, respectively, and each of the image pickup signals is output in order from the MSB side. Next, the image pickup signal of the pixel Gr2, the image pickup signal of the pixel R3, and the image pickup signal of the pixel Gr3 are output to the first channel, the second channel, and the third channel, respectively, and each of the image pickup signals is output in order from the MSB side. Thereafter, in the second line, the image pickup signal of the pixel Gb1, the image pickup signal of the pixel B1, and the image pickup signal of the pixel Gb2 are output to the first channel, the second channel, and the third channel, respectively, and each of the image pickup signals is output in order from the MSB side. Next, the image pickup signal of the pixel B2, the image pickup signal of the pixel Gb3, and the image pickup signal of the pixel B3 are output to the first channel, the second channel, and the third channel, respectively, and each of the image pickup signals is output in order from the MSB side.

In a case in which the number of operation channels W is "2", as shown in Part (c) of FIG. 10, in the first line, the image pickup signal of the pixel R1 and the image pickup signal of the pixel Gr1 are output to the first channel and the second channel, respectively, and each of the image pickup signals is output in order from the MSB side. Next, the image pickup signal of the pixel R2 and the image pickup signal of the pixel Gr2 are output to the first channel and the second channel, respectively, and each of the image pickup signals is output in order from the MSB side. Thereafter, in the second line, the image pickup signal of the pixel Gb1 and the image pickup signal of the pixel B1 are output to the first channel and the second channel, respectively, and each of the image pickup signals is output in order from the MSB side. Next, the image pickup signal of the pixel Gb2 and the image pickup signal of the pixel B2 are output to the first channel and the second channel, respectively, and each of the image pickup signals is output in order from the MSB side.

In a case in which the number of operation channels W is "1", as shown in Part (d) of FIG. 10, in the first line, each of the image pickup signal of the pixel R1 and the image pickup signal of the pixel Gr1 is output in this order from the MSB side. Thereafter, in the second line, each of the image pickup signal of the pixel Gb1 and the image pickup signal of the pixel B1 is output in this order from the MSB side.

Figure 11:
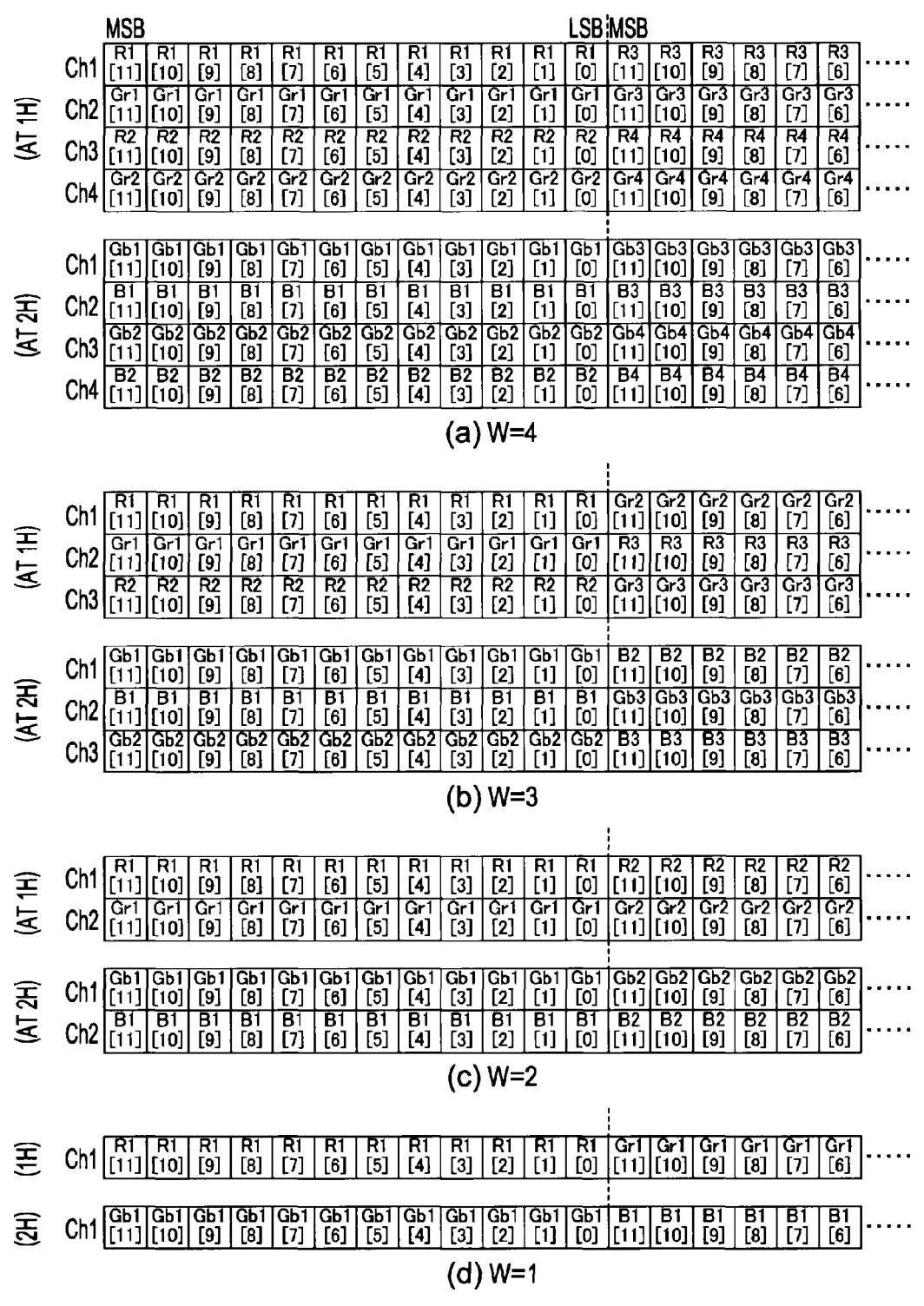

FIG. 11 includes diagrams showing another example of the correspondence relationship between operation channels and the bit arrangement of image pickup signals in the embodiment of the present invention. These diagrams show exemplary bit arrangements of image pickup signals output from the interface unit 225 in a case in which the bit length n of the data is 12 bits. However, the fundamental arrangement is similar except that the bit length n is different from FIG. 10, and thus the description thereof will be omitted.

Figure 12:
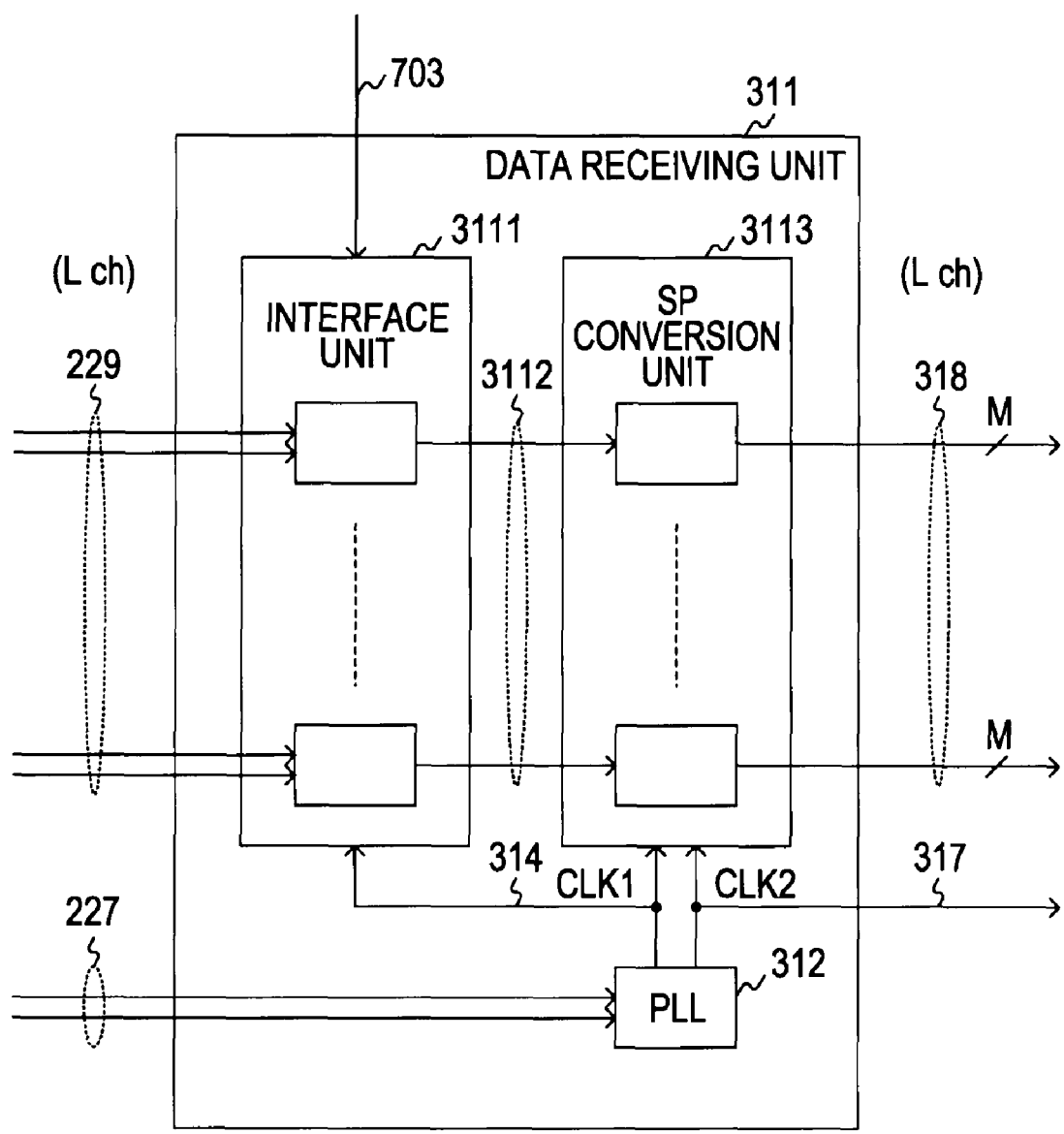
FIG. 12 is a diagram showing an exemplary structure of a data receiving unit 311 in the embodiment of the present invention.

FIG. 12 is a diagram showing an exemplary structure of the data receiving unit 311 in the embodiment of the present invention. This data receiving unit 311 includes the PLL circuit 312, an interface unit 3111, and an SP (serial/parallel) conversion unit 3113.

The PLL circuit 312 is a circuit that converts the high-speed clock which is the differential signals supplied via the signal line 227 into the high-speed clock CLK1, which is not differential signals, and a normal clock CLK2. The clock CLK2 is a clock whose frequency band can be handled by a normal logic circuit and which has a sufficient speed as an image processing speed at the latter stage. The high-speed clock CLK1 is supplied to the interface unit 3111 and the SP conversion unit 3113 via a signal line 314, and the clock CLK2 is supplied to the SP conversion unit 3113, the data reconstruction unit 500, and the clock gating circuit 330 via the signal line 317.

The interface unit 3111 is a unit that converts the image pickup signals which are differential signals sent through the signal line 229 into serial signals which are not differential signals. A conversion result from this interface unit 3111 is output to a signal line 3112. This interface unit 3111 is driven by the high-speed clock CLK1.

Moreover, the signal line 703 from the system control unit 700 is supplied to the interface unit 3111, and power is controlled not to be supplied to circuits relating to the channels except for necessary channels, among the circuits in the interface unit 3111. Because of this, when the number of channels is decreased and an operation is performed, power consumption can be reduced.

The SP conversion unit 3113 is a unit that performs parallel conversion on the serial signals output to the signal line 3112. This SP conversion unit 3113 performs the parallel conversion according to the high-speed clock CLK1, and thus it is assumed that the SP conversion unit 3113 is not a normal logic circuit and is implemented in an analog macro configuration. Thus, this SP conversion unit 3113 once performs the parallel conversion to obtain data in units of M bits without recognizing a synchronization code. The bit width M after the parallel conversion does not need to match the bit length n of the image pickup signals. The data after the parallel conversion is supplied to the data reconstruction unit 500 through the signal line 318 according to the clock CLK2. That is, the frequency of the data on which the parallel conversion has been performed by this SP conversion unit 3113 falls within a frequency band which can be handled by a normal logic circuit.

Figure 13:
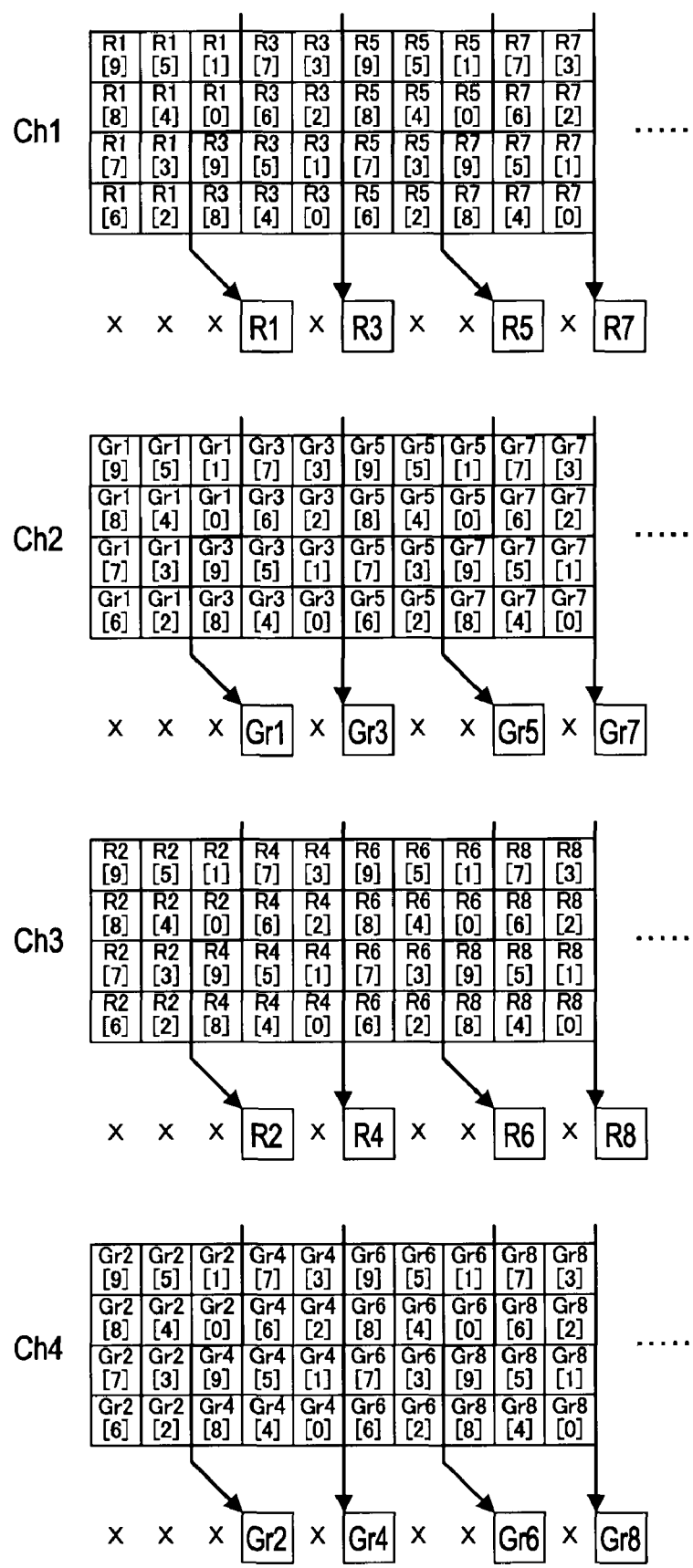
FIG. 13 is a diagram showing a first example of timings for image pickup signals at the time of data reception in the embodiment of the present invention.

FIG. 13 is a diagram showing a first example of timings for image pickup signals at the time of data reception in the embodiment of the present invention. This example is an example in a case in which the bit length n of image pickup signals is 10 bits and the number of operation channels W is four. The bit width M after the parallel conversion is 4 bits.

In this example, at the fourth clock from the beginning, the image pickup signal of the pixel R1, the image pickup signal of the pixel Gr1, the image pickup signal of the pixel R2, and the image pickup signal of the pixel Gr2 are output to the first channel, the second channel, the third channel, and the fourth channel, respectively. Then, at the sixth clock, the image pickup signal of the pixel R3, the image pickup signal of the pixel Gr3, the image pickup signal of the pixel R4, and the image pickup signal of the pixel Gr4 are output to the first channel, the second channel, the third channel, and the fourth channel, respectively. Then, at the ninth clock, the image pickup signal of a pixel R5, the image pickup signal of a pixel Gr5, the image pickup signal of a pixel R6, and the image pickup signal of a pixel Gr6 are output to the first channel, the second channel, the third channel, and the fourth channel, respectively. Then, at the eleventh clock, the image pickup signal of a pixel R7, the image pickup signal of a pixel Gr7, the image pickup signal of a pixel R8, and the image pickup signal of a pixel Gr8 are output to the first channel, the second channel, the third channel, and the fourth channel, respectively.

Figure 14:
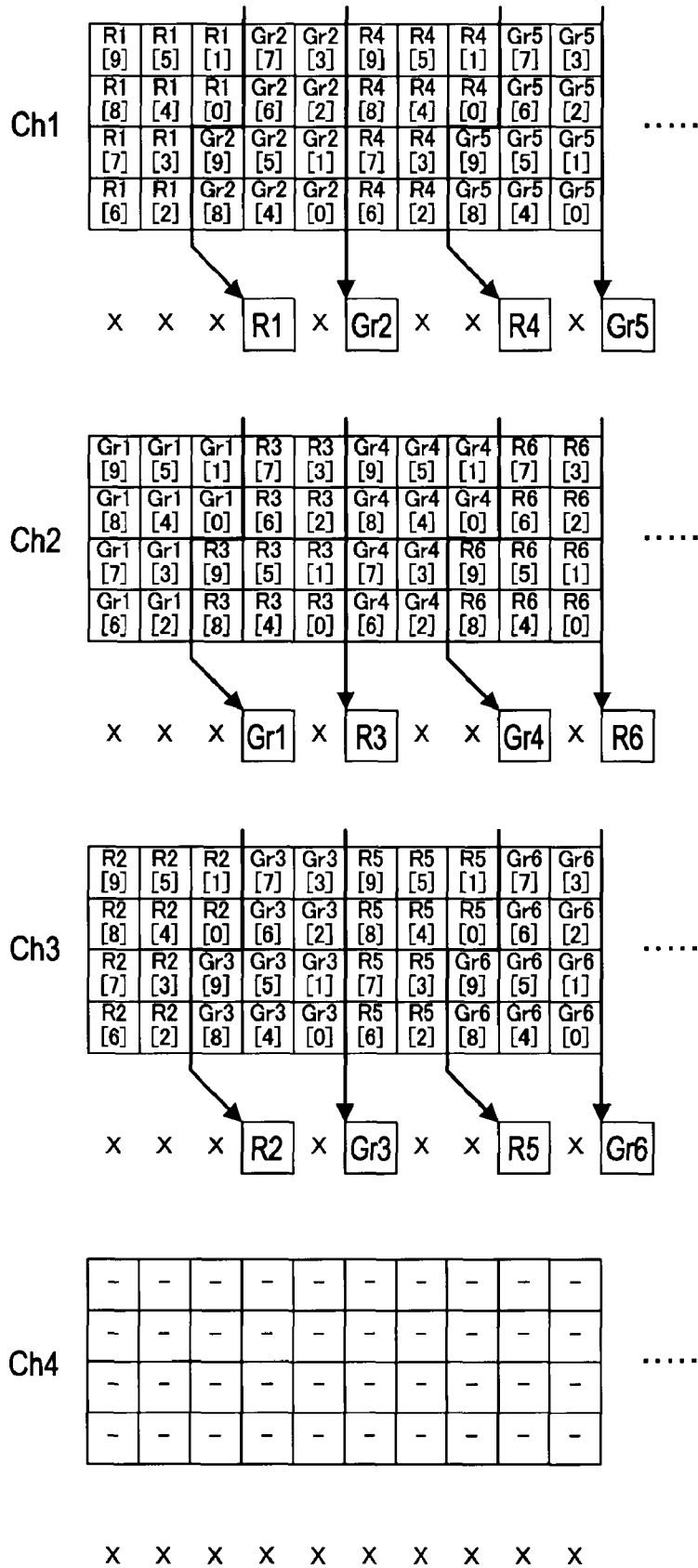
FIG. 14 is a diagram showing a second example of timings for image pickup signals at the time of data reception in the embodiment of the present invention.

FIG. 14 is a diagram showing a second example of timings for image pickup signals at the time of data reception in the embodiment of the present invention. This example is an example in a case in which the bit length n of image pickup signals is 10 bits and the number of operation channels W is three. The bit width M after the parallel conversion is 4 bits.

In this example, at the fourth clock from the beginning, the image pickup signal of the pixel R1, the image pickup signal of the pixel Gr1, and the image pickup signal of the pixel R2 are output to the first channel, the second channel, and the third channel, respectively. Then, at the sixth clock, the image pickup signal of the pixel Gr2, the image pickup signal of the pixel R3, and the image pickup signal of the pixel Gr3 are output to the first channel, the second channel, and the third channel, respectively. Then, at the ninth clock, the image pickup signal of the pixel R4, the image pickup signal of the pixel Gr4, and the image pickup signal of the pixel R5 are output to the first channel, the second channel, and the third channel, respectively. Then, at the eleventh clock, the image pickup signal of the pixel Gr5, the image pickup signal of the pixel R6, and the image pickup signal of the pixel Gr6 are output to the first channel, the second channel, and the third channel, respectively.

Figure 15:
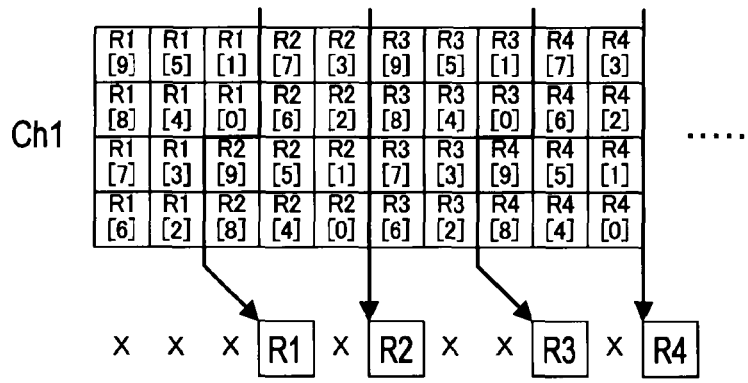
FIG. 15 is a diagram showing a third example of timings for image pickup signals at the time of data reception in the embodiment of the present invention.
Figure 15:
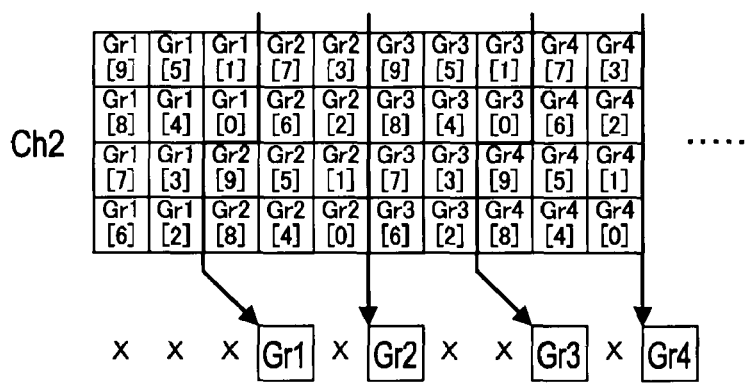
Figure 15:
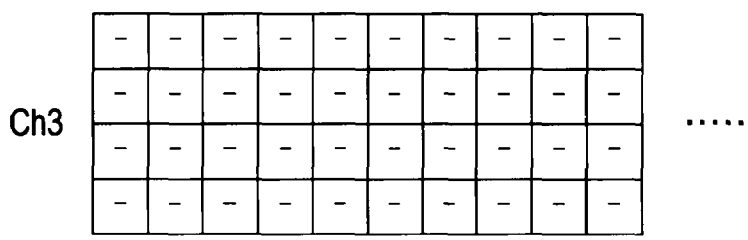
Figure 15:
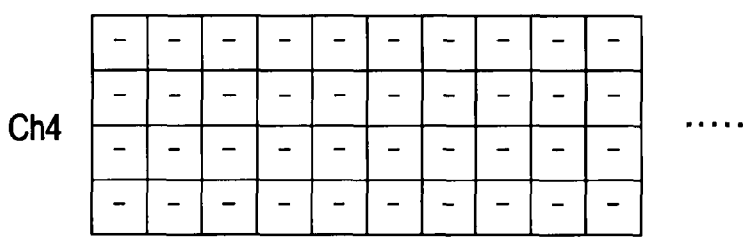

FIG. 15 is a diagram showing a third example of timings for image pickup signals at the time of data reception in the embodiment of the present invention. This example is an example in a case in which the bit length n of image pickup signals is 10 bits and the number of operation channels W is two. The bit width M after the parallel conversion is 4 bits.

In this example, at the fourth clock from the beginning, the image pickup signal of the pixel R1 and the image pickup signal of the pixel Gr1 are output to the first channel and the second channel, respectively. Then, at the sixth clock, the image pickup signal of the pixel R2 and the image pickup signal of the pixel Gr2 are output to the first channel and the second channel, respectively. Then, at the ninth clock, the image pickup signal of the pixel R3 and the image pickup signal of the pixel Gr3 are output to the first channel and the second channel, respectively. Then, at the eleventh clock, the image pickup signal of the pixel R4 and the image pickup signal of the pixel Gr4 are output to the first channel and the second channel, respectively.

Figure 16:
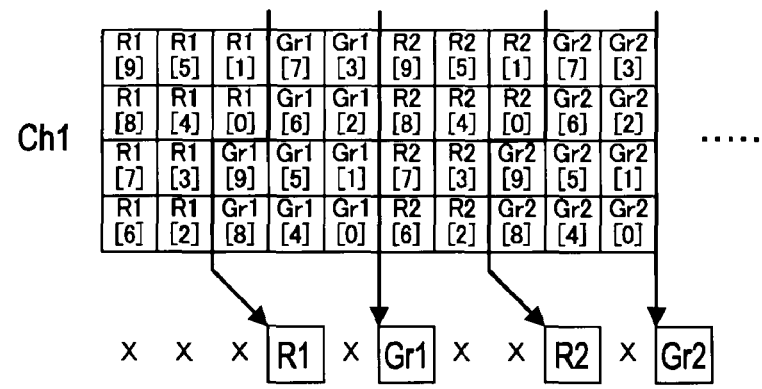
FIG. 16 is a diagram showing a fourth example of timings for image pickup signals at the time of data reception in the embodiment of the present invention.
Figure 16:
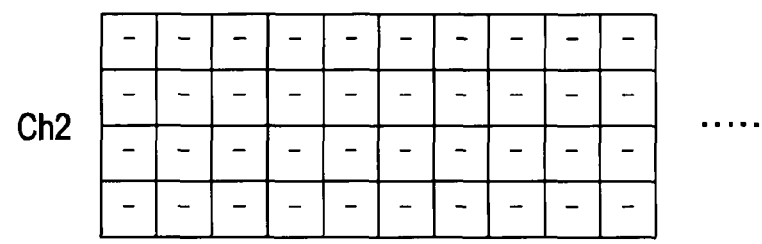
Figure 16:
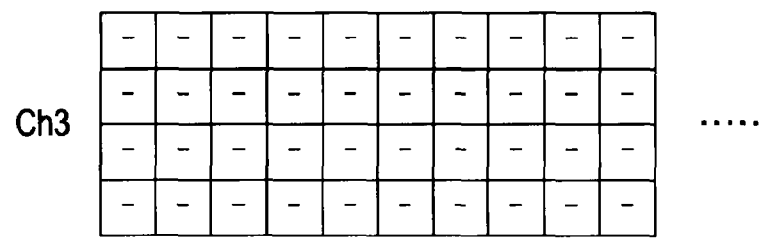
Figure 16:
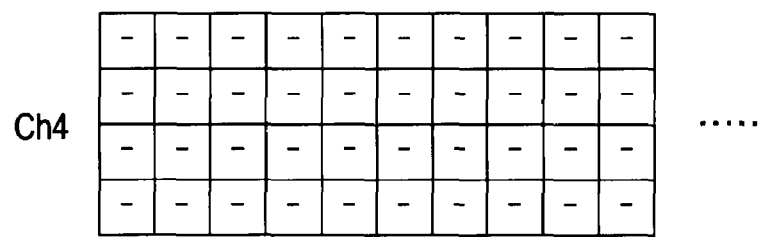

FIG. 16 is a diagram showing a fourth example of timings for image pickup signals at the time of data reception in the embodiment of the present invention. This example is an example in a case in which the bit length n of image pickup signals is 10 bits and the number of operation channels W is one. The bit width M after the parallel conversion is 4 bits.

In this example, at the fourth clock from the beginning, the image pickup signal of the pixel R1 is output to the first channel. Then, at the sixth clock, the image pickup signal of the pixel Gr1 is output to the first channel. Then, at the ninth clock, the image pickup signal of the pixel R2 is output to the first channel. Then, at the eleventh clock, the image pickup signal of the pixel Gr2 is output to the first channel.

Figure 17:
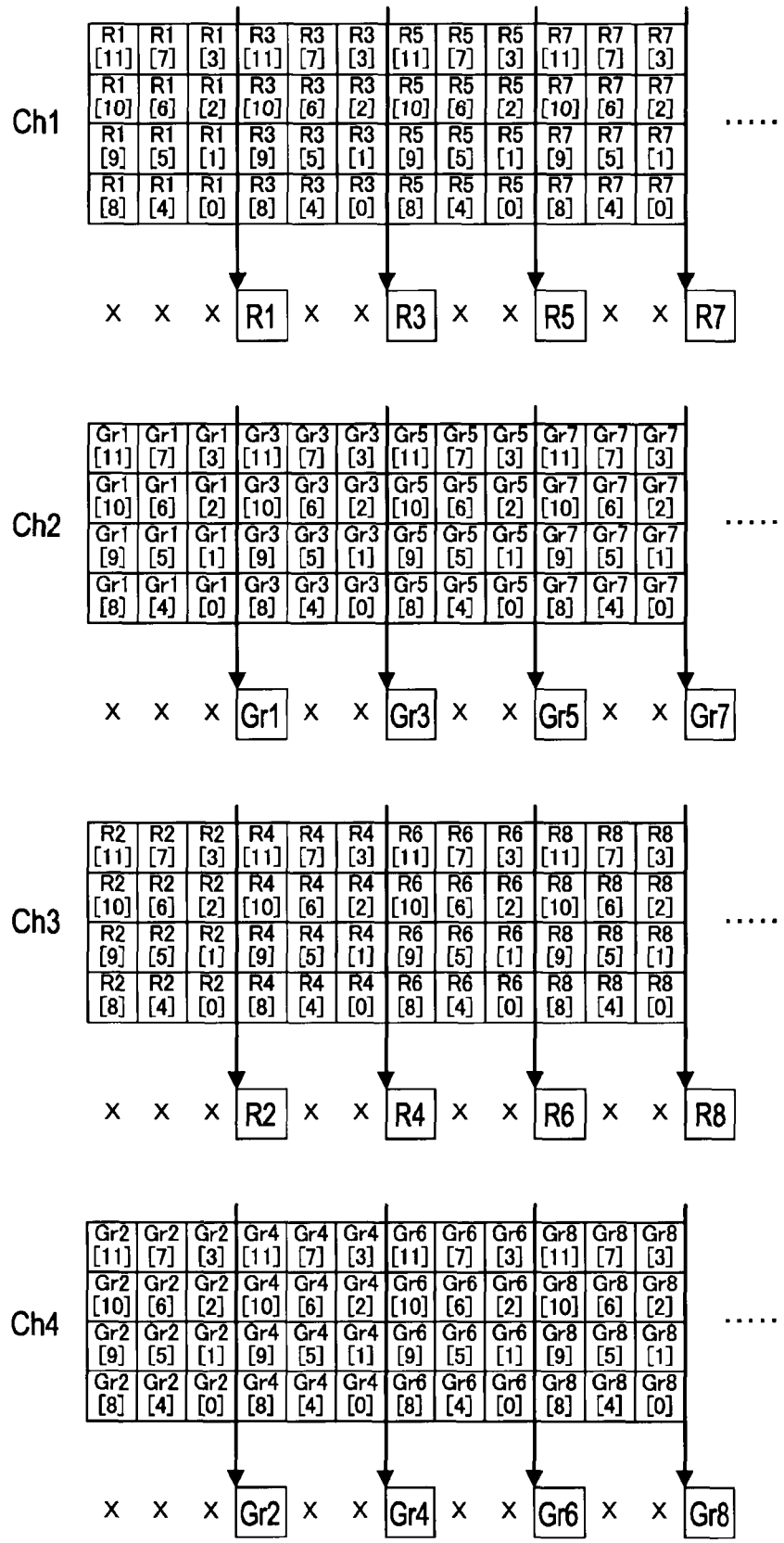
FIG. 17 is a diagram showing a fifth example of timings for image pickup signals at the time of data reception in the embodiment of the present invention.

FIG. 17 is a diagram showing a fifth example of timings for image pickup signals at the time of data reception in the embodiment of the present invention. This example is an example in a case in which the bit length n of image pickup signals is 12 bits and the number of operation channels W is four. The bit width M after the parallel conversion is 4 bits.

In this example, at the fourth clock from the beginning, the image pickup signal of the pixel R1, the image pickup signal of the pixel Gr1, the image pickup signal of the pixel R2, and the image pickup signal of the pixel Gr2 are output to the first channel, the second channel, the third channel, and the fourth channel, respectively. Then, at the seventh clock, the image pickup signal of the pixel R3, the image pickup signal of the pixel Gr3, the image pickup signal of the pixel R4, and the image pickup signal of the pixel Gr4 are output to the first channel, the second channel, the third channel, and the fourth channel, respectively. Then, at the tenth clock, the image pickup signal of the pixel R5, the image pickup signal of the pixel Gr5, the image pickup signal of the pixel R6, and the image pickup signal of the pixel Gr6 are output to the first channel, the second channel, the third channel, and the fourth channel, respectively. Then, at the thirteenth clock, the image pickup signal of the pixel R7, the image pickup signal of the pixel Gr7, the image pickup signal of the pixel R8, and the image pickup signal of the pixel Gr8 are output to the first channel, the second channel, the third channel, and the fourth channel, respectively.

Figure 18:
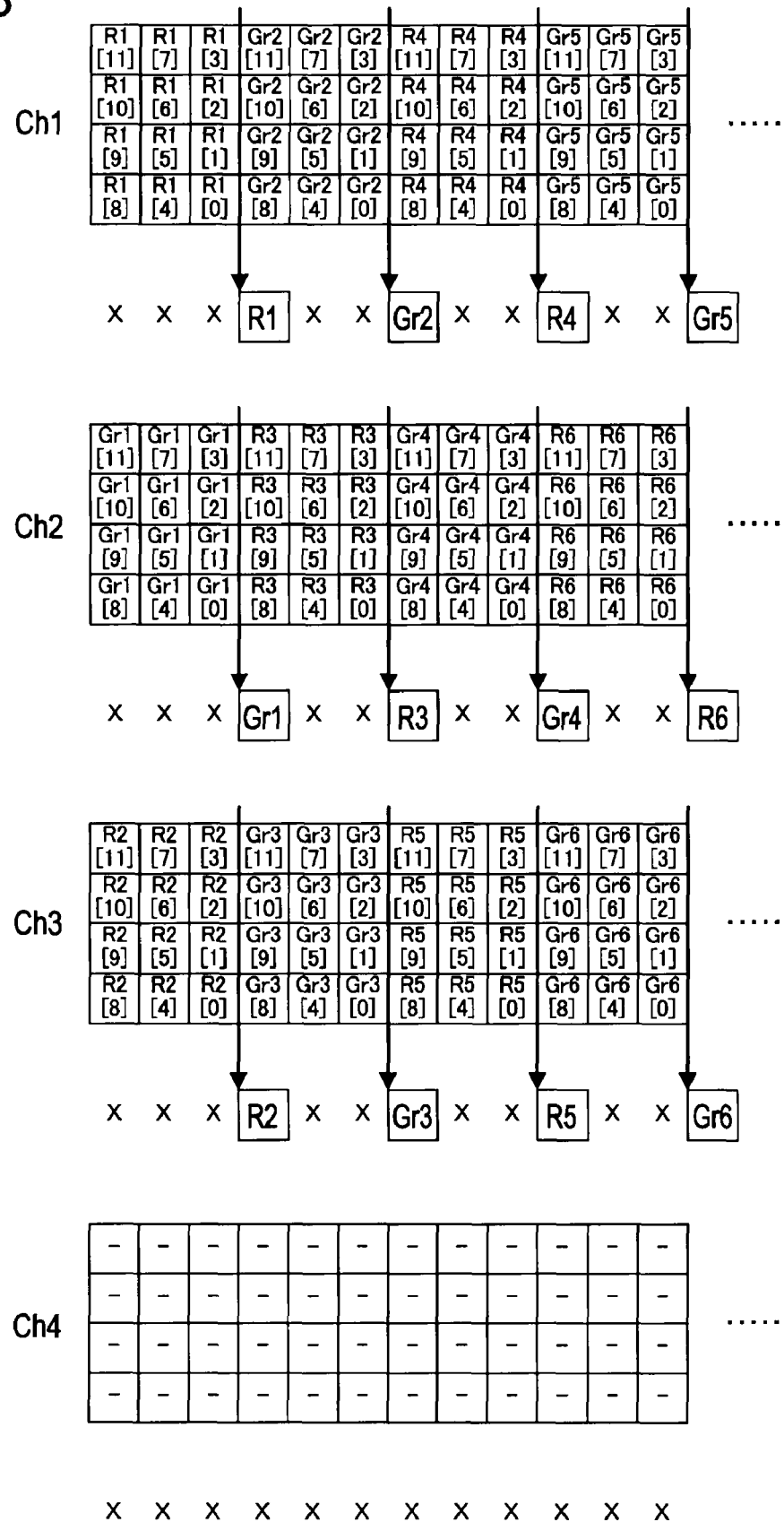
FIG. 18 is a diagram showing a sixth example of timings for image pickup signals at the time of data reception in the embodiment of the present invention.

FIG. 18 is a diagram showing a sixth example of timings for image pickup signals at the time of data reception in the embodiment of the present invention. This example is an example in a case in which the bit length n of image pickup signals is 12 bits and the number of operation channels W is three. The bit width M after the parallel conversion is 4 bits.

In this example, at the fourth clock from the beginning, the image pickup signal of the pixel R1, the image pickup signal of the pixel Gr1, and the image pickup signal of the pixel R2 are output to the first channel, the second channel, and the third channel, respectively. Then, at the seventh clock, the image pickup signal of the pixel Gr2, the image pickup signal of the pixel R3, and the image pickup signal of the pixel Gr3 are output to the first channel, the second channel, and the third channel, respectively. Then, at the tenth clock, the image pickup signal of the pixel R4, the image pickup signal of the pixel Gr4, and the image pickup signal of the pixel R5 are output to the first channel, the second channel, and the third channel, respectively. Then, at the thirteenth clock, the image pickup signal of the pixel Gr5, the image pickup signal of the pixel R6, and the image pickup signal of the pixel Gr6 are output to the first channel, the second channel, and the third channel, respectively.

Figure 19:
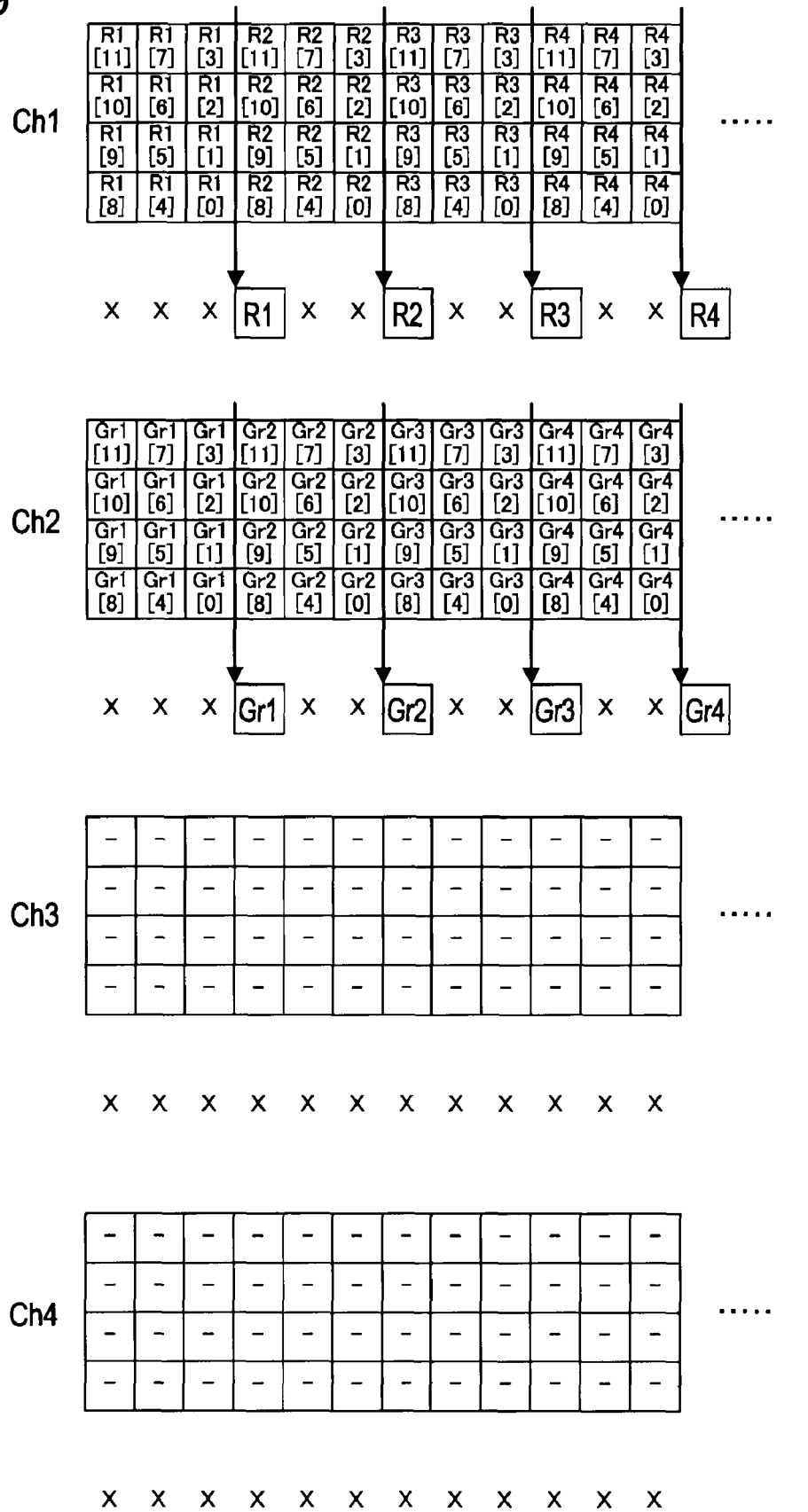
FIG. 19 is a diagram showing a seventh example of timings for image pickup signals at the time of data reception in the embodiment of the present invention.

FIG. 19 is a diagram showing a seventh example of timings for image pickup signals at the time of data reception in the embodiment of the present invention. This example is an example in a case in which the bit length n of an image pickup signal is 12 bits and the number of operation channels W is two. The bit width M after the parallel conversion is 4 bits.

In this example, at the fourth clock from the beginning, the image pickup signal of the pixel R1 and the image pickup signal of the pixel Gr1 are output to the first channel and the second channel, respectively. Then, at the seventh clock, the image pickup signal of the pixel R2 and the image pickup signal of the pixel Gr2 are output to the first channel and the second channel, respectively. Then, at the tenth clock, the image pickup signal of the pixel R3 and the image pickup signal of the pixel Gr3 are output to the first channel and the second channel, respectively. Then, at the thirteenth clock, the image pickup signal of the pixel R4 and the image pickup signal of the pixel Gr4 are output to the first channel and the second channel, respectively.

FIG. 20 is a diagram showing an eighth example of timings for image pickup signals at the time of data reception in the embodiment of the present invention. This example is an example in a case in which the bit length n of image pickup signals is 12 bits and the number of operation channels W is one. The bit width M after the parallel conversion is 4 bits.

In this example, at the fourth clock from the beginning, the image pickup signal of the pixel R1 is output to the first channel. Then, at the seventh clock, the image pickup signal of the pixel Gr1 is output to the first channel. Then, at the tenth clock, the image pickup signal of the pixel R2 is output to the first channel. Then, at the thirteenth clock, the image pickup signal of the pixel Gr2 is output to the first channel.

As is clear from the examples of FIG. 13 through FIG. 20, in a case in which the parallel conversion is performed on the image pickup signals of bit length n to obtain image pickup signals of bit width M, the output of the image pickup signal of each of the pixels is completed in n/M clocks. That is, in the above-described examples, when the bit length n is 10 bits and the bit width M is 4 bits, output is obtained at a timing of every 10/4=2.5 clocks (FIG. 13 through FIG. 16), and when the bit length n is 12 bits and the bit width M is 4 bits, output is obtained at a timing of every 12/4=3 clocks (FIG. 17 through FIG. 20). Thus, even if the SP conversion unit 3113 does not perform reconstruction into n bits at once, the original data can be reconstructed by relaying data by regularly latching the data at these timings at the latter stage.

Figure 21:
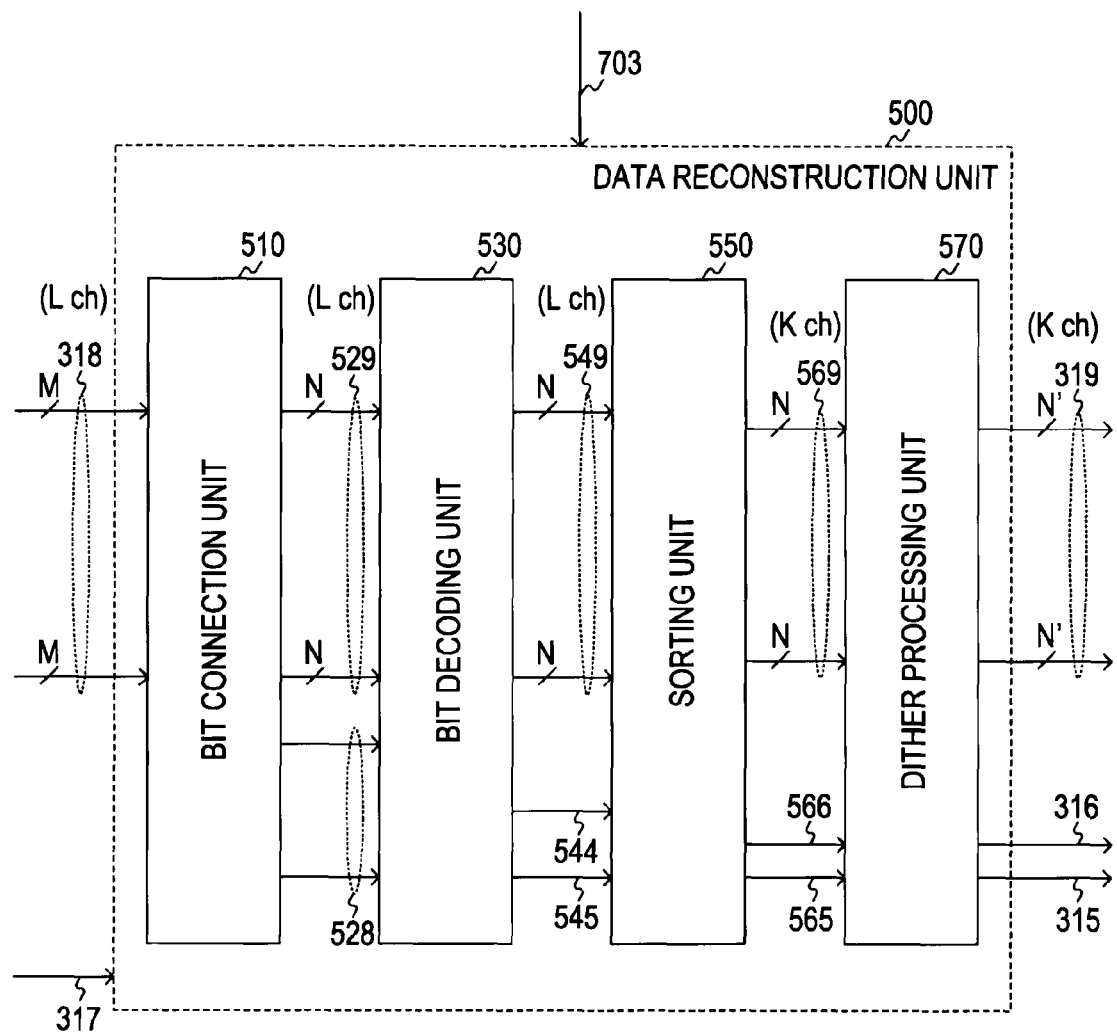
FIG. 21 is a diagram showing an exemplary structure of a data reconstruction unit 500 in the embodiment of the present invention.

FIG. 21 is a diagram showing an exemplary structure of the data reconstruction unit 500 in the embodiment of the present invention. This data reconstruction unit 500 includes a bit connection unit 510, a bit decoding unit 530, a sorting unit 550, and a dither processing unit 570.

The bit connection unit 510 is a unit that detects a synchronization code from W parallel signals of bit width M supplied from the data receiving unit 311 and extracts W data windows of N bits in accordance with the timing of the synchronization code. A data window denotes a portion having a possibility of containing a valid image pickup signal in a bit string obtained by relaying (connecting) parallel signals. These data windows are supplied to the bit decoding unit 530 through a signal line 529. Moreover, the timing of the synchronization code is supplied to the bit decoding unit 530 through a signal line 528.

In accordance with the bit length n of the image pickup signals, the bit decoding unit 530 is a unit that extracts W image pickup signals in the data windows supplied from the bit connection unit 510. These extracted image pickup signals are supplied to the sorting unit 550 through a signal line 549. Moreover, the bit decoding unit 530 generates a synchronization signal according to the timing of the synchronization code supplied from the bit connection unit 510. This generated synchronization signal is supplied to the sorting unit 550 through a signal line 545. Moreover, the bit decoding unit 530 has a counter which is reset according to the timing of the synchronization code supplied from the bit connection unit 510, and outputs a value held by the counter in accordance with the bit length n of the image pickup signals. This value held by the counter is supplied to the sorting unit 550 through a signal line 544.

The sorting unit 550 is a unit that sorts the W image pickup signals supplied from the bit decoding unit 530 in a format necessary for the processing in the signal processing unit 320. Here, as the format, for example, there are the number of channels, the sorting order of color (color sequence), and the like. When a new number of channels after the sorting is denoted by K, these sorted K image pickup signals are supplied to the dither processing unit 570 through a signal line 569. In this way, the sorting unit 550 has a function of interfacing between the image pickup signals reconstructed according to the present invention and the channels, color sequence, and the like of existing signal processing.

Moreover, the sorting unit 550 outputs a valid flag to a signal line 566 while a valid image pickup signal is supplied to the signal line 569. Here, the synchronization signal supplied from the bit decoding unit 530 to the sorting unit 550 is supplied to the dither processing unit 570 through a signal line 565.

The dither processing unit 570 is a unit that performs dither processing on each of the K image pickup signals supplied from the sorting unit 550 in order to change the bit length thereof to be the bit length necessary for the processing in the signal processing unit 320. More particularly, the bit length is adjusted by adding a random number at a predetermined bit position of each of the image pickup signals. These image pickup signals on which the dither processing has been performed are supplied to the signal processing unit 320 through the signal line 319. Here, the synchronization signal supplied from the sorting unit 550 to the dither processing unit 570 is supplied to the timing generation circuit 340 through the signal line 315. Moreover, the valid flag supplied from the sorting unit 550 to the dither processing unit 570 is supplied to the clock gating circuit 330 through the signal line 316.

Here, similarly to the data sending unit 220 and the data receiving unit 311, power is controlled not to be supplied to circuits relating to channels except for necessary channels with respect to this data reconstruction unit 500, too.

Figure 22:
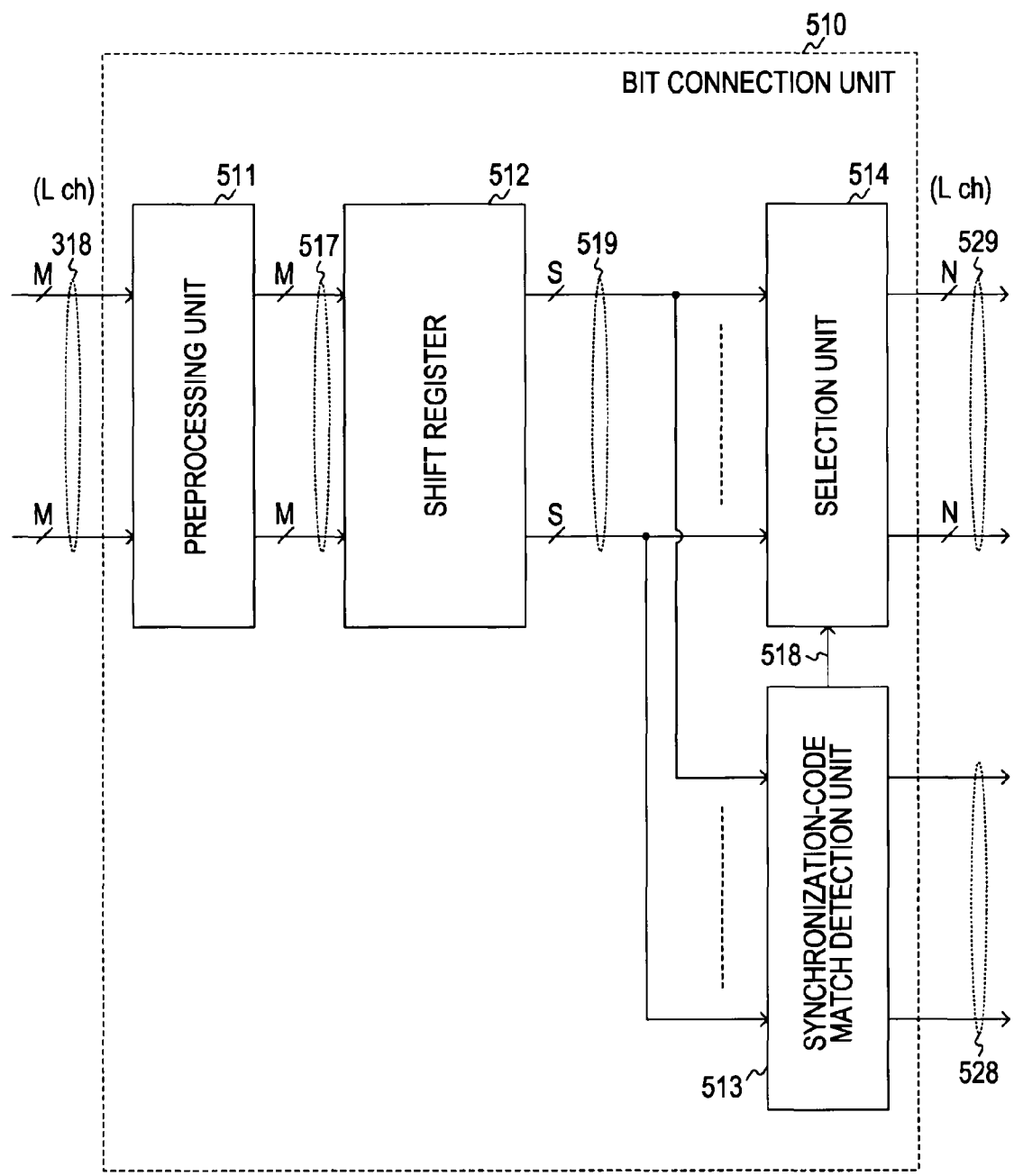
FIG. 22 is a diagram showing an exemplary structure of a bit connection unit 510 in the embodiment of the present invention.

FIG. 22 is a diagram showing an exemplary structure of the bit connection unit 510 in the embodiment of the present invention. This bit connection unit 510 includes a preprocessing unit 511, a shift register 512, a synchronization-code match detection unit 513, and a selection unit 514.

The preprocessing unit 511 is a unit that performs processing of changing connection from an input channel to an arbitrary channel, the input channel being from the data receiving unit 311. Because of this, high-speed transmission can be performed with an unrestricted channel arrangement in the signal line 229. Moreover, the preprocessing unit 511 has a function of forcedly lowering the signal of a channel which does not operate in accordance with an operation mode to a fixed value such as zero. Because of this, the handling of channels which are not operated need not be considered in the image pickup unit 200 and the data receiving unit 311. The image pickup signals on which preprocessing has been performed by this preprocessing unit 511 are supplied to the shift register 512 through a signal line 517.

The shift register 512 is a shift register that holds an image pickup signal for each of the channels supplied from the preprocessing unit 511 while shifting the image pickup signals in sequence. This shift register 512 is a shift register that holds data of S bits (S is a natural number) for each of the channels. What is held by this shift register 512 is supplied to the synchronization-code match detection unit 513 and the selection unit 514 through a signal line 519.

The synchronization-code match detection unit 513 is a unit that detects a match between what is held by the shift register 512 and a synchronization code. When the synchronization-code match detection unit 513 detects a synchronization code in any of operation channels, the synchronization-code match detection unit 513 supplies a selection signal to the selection unit 514 through a signal line 518, and also supplies the timing of the synchronization code to the bit decoding unit 530 through the signal line 528.

The selection unit 514 is a unit that extracts data windows from what is held by the shift register 512 according to the selection signal supplied from the synchronization-code match detection unit 513. These extracted data windows are supplied to the bit decoding unit 530 through the signal line 529.

Figure 23:
FIG. 23 is a diagram showing an example of data reception timing in the embodiment of the present invention.

FIG. 23 is a diagram showing an example of data reception timing in the embodiment of the present invention. This example is an example in a case in which the bit length n of image pickup signals is 10 bits.

Here, it is assumed that the bit width M after the parallel conversion is 4 bits, and thus four patterns, cases 1 through 4 of FIG. 23, can be considered as patterns for the timing. Thus, it is clear that, for synchronization codes, matches need to be detected so as to correspond to these four cases.

FIG. 24 is a diagram showing an example in a case in which parallel signals are held by the shift register 512 at timings corresponding to the case 1 of FIG. 23. In this case, if addresses starting from "0" are assigned from the LSB side of the shift register 512, the fourth code of the synchronization code can be obtained from address 12 to address 3 at the next clock after the top 31 bits of the synchronization code are detected from address 38 to address 8.

Then, after three clocks therefrom, the image pickup signal of the first pixel R1 is obtained from address 14 to address 5. Then, after two more clocks therefrom, the image pickup signal of the next pixel R5 is obtained from address 12 to address 3. Here, it is assumed that the number of operation channels W is four.

Figure 25:
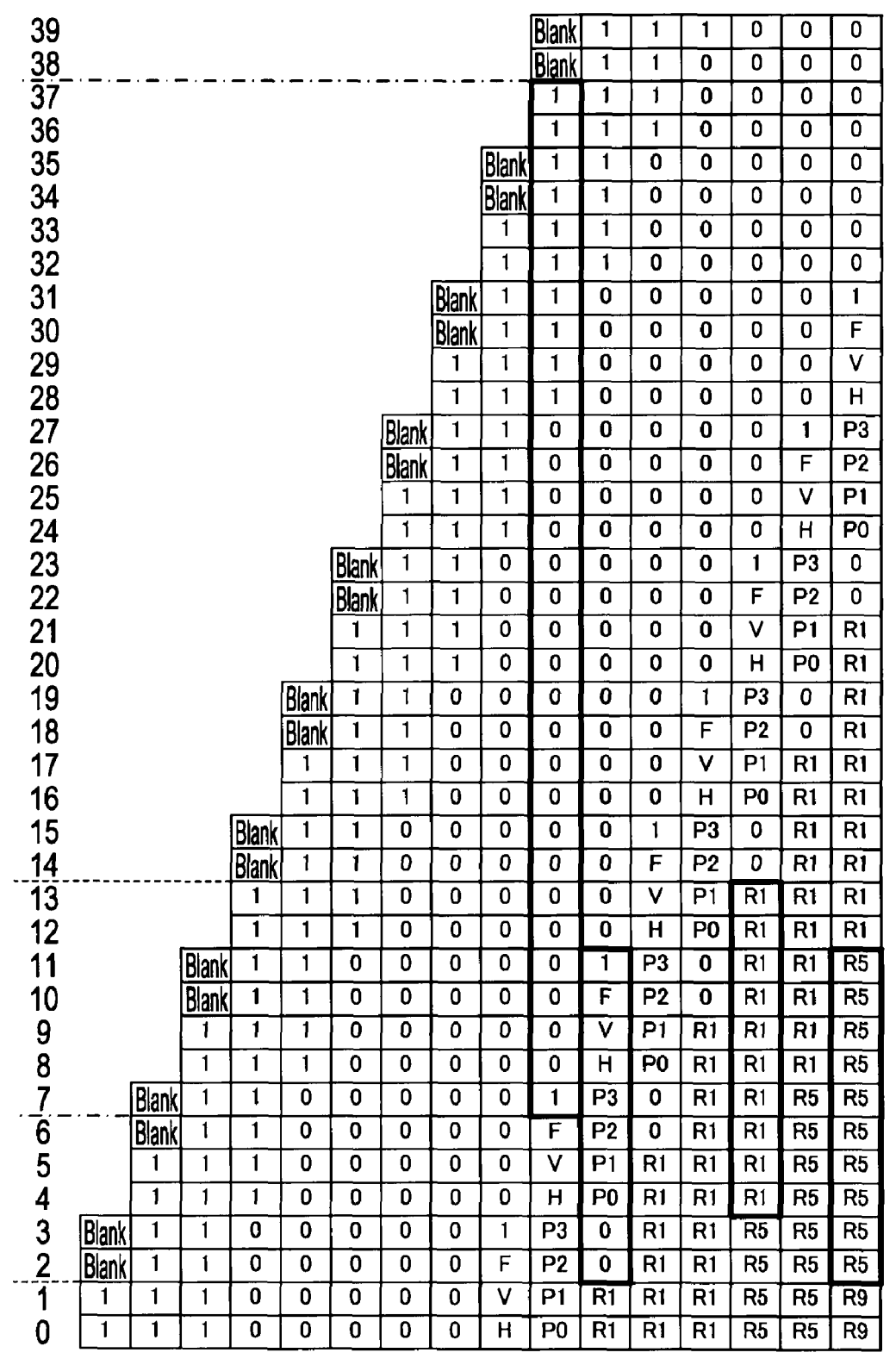

FIG. 25 is a diagram showing an example in a case in which parallel signals are held by the shift register 512 at timings corresponding to the case 2 of FIG. 23. In this case, the fourth code of the synchronization code can be obtained from address 11 to address 2 at the next clock after the top 31 bits of the synchronization code are detected from address 37 to address 7.

Then, after three clocks therefrom, the image pickup signal of the first pixel R1 is obtained from address 13 to address 4. Then, after two more clocks therefrom, the image pickup signal of the next pixel R5 is obtained from address 11 to address 2. Here, also in this case, it is assumed that the number of operation channels W is four.

FIG. 26 is a diagram showing an example in a case in which parallel signals are held by the shift register 512 at timings corresponding to the case 3 of FIG. 23. In this case, the fourth code of the synchronization code can be obtained from address 10 to address 1 at the next clock after the top 31 bits of the synchronization code are detected from address 36 to address 6.

Then, after three clocks therefrom, the image pickup signal of the first pixel R1 is obtained from address 12 to address 3. Then, after two more clocks therefrom, the image pickup signal of the next pixel R5 is obtained from address to address 1. Here, also in this case, it is assumed that the number of operation channels W is four.

FIG. 27 is a diagram showing an example in a case in which parallel signals are held by the shift register 512 at timings corresponding to the case 4 of FIG. 23. In this case, the fourth code of the synchronization code can be obtained from address 13 to address 4 at the next clock after the top 31 bits of the synchronization code are detected from address 39 to address 9.

Then, after three clocks therefrom, the image pickup signal of the first pixel R1 is obtained from address 15 to address 6. Then, after two more clocks therefrom, the image pickup signal of the next pixel R5 is obtained from address 13 to address 4. Here, also in this case, it is assumed that the number of operation channels W is four.

From these examples of FIG. 24 through FIG. 27, if it is assumed that the bit length n of the image pickup signals is 10 bits, it is clear that the data window is from address 14 to address 3 in a case in which the top 31 bits of the synchronization code is detected from address 38 to address 8 of the shift register 512, the data window is from address 13 to address 2 in a case in which the top 31 bits of the synchronization code is detected from address 37 to address 7, the data window is from address 12 to address 1 in a case in which the top 31 bits of the synchronization code is detected from address 36 to address 6, and the data window is from address 15 to address 4 in a case in which the top 31 bits of the synchronization code is detected from address 39 to address 9.

Figure 28:
FIG. 28 is a diagram showing another example of data reception timing in the embodiment of the present invention.

FIG. 28 is a diagram showing another example of data reception timing in the embodiment of the present invention. This example is an example in a case in which the bit length n of image pickup signals is 12 bits.

Here, it is assumed that the bit width M after the parallel conversion is 4 bits, and thus four patterns, cases 1 through 4 of FIG. 28, can be considered as patterns for the timing. Thus, it is clear that, for synchronization codes, matches need to be detected so as to correspond to these four cases.

FIG. 29 is a diagram showing an example in a case in which parallel signals are held by the shift register 512 at timings corresponding to the case 1 of FIG. 28. In this case, if addresses starting from "0" are assigned from the LSB side of the shift register 512, the fourth code of the synchronization code can be obtained from address 14 to address 3 at the next clock after the top 37 bits of the synchronization code are detected from address 46 to address 10.

Then, after three clocks therefrom, the image pickup signal of the first pixel R1 is obtained from address 14 to address 3. Then, after three more clocks therefrom, the image pickup signal of the next pixel R5 is obtained from address 14 to address 3. Here, it is assumed that the number of operation channels W is four.

FIG. 30 is a diagram showing an example in a case in which parallel signals are held by the shift register 512 at timings corresponding to the case 2 of FIG. 28. In this case, the fourth code of the synchronization code can be obtained from address 13 to address 2 at the next clock after the top 37 bits of the synchronization code are detected from address 45 to address 9.

Then, after three clocks therefrom, the image pickup signal of the first pixel R1 is obtained from address 13 to address 2. Then, after three more clocks therefrom, the image pickup signal of the next pixel R5 is obtained from address 13 to address 2. Here, also in this case, it is assumed that the number of operation channels W is four.

Figure 31:
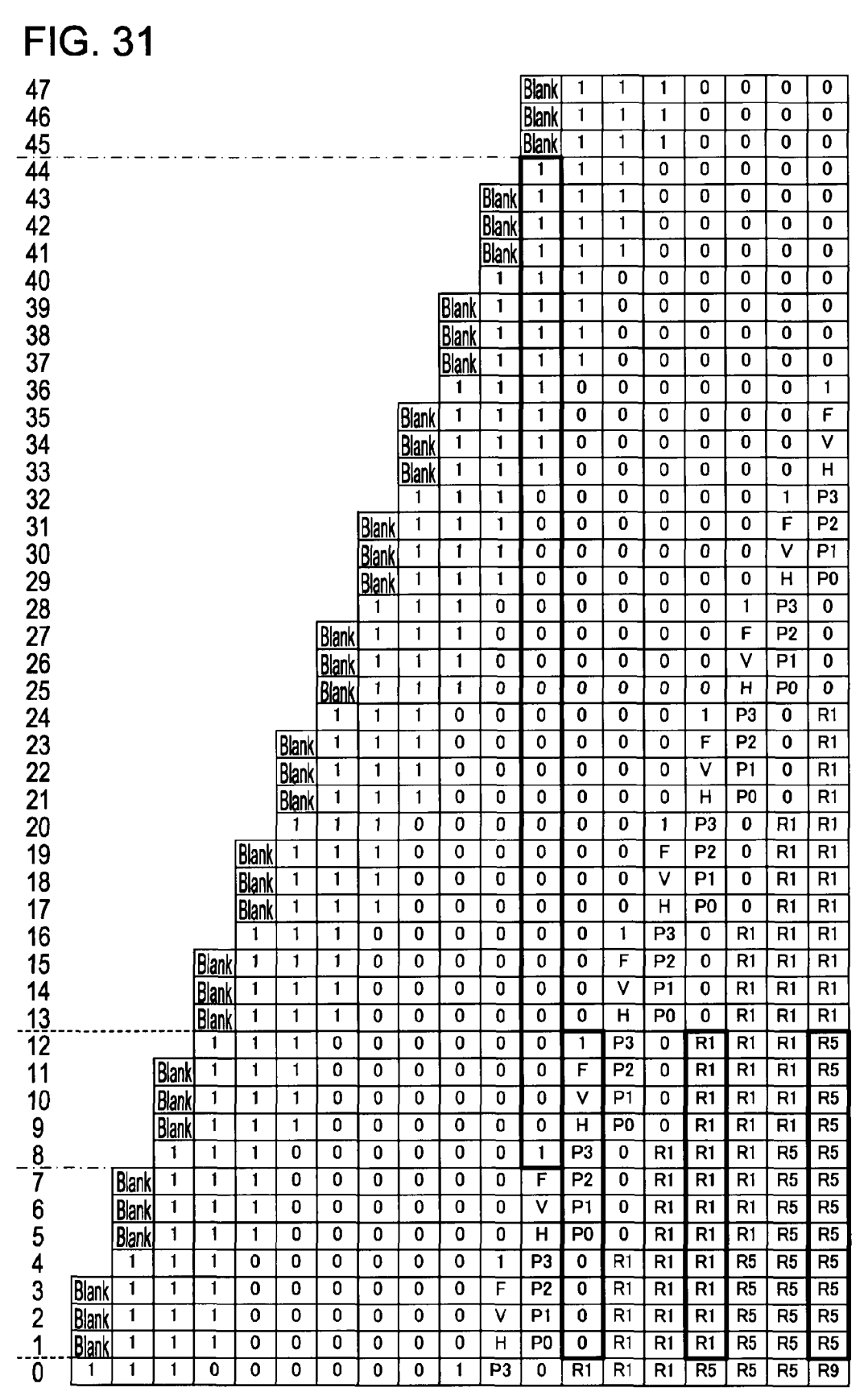

FIG. 31 is a diagram showing an example in a case in which parallel signals are held by the shift register 512 at timings corresponding to the case 3 of FIG. 28. In this case, the fourth code of the synchronization code can be obtained from address 12 to address 1 at the next clock after the top 37 bits of the synchronization code are detected from address 44 to address 8.

Then, after three clocks therefrom, the image pickup signal of the first pixel R1 is obtained from address 12 to address 1. Then, after three more clocks therefrom, the image pickup signal of the next pixel R5 is obtained from address 12 to address 1. Here, also in this case, it is assumed that the number of operation channels W is four.

FIG. 32 is a diagram showing an example in a case in which parallel signals are held by the shift register 512 at timings corresponding to the case 4 of FIG. 28. In this case, the fourth code of the synchronization code can be obtained from address 15 to address 4 at the next clock after the top 37 bits of the synchronization code are detected from address 47 to address 11.

Then, after three clocks therefrom, the image pickup signal of the first pixel R1 is obtained from address 15 to address 4. Then, after three more clocks therefrom, the image pickup signal of the next pixel R5 is obtained from address 15 to address 4. Here, also in this case, it is assumed that the number of operation channels W is four.

From these examples of FIG. 29 through FIG. 32, if it is assumed that the bit length n of the image pickup signals is 12 bits, it is clear that the data window is from address 14 to address 3 in a case in which the top 37 bits of the synchronization code is detected from address 46 to address 10 of the shift register 512, the data window is from address 13 to address 2 in a case in which the top 37 bits of the synchronization code is detected from address 45 to address 9, the data window is from address 12 to address 1 in a case in which the top 37 bits of the synchronization code is detected from address 44 to address 8, and the data window is from address 15 to address 4 in a case in which the top 37 bits of the synchronization code is detected from address 47 to address 11.

FIG. 33 includes diagrams showing examples of data windows for the signal line 529 in the embodiment of the present invention. Part (a) of FIG. 33 is an example of data windows in a case in which the bit length n is 10 bits. In this case, valid data can be obtained in units of five clocks as one cycle. That is, if it is assumed that a counter is reset by the fourth synchronization code, valid data can regularly be obtained in such a manner that the initial data is "3" and the next data is "0". Moreover, it is clear that 10 bits on the MSB side are valid data in a case in which the value held by the counter is "3" and 10 bits on the LSB side are valid data in a case in which the value held by the counter is "0".

Part (b) of FIG. 33 is an example of data windows in a case in which the bit length n is 12 bits. In this case, valid data can be obtained in units of six clocks as one cycle. That is, if it is assumed that a counter is reset by the fourth synchronization code, valid data can regularly be obtained in such a manner that the initial data is "3" and the next data is "0". Moreover, it is clear that, in any of the cases of the value held by the counter is "0" and "3", all the 12 bits of the data window are valid data.

Figure 34:
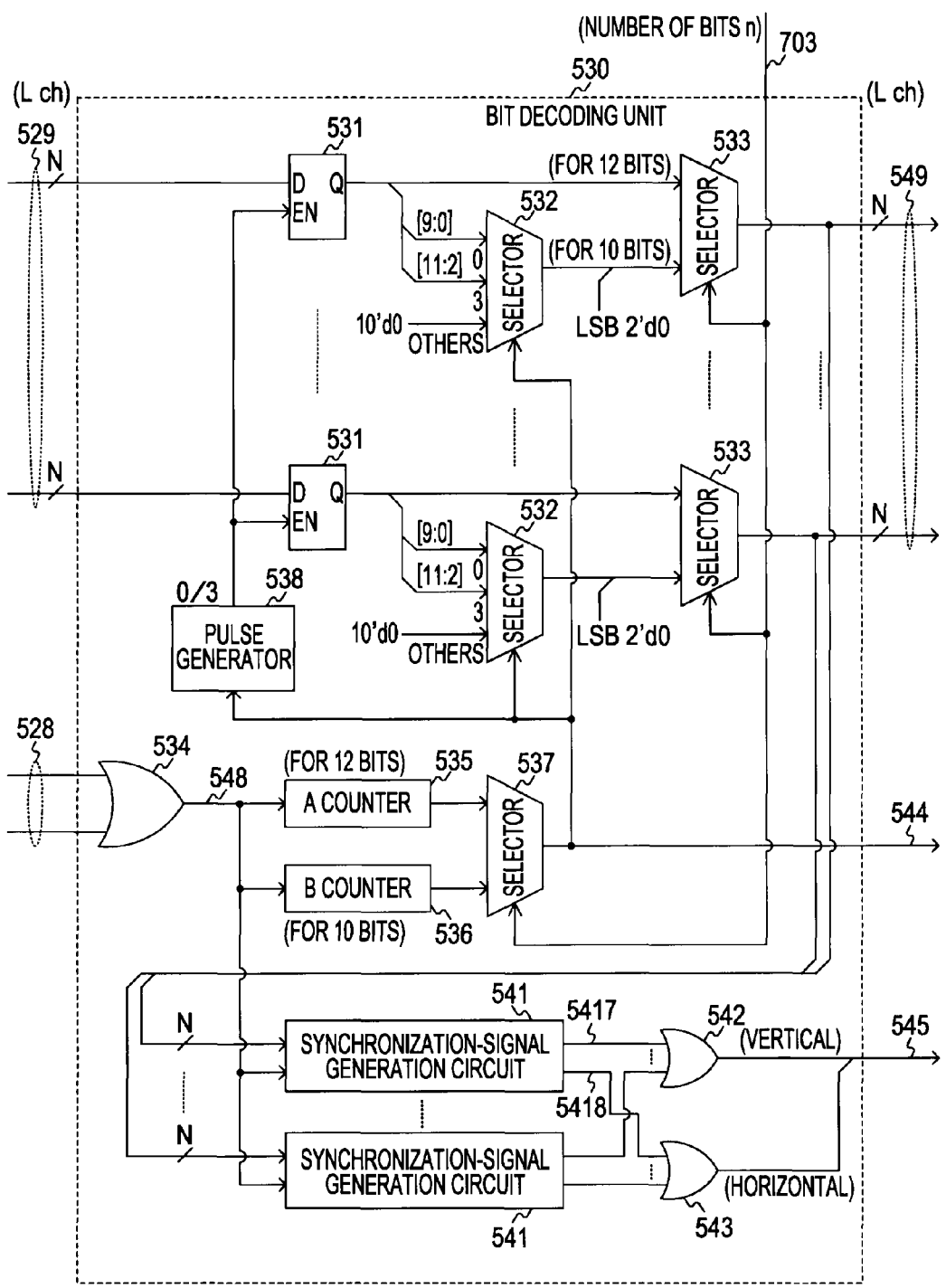
FIG. 34 is a diagram showing an exemplary structure of a bit decoding unit 530 in the embodiment of the present invention.

FIG. 34 is a diagram showing an exemplary structure of the bit decoding unit 530 in the embodiment of the present invention. This bit decoding unit 530 includes L D latches 531, L selectors 532, L selectors 533, a logical-sum (OR) circuit 534, an A counter 535, a B counter 536, a selector 537, L synchronization-signal generation circuits 541, and logical-sum circuits 542 and 543.

The D latch 531 is a latch that holds and outputs a data window supplied from the bit connection unit 510 at the timing of a pulse coming from a pulse generator 538. The pulse generator 538 is a generator that generates a pulse when the output of the selector 537 is "0" or "3". Thus, the D latch 531 holds and outputs the data window supplied from the bit connection unit 510 when the output of the selector 537 is "0" or "3".

The selector 532 is a selector that selects data of 10 bits from the data window in a case in which the bit length n of image pickup signals is 10 bits. That is, the selector 532 outputs 10 bits covering from the ninth bit to the zeroth bit of the data window in a case in which the output of the selector 537 is "0", 10 bits covering from the eleventh bit to the second bit of the data window in a case in which the output of the selector 537 is "3", and 10 bits of "0" in other cases, as appropriate. The 10 bits output from this selector 532 are shifted up by adding 2 bits of "0" at the bottom. Then, this shifted-up 12-bit data is one of input data to the selector 533.

The selector 533 is a selector that selects the output of the D latch 531 or the output of the selector 532 in accordance with the bit length n indicated via the signal line 703 from the system control unit 700. That is, the selector 533 selects the output of the D latch 531 if the bit length n is 12 bits, and selects the output of the selector 532 if the bit length n is 10 bits. The 12-bit data selected by this selector 533 is output to the signal line 549, and is also input to the synchronization-signal generation circuit 541.

The logical-sum circuit 534 is a circuit that generates a logical sum at the timing of the synchronization code supplied from the bit connection unit 510. That is, in a case in which a synchronization code is detected in any of the channels, the logical-sum circuit 534 outputs information regarding that to a signal line 548.

The A counter 535 is a counter that sequentially counts in units of six clocks from "0" to "5" as one cycle in synchronization with the clock CLK2. The B counter 536 is a counter that sequentially counts in units of five clocks from "0" to "4" as one cycle in synchronization with the clock CLK2. The A counter 535 is a counter used in a case in which the bit length n is 12 bit, and the B counter 536 is a counter used in a case in which the bit length n is 10 bits. The reset terminal of the A counter 535 and that of the B counter 536 are connected to the signal line 548, and when a synchronization code is detected in any of the channels, they are reset to "0".

The selector 537 is a selector that selects one of the output of the A counter 535 and that of the B counter 536 in accordance with the bit length n indicated via the signal line 703 from the system control unit 700. That is, this selector 537 selects the output of the A counter 535 when the bit length n is 12 bits, and selects the output of the B counter 536 when the bit length n is 10 bits. The selection result of this selector 537 is output to the signal line 544, and is also supplied to the pulse generator 538 and the selectors 532.

The synchronization-signal generation circuit 541 is a circuit that generates a synchronization signal from a synchronization code of the channel corresponding to the selector 533 in accordance with the timing when output is performed from the logical-sum circuit 534 to the signal line 548. Each of the L synchronization-signal generation circuits 541 outputs a vertical synchronization signal to a signal line 5417 and a horizontal synchronization signal to a signal line 5418.

The logical-sum circuit 542 is a circuit that generates a logical sum of vertical synchronization signals of the L synchronization-signal generation circuits 541. Moreover, the logical-sum circuit 543 is a circuit that generates a logical sum of horizontal synchronization signals of the L synchronization-signal generation circuits 541. A vertical synchronization signal and a horizontal synchronization signal, each of which has the logical sum generated by a corresponding one of these logical-sum circuits 542 and 543, are output to the signal line 545. Here, with respect to the logical-sum circuits 542 and 543, for example, by considering that a noise may enter a transmission line, they may be replaced with majority circuits.

Figure 35:
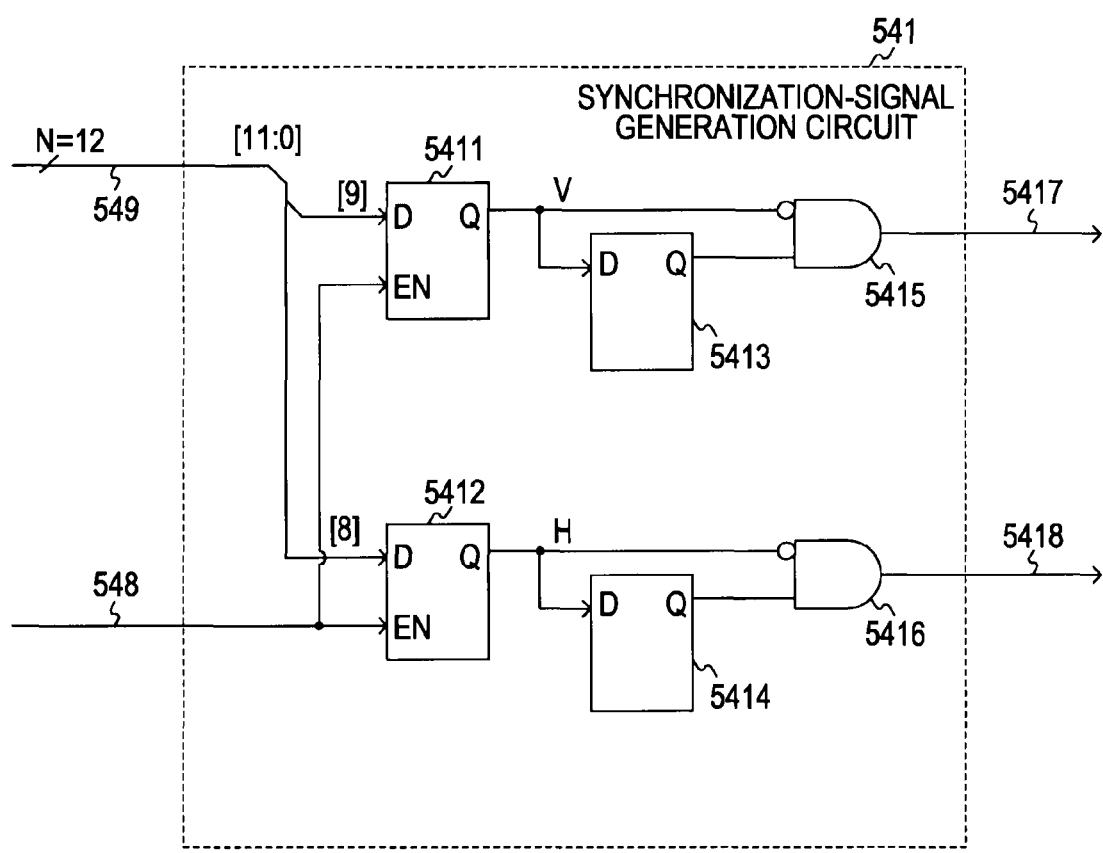
FIG. 35 is a diagram showing an exemplary structure of a synchronization-signal generation circuit 541 in the embodiment of the present invention.

FIG. 35 is a diagram showing an exemplary structure of the synchronization-signal generation circuit 541 in the embodiment of the present invention. This synchronization-signal generation circuit 541 includes D latches 5411 and 5412, D flip-flops 5413 and 5414, and logical multiplication (AND) circuits 5415 and 5416.

The D latch 5411 is a latch that holds and outputs the ninth bit of the N bits supplied from the selector 533, that is, a bit V indicating a timing in the vertical direction in accordance with the timing when output is performed from the logical-sum circuit 534 to the signal line 548. The D flip-flop 5413 is a flip-flop that holds the last output of the D latch 5411. The logical multiplication circuit 5415 is a circuit that detects that the output of the D latch 5411 is "0" and the output of the D flip-flop 5413 is "1". That is, the logical multiplication circuit 5415 detects an edge at which the bit V changes from "1" to "0" as a vertical synchronization timing.

The D latch 5412 is a latch that holds and outputs the eighth bit of the N bits supplied from the selector 533, that is, a bit H indicating a timing in the horizontal direction in accordance with the timing when output is performed from the logical-sum circuit 534 to the signal line 548. The D flip-flop 5414 is a flip-flop that holds the last output of the D latch 5412. The logical multiplication circuit 5416 is a circuit that detects that the output of the D latch 5412 is "0" and the output of the D flip-flop 5414 is "1". That is, the logical multiplication circuit 5416 detects an edge at which the bit H changes from "1" to "0" as a horizontal synchronization timing.

Figure 36:
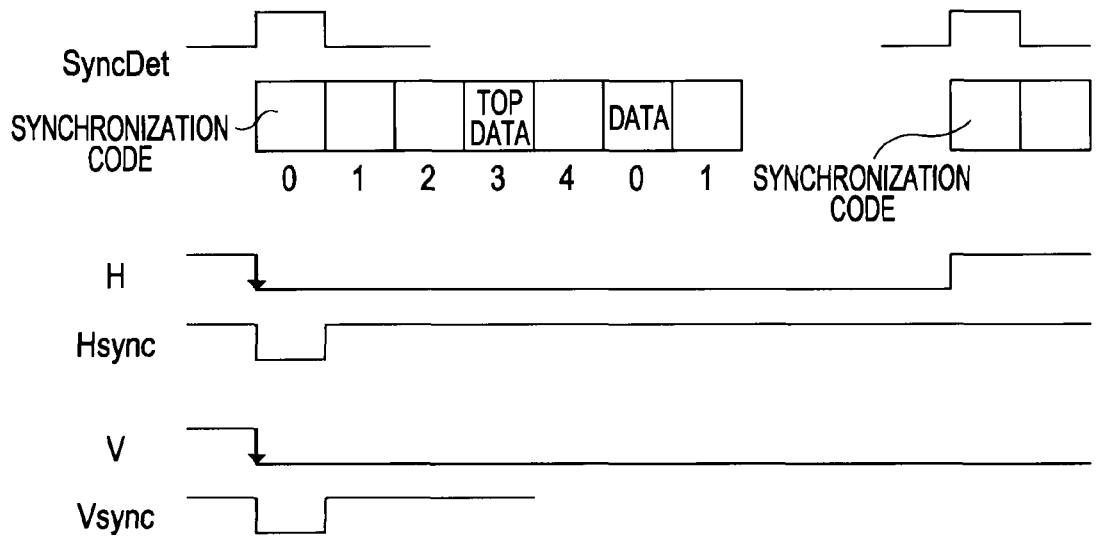
FIG. 36 is a diagram showing an example of the relationship between data windows and synchronization codes in the embodiment of the present invention.

FIG. 36 is a diagram showing an example of the relationship between data windows and synchronization codes in the embodiment of the present invention. In this example, it is assumed that the bit length n is 10 bits.

In a case in which the fourth synchronization code is detected, when it indicates the start of the valid video area, that is, when the bit V changes from "1" to "0", a vertical synchronization signal Vsync becomes active at the clock. Moreover, when the synchronization code indicates the start of the data on a horizontal line, that is, when the bit H changes from "1" to "0" (that is, SAV), a horizontal synchronization signal Hsync becomes active at the clock.

Thereafter, the B counter 536 outputs one of "0" through "4" in synchronization with a clock, and valid data is obtained at a timing when the value indicates "0" or "3". Then, next, in a case in which the fourth synchronization code is detected, when the synchronization code indicates the end of the data on the horizontal line, that is, the bit H changes from "0" to "1" (that is, EAV), a standby state for the start of the data (SAV) on the next horizontal line starts.

Figure 37:
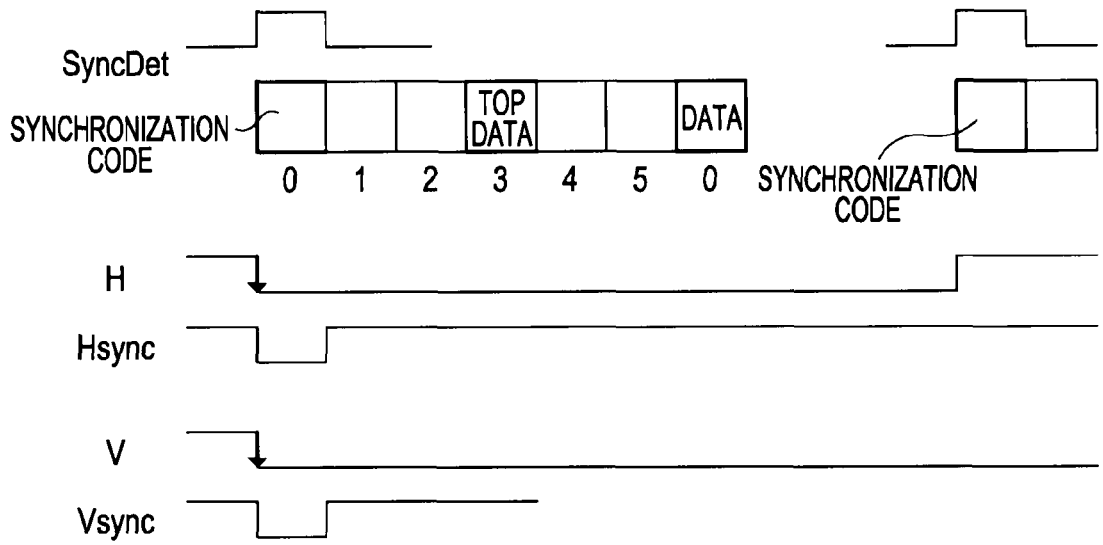
FIG. 37 is a diagram showing another example of the relationship between data windows and synchronization codes in the embodiment of the present invention.

FIG. 37 is a diagram showing another example of the relationship between data windows and synchronization codes in the embodiment of the present invention. In this example, it is assumed that the bit length n is 12 bits.

In a case in which the fourth synchronization code is detected, when it indicates the start of the valid video area, that is, when the bit V changes from "1" to "0", the vertical synchronization signal Vsync becomes active at the clock. Moreover, when the synchronization code indicates the start of the data on a horizontal line, that is, when the bit H changes from "1" to "0" (that is, SAV), the horizontal synchronization signal Hsync becomes active at the clock.

Thereafter, the A counter 535 outputs one of "0" through "5" in synchronization with a clock, and valid data is obtained at a timing when the value indicates "0" or "3". Then, next, in a case in which the fourth synchronization code is detected, when the synchronization code indicates the end of the data on the horizontal line, that is, the bit H changes from "0" to "1" (that is, EAV), a standby state for the start of the data (SAV) on the next horizontal line starts.

Figure 38:
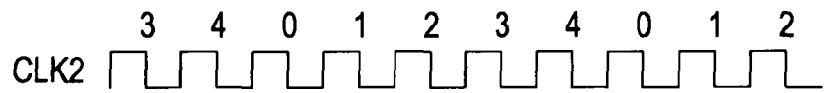
FIG. 38 includes diagrams showing an example of the relationship between outputs of the bit decoding unit 530 and the numbers of operation channels in the embodiment of the present invention.

FIG. 38 includes diagrams showing an example of the relationship between outputs of the bit decoding unit 530 and the numbers of operation channels in the embodiment of the present invention. In this example, it is assumed that the bit length n is 10 bits.

Part (a) of FIG. 38, Part (b) of FIG. 38, Part (c) of FIG. 38, and Part (d) of FIG. 38 show a case in which the number of operation channels W is four, a case in which the number of operation channels W is three, a case in which the number of operation channels W is two, and a case in which the number of operation channels W is one, respectively. In any of the cases, the manner in which the image pickup signal of a new pixel is output to the signal line 549 at the timing when the B counter 536 shows "0" or "3" is clear. Moreover, it is clear that the order of the pixels is maintained to be that of the original Bayer pattern arrangement.

Figure 39:
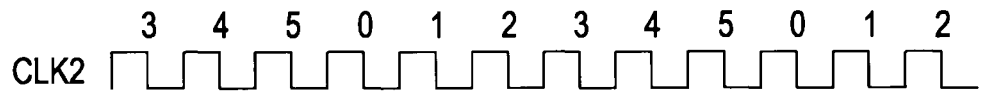
FIG. 39 includes diagrams showing another example of the relationship between outputs of the bit decoding unit 530 and the numbers of operation channels in the embodiment of the present invention.

FIG. 39 includes diagrams showing another example of the relationship between outputs of the bit decoding unit 530 and the numbers of operation channels in the embodiment of the present invention. In this example, it is assumed that the bit length n is 12 bits.

Part (a) of FIG. 39, Part (b) of FIG. 39, Part (c) of FIG. 39, and Part (d) of FIG. 39 show a case in which the number of operation channels W is four, a case in which the number of operation channels W is three, a case in which the number of operation channels W is two, and a case in which the number of operation channels W is one, respectively. In any of the cases, the manner in which the image pickup signal of a new pixel is output to the signal line 549 at the timing when the A counter 535 shows "0" or "3" is clear. Moreover, it is clear that the order of the pixels is maintained to be that of the original Bayer pattern arrangement.

Figure 40:
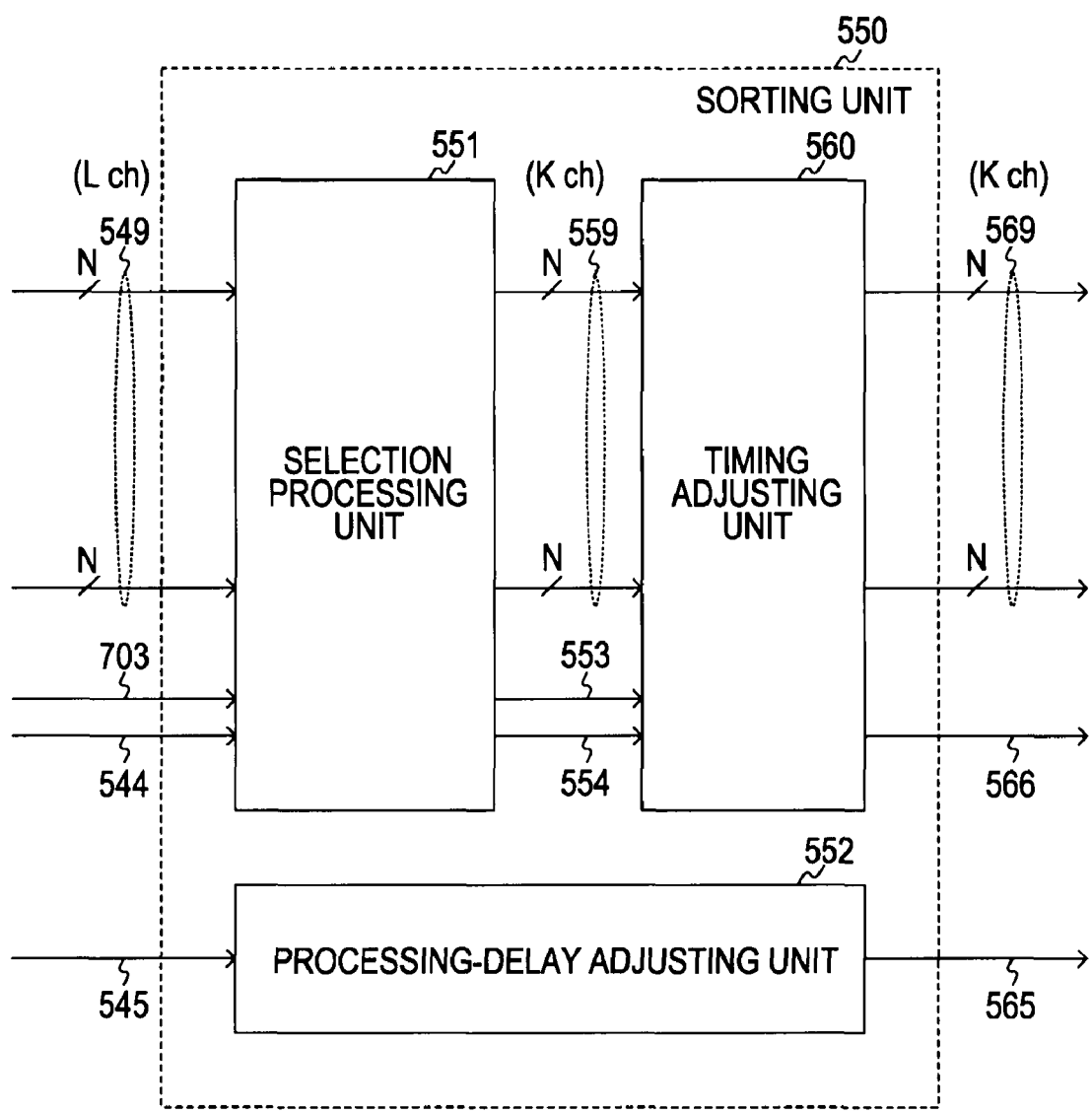
FIG. 40 is a diagram showing an exemplary structure of a sorting unit 550 in the embodiment of the present invention.

FIG. 40 is a diagram showing an exemplary structure of the sorting unit 550 in the embodiment of the present invention. This sorting unit 550 includes a selection processing unit 551, a timing adjusting unit 560, and a processing-delay adjusting unit 552.

The selection processing unit 551 is a unit that distributes the image pickup signals in a number equal to the number of operation channels W into K channels which are processing targets in the signal processing unit 320, the image pickup signals being supplied from the bit decoding unit 530 via the signal line 549 of L channels.

The timing adjusting unit 560 is a unit that adjusts the timing of the image pickup signals distributed into the K channels by the selection processing unit 551. Moreover, this timing adjusting unit 560 supplies a valid flag indicating the presence or absence of an image pickup signal on which the timing adjustment has been performed.

The processing-delay adjusting unit 552 is a unit that adjusts a delay time for the synchronization signal in the signal line 545 according to the delay occurring because of the processing performed in the selection processing unit 551 and timing adjusting unit 560, and outputs the synchronization signal to the signal line 565.

Figure 41:
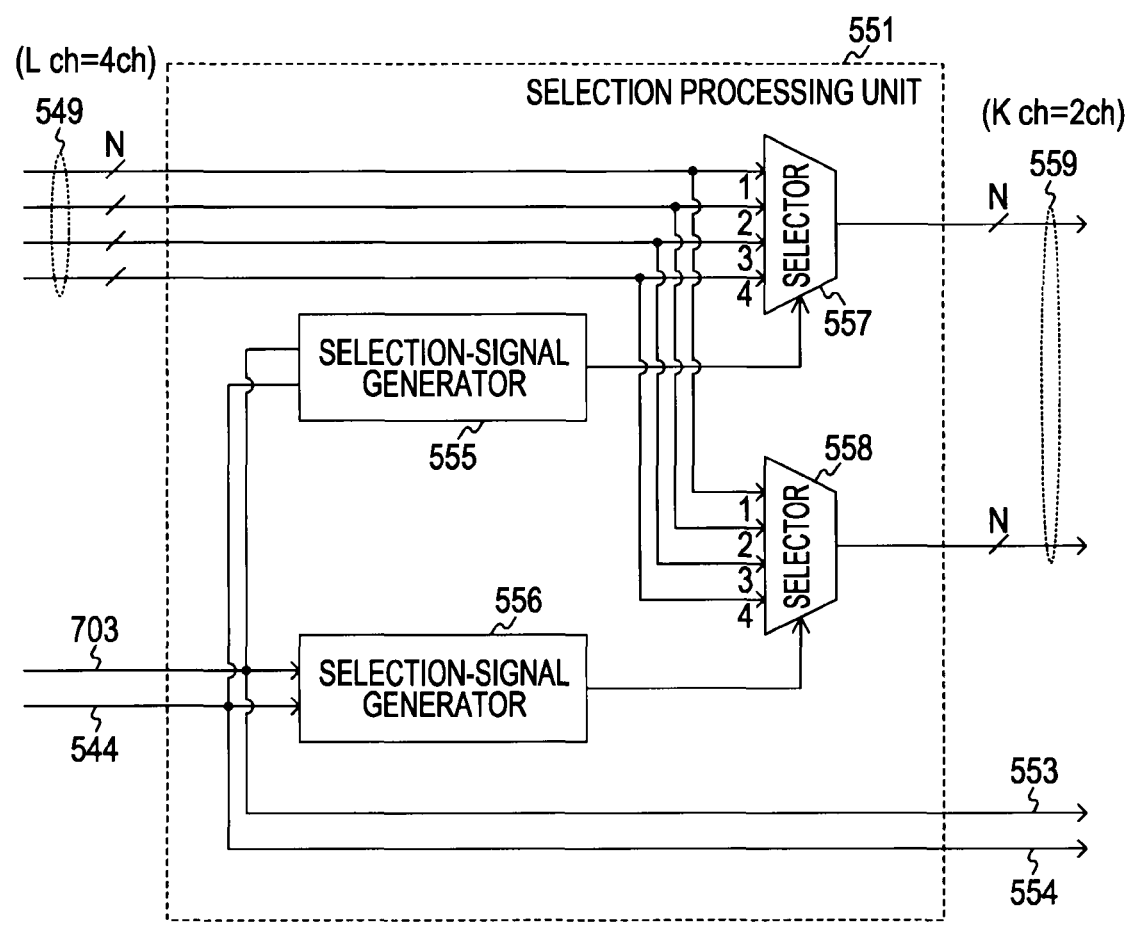
FIG. 41 is a diagram showing an exemplary structure of a selection processing unit 551 in the embodiment of the present invention.

FIG. 41 is a diagram showing an exemplary structure of the selection processing unit 551 in the embodiment of the present invention. Here, the number of channels L of the signal line 549 is four, and the number of channels K of a signal line 559 is two. This selection processing unit 551 includes selection-signal generators 555 and 556 and selectors 557 and 558.

The selectors 557 and 558 are selectors, each of which selects one of image pickup signals in a number equal to the number of operation channels W, the image pickup signals being supplied from the bit decoding unit 530 via the signal line 549 of L channels. In this example, since the number of channels K is two, the two selectors 557 and 558 in total are provided.

The selection-signal generators 555 and 556 are generators that supply selection signals to the selectors 557 and 558, respectively. To the selection processing unit 551, the signal line 703 which contains information regarding the number of operation channels W and the bit length n is supplied from the system control unit 700, and the signal line 544 which indicates the value held by the A counter 535 or B counter 536 is supplied from the bit decoding unit 530. Utilizing these, the selection-signal generators 555 and 556 generate selection signals.

Here, a value via the signal line 703 from the system control unit 700 and a value via the signal line 544 from the bit decoding unit 530 are supplied to the timing adjusting unit 560 via signal lines 553 and 554, respectively.

FIG. 42 includes diagrams showing an example of the occurrence of a selection signal generated by the selection-signal generator 555 in the embodiment of the present invention. Part (a) of FIG. 42 shows a case in which the bit length n is 10 bits, and Part (b) of FIG. 42 shows a case in which the bit length n is 12 bits. In this example, similarly to FIG. 41, the number of channels L of the signal line 549 is four, and the number of operation channels W is any value from one to four.

The selection signal differs according to the number of operation channels W, and the selection signal changes in accordance with a value held by the counter. The counter here is the B counter 536 in Part (a) of FIG. 42 and the A counter 535 in Part (b) of FIG. 42.

In the diagram, a number represents a channel number (1 through 4) of the signal line 549. For example, in a case in which the number of operation channels W is four in Part (a) of FIG. 42, the first channel of the signal line 549 is selected when the value held by the B counter 536 is "0", the third channel of the signal line 549 is selected when the value held by the B counter 536 is "1", the first channel of the signal line 549 is selected when the value held by the B counter 536 is "2", and the third channel of the signal line 549 is selected when the value held by the B counter 536 is "3". Moreover, "*"1 denotes an arbitrary value, and thus when the value held by the B counter 536 is "4", any of the channels of the signal line 549 is selected.

FIG. 43 includes diagrams showing an example of the occurrence of a selection signal generated by the selection-signal generator 556 in the embodiment of the present invention. Part (a) of FIG. 43 shows a case in which the bit length n is 10 bits, and Part (b) of FIG. 43 shows a case in which the bit length n is 12 bits. Also, in this example, similarly to FIG. 42, the number of channels L of the signal line 549 is four. The details of the selection signal are similar to FIG. 42.

Figure 44:
FIG. 44 includes diagrams showing an example of outputs of the selection processing unit 551 in the embodiment of the present invention.

FIG. 44 includes diagrams showing an example of outputs of the selection processing unit 551 in the embodiment of the present invention. In this example, it is assumed that the bit length n is 10 bits.

Part (a) of FIG. 44, Part (b) of FIG. 44, Part (c) of FIG. 44, and Part (d) of FIG. 44 show a case in which the number of operation channels W is four, a case in which the number of operation channels W is three, a case in which the number of operation channels W is two, and a case in which the number of operation channels W is one, respectively. Compared with the corresponding example of FIG. 38, the manner in which four channels for the output (the signal line 549) of the bit decoding unit 530 are changed to two channels is clear.

Figure 45:
FIG. 45 includes diagrams showing another example of outputs of the selection processing unit 551 in the embodiment of the present invention.

FIG. 45 includes diagrams showing another example of outputs of the selection processing unit 551 in the embodiment of the present invention. In this example, it is assumed that the bit length n is 12 bits.

Part (a) of FIG. 45, Part (b) of FIG. 45, Part (c) of FIG. 45, and Part (d) of FIG. 45 show a case in which the number of operation channels W is four, a case in which the number of operation channels W is three, a case in which the number of operation channels W is two, and a case in which the number of operation channels W is one, respectively. Compared with the corresponding example of FIG. 39, the manner in which four channels for the output of the bit decoding unit 530 are changed to two channels is clear.

Figure 46:
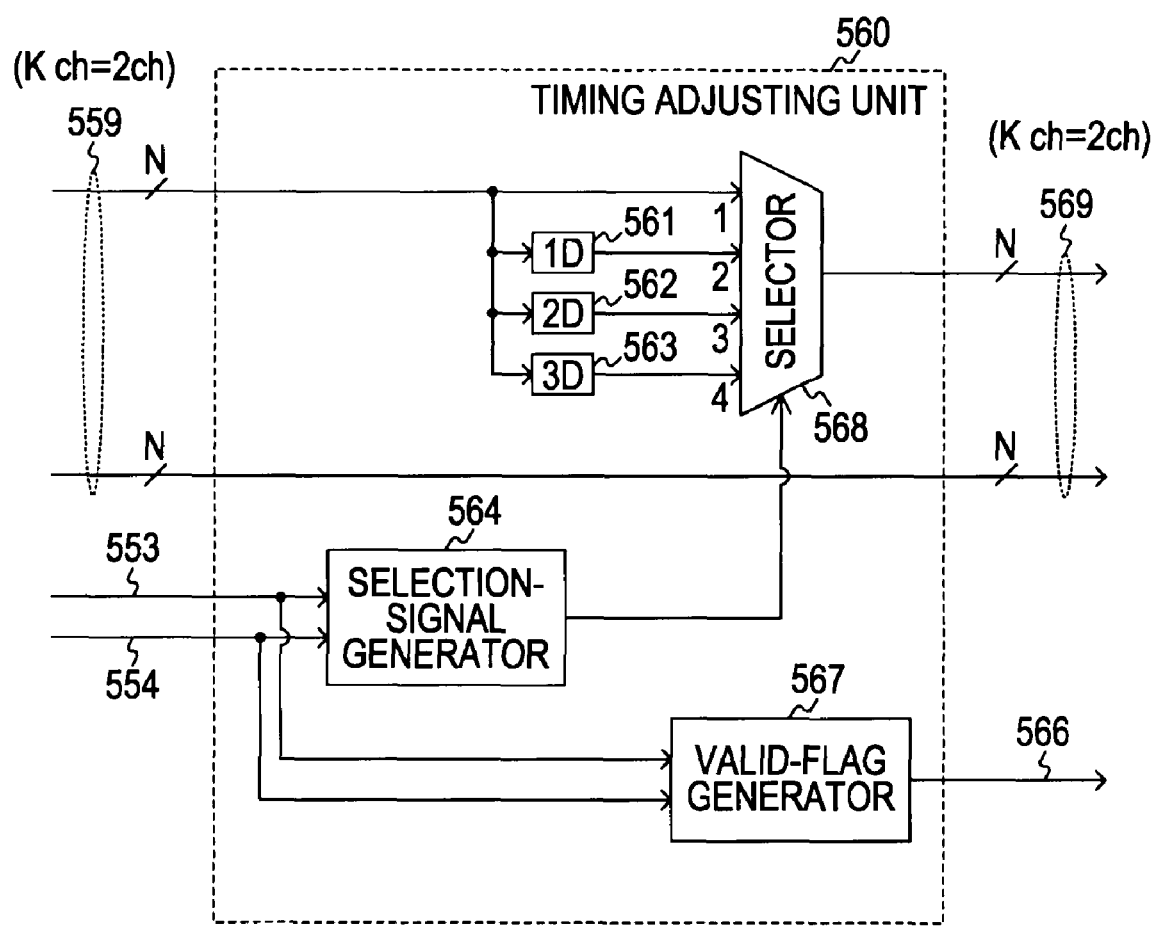
FIG. 46 is a diagram showing an exemplary structure of a timing adjusting unit 560 in the embodiment of the present invention.

FIG. 46 is a diagram showing an exemplary structure of the timing adjusting unit 560 in the embodiment of the present invention. Here, the number of channels K of the signal line 559 is two. This timing adjusting unit 560 includes delay circuits 561 through 563, a selection-signal generator 564, a valid-flag generator 567, and a selector 568.

The delay circuit 561 is a circuit that delays a value via the first channel of the signal line 559 by one clock. Similarly, the delay circuit 562 is a circuit that delays the value via the first channel of the signal line 559 by two clocks, and the delay circuit 563 is a circuit that delays the value via the first channel of the signal line 559 by three clocks.

The selector 568 is a selector that selects one signal from among a value via the first channel of the signal line 559 and the output of the delay circuits 561 through 563, and outputs the selected signal as the value via the first channel of the signal line 569. Here, a value via the second channel of the signal line 559 is simply output to the signal line 569.

The selection-signal generator 564 is a generator that supplies a selection signal to the selector 568. To the timing adjusting unit 560, the signal line 553 containing information regarding the number of operation channels W and the bit length n and the signal line 554 which indicates the value held by the A counter 535 or B counter 536 are supplied from the selection processing unit 551. Utilizing these, the selection-signal generator 564 generates a selection signal.

The valid-flag generator 567 is a generator that generates a valid flag indicating that a valid image pickup signal is output to the signal line 569 from information via the signal lines 553 and 554 supplied from the selection processing unit 551. The valid flag generated by this valid-flag generator 567 is supplied to the signal line 566.

FIG. 47 includes diagrams showing an example of the occurrence of a selection signal generated by the selection-signal generator 564 in the embodiment of the present invention. Part (a) of FIG. 47 shows a case in which the bit length n is 10 bits, and Part (b) of FIG. 47 shows a case in which the bit length n is 12 bits. In this example, the number of channels L of the signal line 549 is four, and the number of operation channels W is any value from one to four.

The selection signal differs according to the number of operation channels W, and the selection signal changes in accordance with the value held by the counter. The counter here is the B counter 536 in Part (a) of FIG. 47 and the A counter 535 in Part (b) of FIG. 47.

In the drawing, a number represents an input number (1 through 4) for the selector 568. For example, in a case in which the number of operation channels W is three in Part (a) of FIG. 47, the first input (a value via the first channel of the signal line 569) is selected when the value held by the B counter 536 is "0", and the second input (the output of the delay circuit 561) is selected when the value held by the B counter 536 is "2" or "3". Moreover, "*" denotes an arbitrary value, and thus when the value held by the B counter 536 is "1" or "4", any of the inputs is selected.

Figure 48:
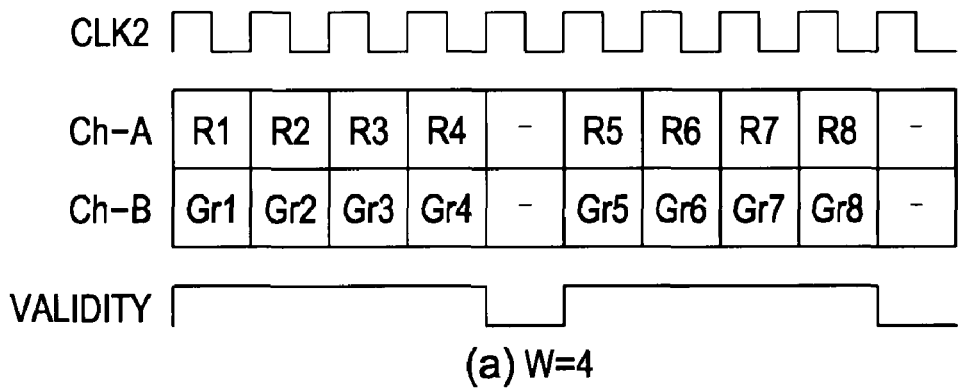
FIG. 48 includes diagrams showing an example of outputs of the timing adjusting unit 560 in the embodiment of the present invention.
Figure 48:
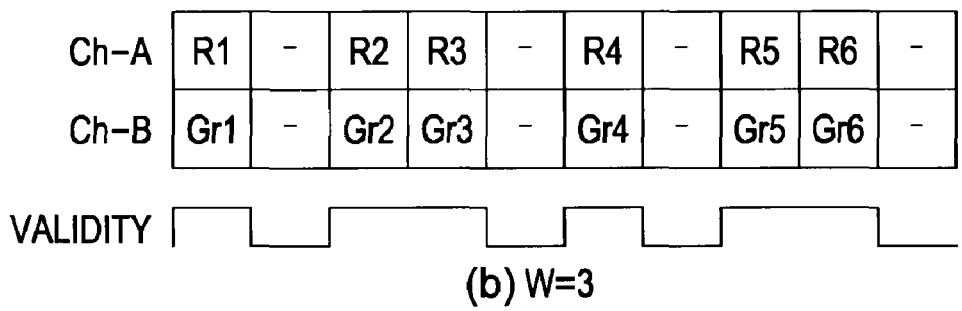
Figure 48:
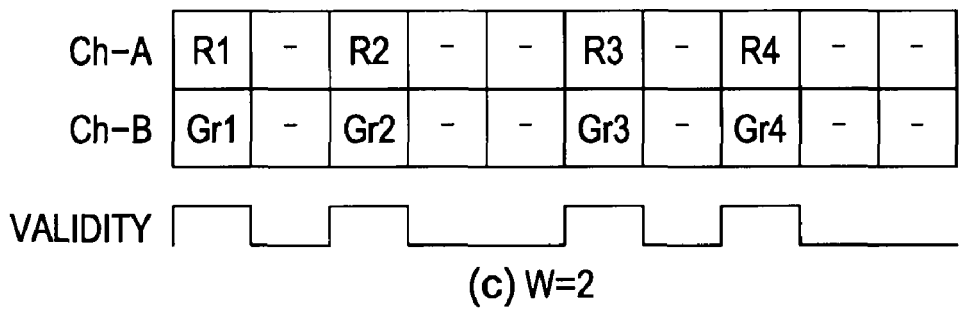
Figure 48:
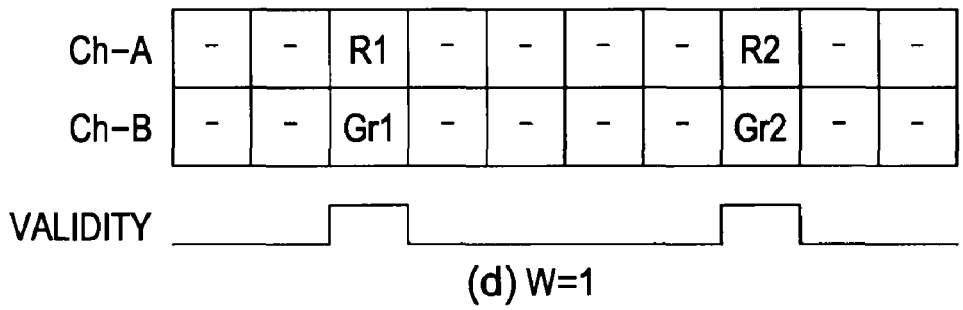

FIG. 48 includes diagrams showing an example of outputs of the timing adjusting unit 560 in the embodiment of the present invention. In this example, it is assumed that the bit length n is 10 bits.

Part (a) of FIG. 48, Part (b) of FIG. 48, Part (c) of FIG. 48, and Part (d) of FIG. 48 show a case in which the number of operation channels W is four, a case in which the number of operation channels W is three, a case in which the number of operation channels W is two, and a case in which the number of operation channels W is one, respectively. Compared with the corresponding example of FIG. 44, it is clear that the timing for a first channel is adjusted so as to match the timing for a second channel. Moreover, it is clear that a valid flag is output so as to match the timing at which a valid image pickup signal is output.

Figure 49:
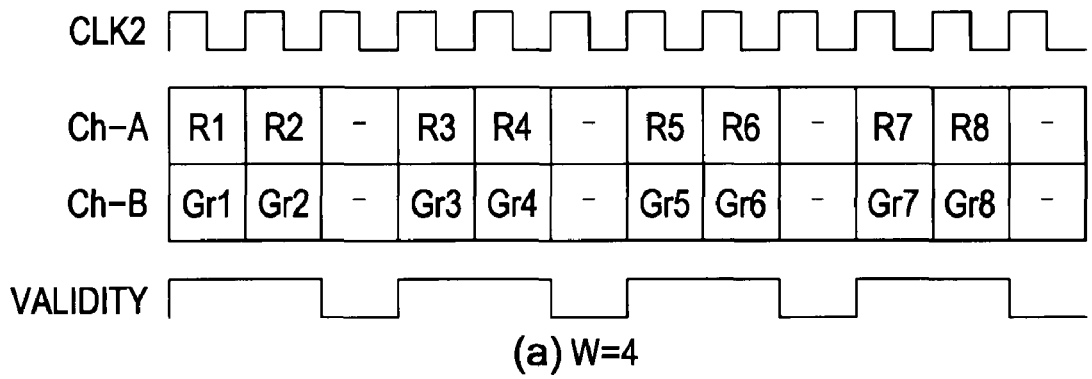
FIG. 49 includes diagrams showing another example of outputs of the timing adjusting unit 560 in the embodiment of the present invention.
Figure 49:
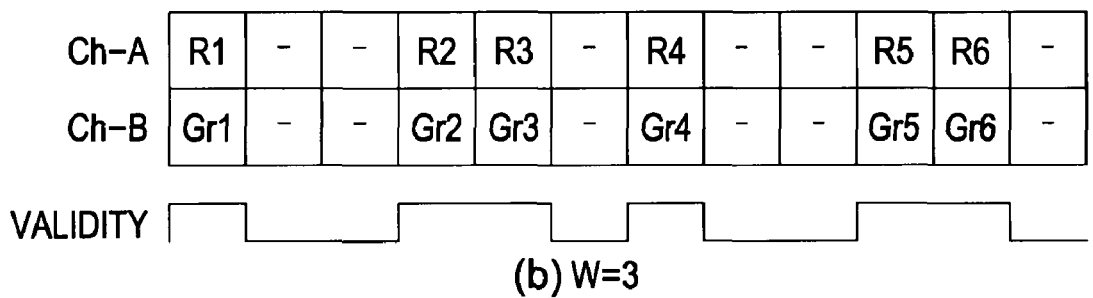
Figure 49:
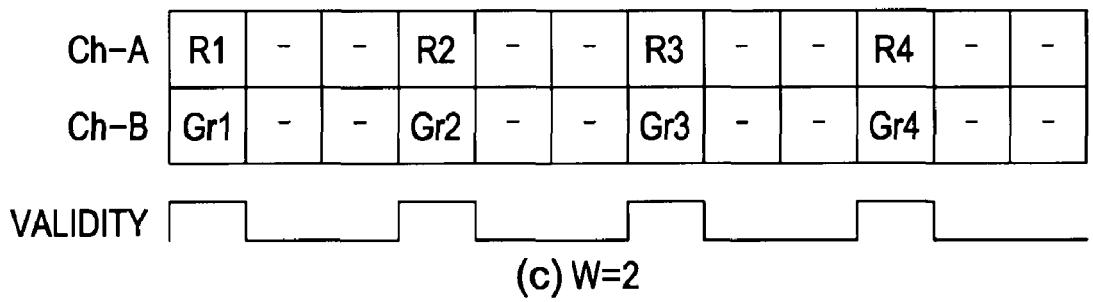
Figure 49:
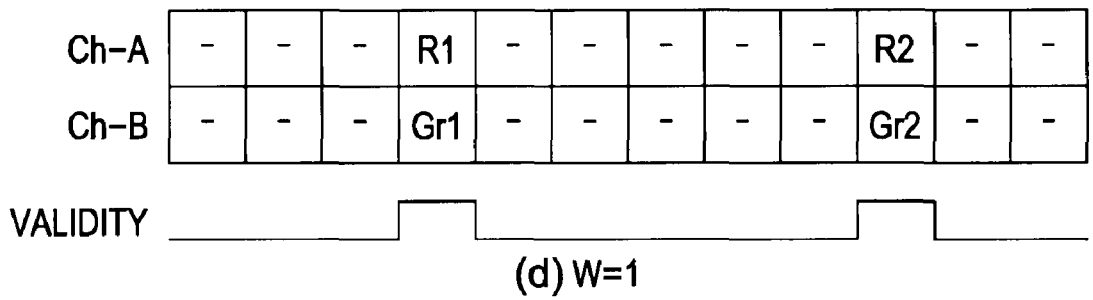

FIG. 49 includes diagrams showing another example of outputs of the timing adjusting unit 560 in the embodiment of the present invention. In this example, it is assumed that the bit length n is 12 bits.

Part (a) of FIG. 49, Part (b) of FIG. 49, Part (c) of FIG. 49, and Part (d) of FIG. 49 show a case in which the number of operation channels W is four, a case in which the number of operation channels W is three, a case in which the number of operation channels W is two, and a case in which the number of operation channels W is one, respectively.

Compared with the corresponding example of FIG. 45, it is clear that the timing for a first channel is adjusted so as to match the timing for a second channel. Moreover, it is clear that a valid flag is output so as to match the timing at which a valid image pickup signal is output.

Figure 50:
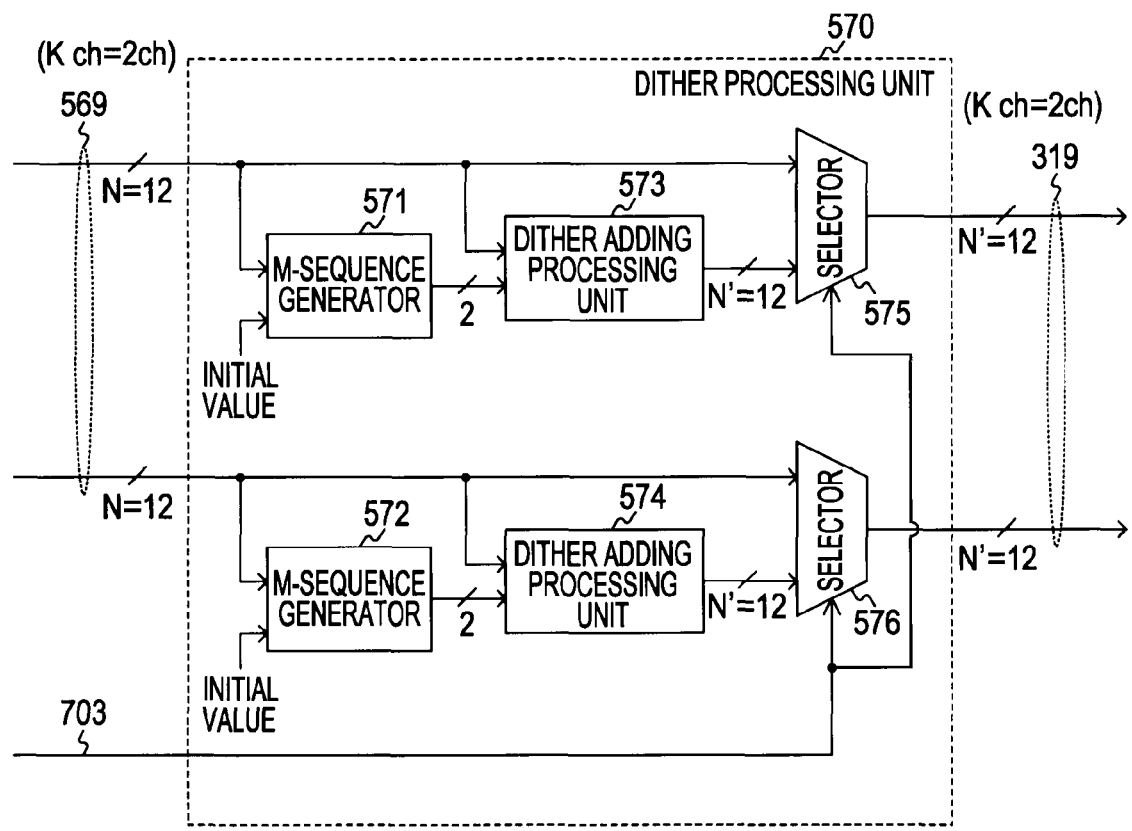
FIG. 50 is a diagram showing an exemplary structure of a dither processing unit 570 in the embodiment of the present invention.

FIG. 50 is a diagram showing an exemplary structure of the dither processing unit 570 in the embodiment of the present invention. Here, the number of channels K of the signal line 569 is two. This dither processing unit 570 includes M-sequence generators 571 and 572, dither adding processing units 573 and 574, and selectors 575 and 576.

The M-sequence generators 571 and 572 are generators that generate random numbers based on M-sequences. An M-sequence is a sequence obtained by the following linear recurrence equation. Here, a random number of two bits is output from each of the M-sequence generators 571 and 572. Note that, in the following equation, a+symbol denotes an exclusive-OR operation (XOR).

$$X_n = X_{n-p} + X_{n-q} (p > q)$$

Here, it is desirable that an initial value for the M-sequence generator 571 and that for the M-sequence generator 572 be set to values different from each other so that no match occurs between the sequences with respect to the channels.

The dither adding processing units 573 and 574 are units that add the random numbers generated by the M-sequence generators 571 and 572 to the image pickup signals supplied from the signal line 569. More specifically, the dither adding processing units 573 and 574 replace 2 bits on the LSB side of the 12 bits for the signal line 569 with the random numbers of two bits generated by the M-sequence generators 571 and 572, and output 12-bit image pickup signals obtained after the dither processing.

Here, in general, if bits on the LSB side are simply replaced, the average level increases (for example, 0.375 in the case of 2 bits), and thus it is desirable to make the average level be a value obtained by subtracting the amount equal to the increase from the average level. Moreover, as a result of this dither processing, the bit width N' (N' is a natural number) of a channel may be different from the bit width N of each of the channels of the signal line 569.

The selectors 575 and 576 are selectors that select image pickup signals in accordance with the bit length n contained in the signal line 703 supplied from the system control unit 700. More particularly, the selectors 575 and 576 select image pickup signals from the signal line 569 in a case in which the bit length n is 12 bits, and select image pickup signals from the dither adding processing unit 573 or 574 in a case in which the bit length n is 10 bits. The image pickup signals selected by the selector 575 and the selector 576 are output to the signal line 319.

Here, although a synchronization signal is supplied to the dither processing unit 570 from the sorting unit 550 via the signal line 565, the synchronization signal is delayed by a period corresponding to a processing delay occurring in the dither processing unit 570. This synchronization signal is supplied to the timing generation circuit 340 through the signal line 315.

Figure 51:
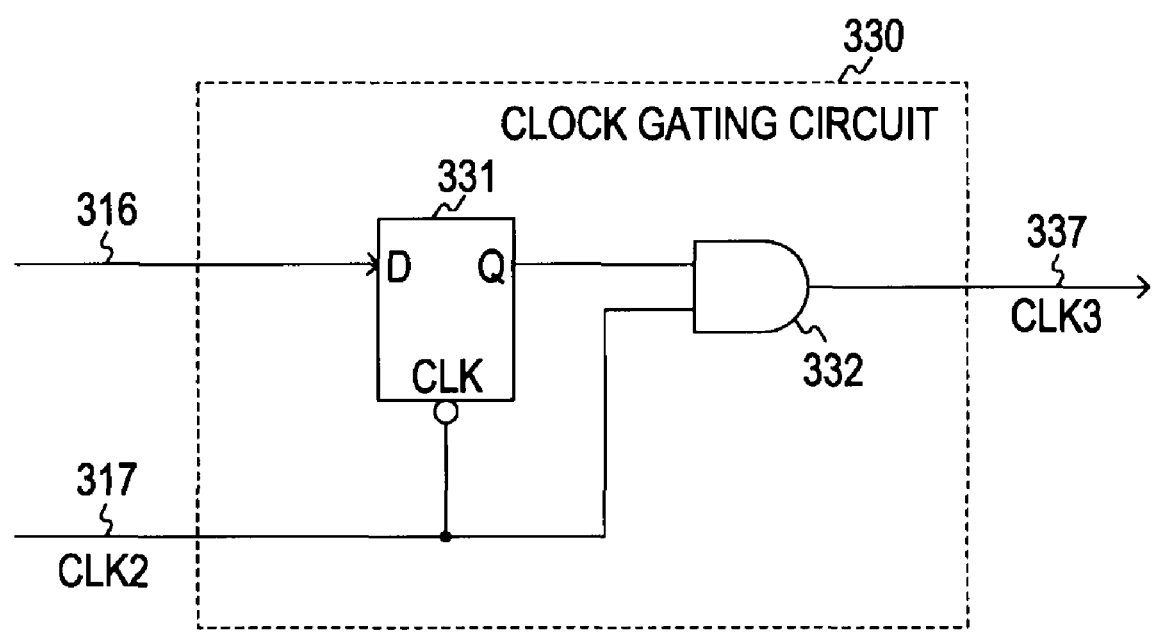
FIG. 51 is a diagram showing an exemplary structure of a clock gating circuit 330 in the embodiment of the present invention.

FIG. 51 is a diagram showing an exemplary structure of the clock gating circuit 330 in the embodiment of the present invention. This clock gating circuit 330 includes a D flip-flop 331 and a logical multiplication circuit 332. To this clock gating circuit 330, a valid flag is supplied from the data reconstruction unit 500 through the signal line 316, and the CLK2 is supplied from the PLL circuit 312 through the signal line 317.

The D flip-flop 331 is a circuit that holds and outputs the valid flag in accordance with the timing of the CLK2. Moreover, the logical multiplication circuit 332 is a circuit that generates a logical product of the output of the D flip-flop 331 and the CLK2. Because of this, the clock gating circuit 330 outputs the clock CLK3 only during a period in which the valid flag is active. This clock CLK3 is supplied to the signal processing unit 320 through the signal line 337.

That is, the frequency of the clock CLK3 is basically the same as that of the clock CLK2; however, since the clock CLK3 is controlled to be generated intermittently in accordance with the timing of outputting data, the power consumption in the signal processing unit 320 can be adaptively optimized.

Figure 52:
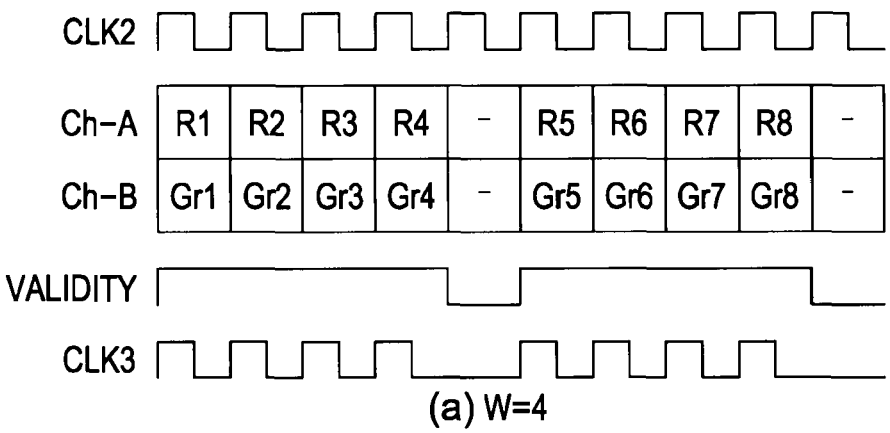
FIG. 52 includes diagrams showing an example of inputs to a signal processing unit 320 in the embodiment of the present invention.
Figure 52:
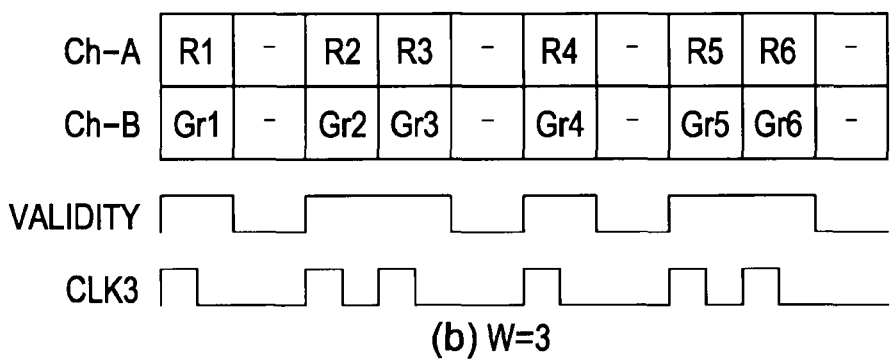
Figure 52:
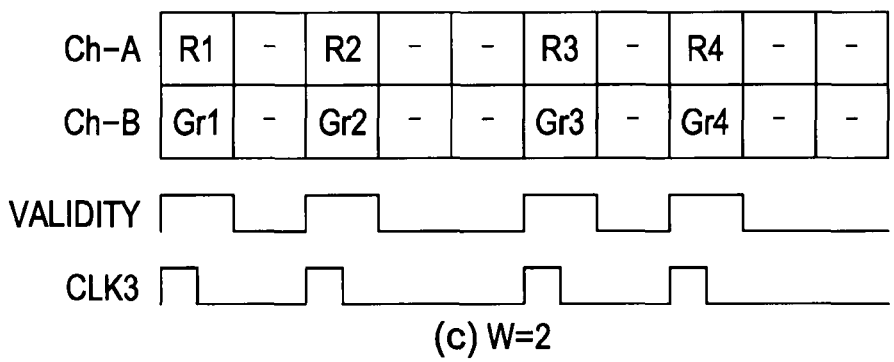
Figure 52:
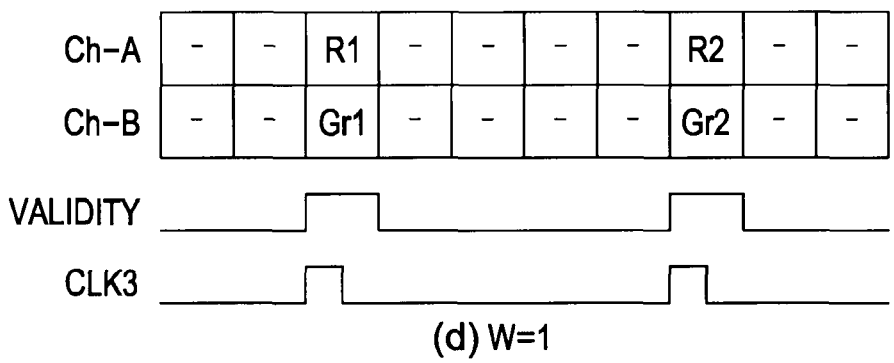

FIG. 52 includes diagrams showing an example of inputs to the signal processing unit 320 in the embodiment of the present invention. In this example, it is assumed that the bit length n is 10 bits.

Part (a) of FIG. 52, Part (b) of FIG. 52, Part (c) of FIG. 52, and Part (d) of FIG. 52 show a case in which the number of operation channels W is four, a case in which the number of operation channels W is three, a case in which the number of operation channels W is two, and a case in which the number of operation channels W is one, respectively. Although the timing of each image pickup signal is similar to the example of FIG. 48, the clock CLK3 which the clock gating circuit 330 outputs is also shown therein. That is, it is designed to supply the clock CLK3 only during a period in which the valid flag indicates validity.

Figure 53:
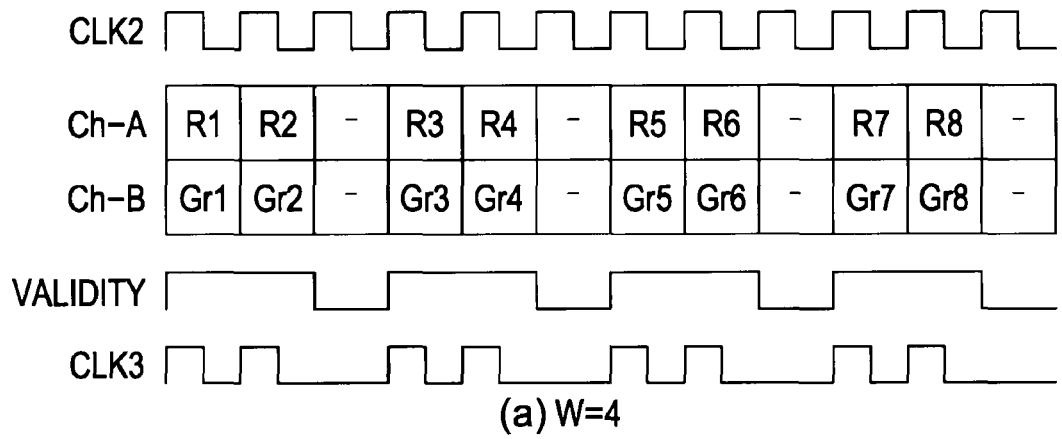
FIG. 53 includes diagrams showing another example of inputs to the signal processing unit 320 in the embodiment of the present invention.
Figure 53:
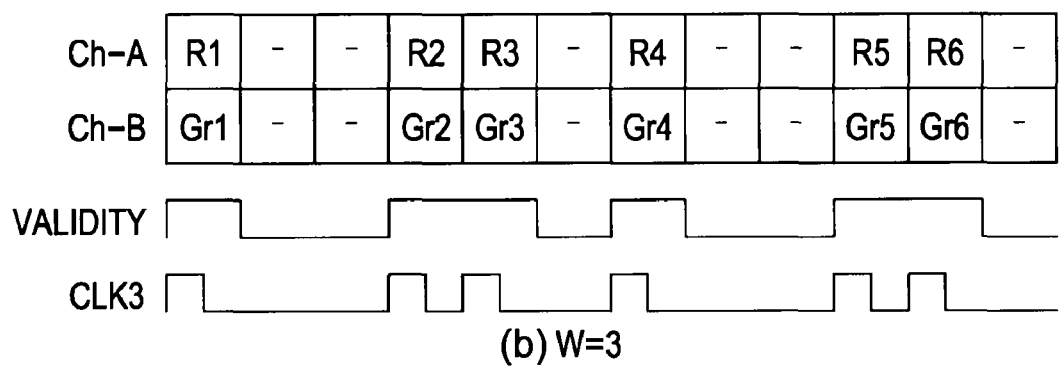
Figure 53:
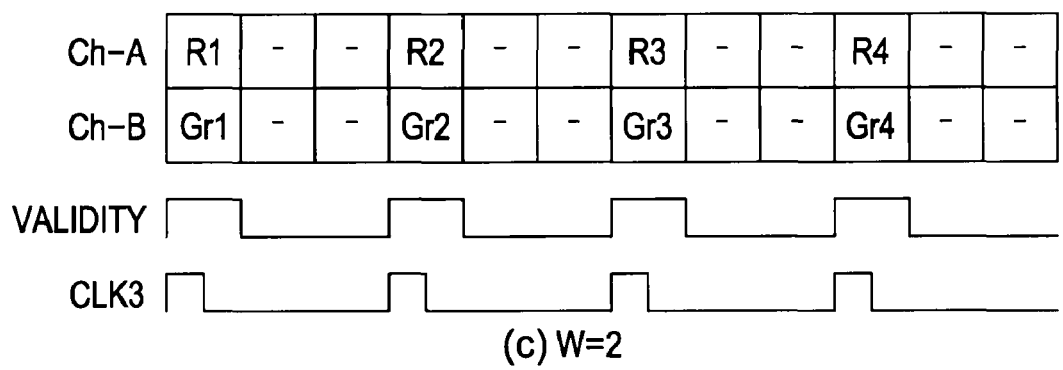
Figure 53:
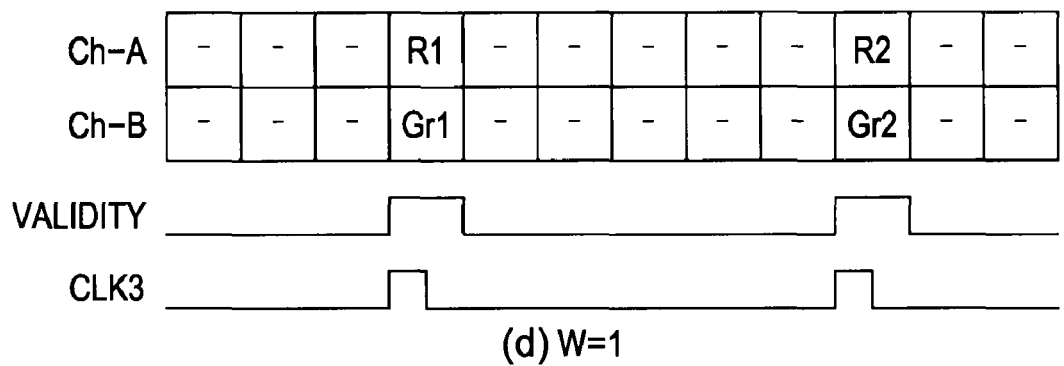

FIG. 53 includes diagrams showing another example of inputs to the signal processing unit 320 in the embodiment of the present invention. In this example, it is assumed that the bit length n is 12 bits.

Part (a) of FIG. 53, Part (b) of FIG. 53, Part (c) of FIG. 53, and Part (d) of FIG. 53 show a case in which the number of operation channels W is four, a case in which the number of operation channels W is three, a case in which the number of operation channels W is two, and a case in which the number of operation channels W is one, respectively. Although the timing of each image pickup signal is similar to the example of FIG. 49, similarly to FIG. 52, the clock CLK3 which the clock gating circuit 330 outputs is also shown therein.

In this way, according to the embodiment of the present invention, the number of operation channels W for the channels of the interface (the signal line 229) between the image pickup unit 200 and the image processing unit 300 can be changed in accordance with an operation mode. Because of this, power can be stopped being supplied to channels which are not operated, and thus power consumption can be reduced. Moreover, power can be stopped being supplied in units of channel, and thus channels which are operated can always be operated using the same clock. Moreover, the image pickup signal of each pixel can be arranged in the same channel, and thus even a case in which the bit length n dynamically changes according to an operation mode can easily be handled.

Moreover, according to the embodiment of the present invention, embedding of a synchronization code at the data sending unit 220 makes it possible to detect the synchronization code at the data receiving unit 311 after parallel conversion is once performed to obtain data in units of M bits, and the image pickup signal of bit length n can be extracted without being affected by a high-speed operation frequency of the interface.

Moreover, according to the embodiment of the present invention, unnecessary power consumption can be avoided by supplying the clock CLK3 to the signal processing unit 320 only during a period in which the valid flag indicates validity.

Here, the embodiment of the present invention is illustrated as an example that realizes the present invention. Although there is a correspondence between the features of the embodiment and the elements used to define the invention claimed in the claims, which will be described below, the present invention is not limited thereto, and various modifications can be made without departing from the spirit and scope of the present invention.

That is, in claim 1, image pickup means corresponds to, for example, the image pickup unit 200. Then, serial conversion means corresponds to, for example, the PS conversion unit 223. Then, synchronization-code generation means corresponds to, for example, the synchronization-code embedding unit 222. Then, transfer means corresponds to, for example, the interface units 225 and 310. Then, parallel conversion means corresponds to, for example, the SP conversion unit 3113. Then, reconstruction means corresponds to, for example, the data reconstruction unit 500. Then, control means corresponds to, for example, the image-pickup control unit 240.

Moreover, in claim 2, image pickup means corresponds to, for example, the image pickup unit 200. Then, image processing means corresponds to, for example, the image processing unit 300. Then, transfer means corresponds to, for example, the interface units 225 and 310. Then, control means corresponds to, for example, the image-pickup control unit 240. Then, serial conversion means corresponds to, for example, the PS conversion unit 223. Then, synchronization-code generation means corresponds to, for example, the synchronization-code embedding unit 222. Then, parallel conversion means corresponds to, for example, the SP conversion unit 3113. Then, reconstruction means corresponds to, for example, the data reconstruction unit 500.

Moreover, in claim 3, number-of-channel holding means corresponds to, for example, the number-of-channel table 241.

Moreover, in claim 6, data-window extraction means corresponds to, for example, the bit connection unit 510. Then, image-pickup-signal extraction means corresponds to, for example, the bit decoding unit 530.

Moreover, in claim 7, sorting means corresponds to, for example, the sorting unit 550.

Moreover, in claim 8, bit-length adjusting means corresponds to, for example, the dither processing unit 570.

Moreover, in claim 9, a counter corresponds to, for example, the A counter 535 or the B counter 536. Then, valid-flag generation means corresponds to, for example, the valid-flag generator 567. Then, clock control means corresponds to, for example, the clock gating circuit 330.

Moreover, in claim 10, an image pickup circuit corresponds to, for example, the image pickup unit 200. Then, an image processing circuit corresponds to, for example, the image processing unit 300. Then, a transfer circuit corresponds to, for example, the interface units 225 and 310. Then, a control circuit corresponds to, for example, the image-pickup control unit 240. Then, serial conversion means corresponds to, for example, the PS conversion unit 223. Then, synchronization-code generation means corresponds to, for example, the synchronization-code embedding unit 222.

Moreover, in claim 11, an image pickup circuit corresponds to, for example, the image pickup unit 200. Then, an image processing circuit corresponds to, for example, the image processing unit 300. Then, a transfer circuit corresponds to, for example, the interface units 225 and 310. Then, a control circuit corresponds to, for example, the image-pickup control unit 240. Then, parallel conversion means corresponds to, for example, the SP conversion unit 3113. Then, reconstruction means corresponds to, for example, the data reconstruction unit 500.

Here, the processing processes described in the embodiment of the present invention may be understood as a method having these series of processes, and also may be understood as a program for causing a computer to execute these series of processes or as a recording medium on which the program is recorded.

The invention claimed is:

1. An image pickup apparatus characterized by comprising:
    image pickup means for outputting image pickup signals generated by a plurality of image pickup elements which photoelectrically convert light from a subject;
    serial conversion means for converting each of the image pickup signals, each of which is generated from one of the plurality of image pickup elements, into a serial signal;
    synchronization-code generation means for generating a synchronization code regarding the image pickup signals before or after the conversion into the serial signal and for embedding the synchronization code into the serial signals;
    transfer means for transferring the serial signals using at least one operation channel from among a plurality of channels;
    parallel conversion means for performing parallel conversion on each of the transferred serial signals, thereby outputting parallel signals in a number equal to the number of operation channels;
    reconstruction means for detecting the embedded synchronization code in the parallel signals, thereby reconstructing the image pickup signals in accordance with the timing of the synchronization code and the number of operation channels; and
    control means for performing the setting of the number of operation channels in the transfer means in accordance with an operation mode.

2. An image pickup apparatus comprising image pickup means having a plurality of image pickup elements, each of which generates an image pickup signal of n bits (n is a natural number) by photoelectrically converting light from a subject, image processing means for performing predetermined signal processing on the image pickup signal, transfer means for transferring the image pickup signals using L channels (L is a natural number) at the maximum from the image pickup means to the image processing means, and control means for performing the setting of the number of channels W (w is a natural number) used for the transfer from among the L channels in the transfer means in accordance with an operation mode, the image pickup apparatus characterized in that:
    the image pickup means includes serial conversion means for converting each of W image pickup signals, each of which is generated from one of the plurality of image pickup elements, into a serial signal, and synchronization-code generation means for generating an n-bit synchronization code regarding the image pickup signals before or after the conversion into the serial signal and for embedding the n-bit synchronization code into the serial signals,
    the transfer means includes means for serially transferring, via the W channels, the serial signals which are converted from the image pickup signals, and
    the image processing means includes parallel conversion means for performing parallel conversion on each of the serial signals transferred via the W channels, thereby outputting W parallel signals of M bits (M is a natural number), and reconstruction means for detecting the synchronization code embedded in the parallel signals, thereby reconstructing the image pickup signals of n bits in accordance with the timing of the synchronization code.

3. The image pickup apparatus according to claim 2, characterized by further comprising:
    number-of-channel holding means for holding the operation mode in association with the number of channels corresponding to the operation mode,
    wherein the control means performs the setting of the number of channels corresponding to the operation mode held in the number-of-channel holding means as the number of channels W used for the transfer.

4. The image pickup apparatus according to claim 2, characterized in that:
    the transfer means performs the serial transfer using differential signals which are opposite to each other.

5. The image pickup apparatus according to claim 4, characterized in that:
    the transfer means performs the serial transfer according to an LVDS transmission scheme.

6. The image pickup apparatus according to claim 2, characterized in that:
    the reconstruction means includes
    data-window extraction means for detecting the synchronization code embedded in the parallel signals and for extracting W data windows of N bits (N is a natural number greater than or equal to n) in accordance with the timing of the synchronization code, and
    image-pickup-signal extracting means for extracting the W image pickup signals from the data windows in accordance with the bit length n of the image pickup signals.

7. The image pickup apparatus according to claim 6, characterized in that:
    the reconstruction means further includes sorting means for sorting the W image pickup signals in a format necessary for the signal processing.

8. The image pickup apparatus according to claim 6, characterized in that:
    the reconstruction means further includes bit-length adjusting means for adding a random number at a predetermined bit position of each of the W image pickup signals so as to obtain the bit length necessary for the signal processing.

9. The image pickup apparatus according to claim 6, characterized in that:
    the image processing means further includes
    a counter for counting clocks periodically in accordance with the timing of the synchronization code,
    valid-flag generation means for generating a valid flag indicating the presence or absence of the image pickup signals according to a count value held by the counter, and clock control means for controlling the occurrence of a clock for the signal processing according to the valid flag.

10. An image pickup circuit in an image pickup apparatus including an image pickup circuit having a plurality of image pickup elements, each of which generates an image pickup signal of n bits (n is a natural number) by photoelectrically converting light from a subject, an image processing circuit for performing predetermined signal processing on the image pickup signals, a transfer circuit for serially transferring the image pickup signals using L channels (L is a natural number) at the maximum from the image pickup circuit to the image processing circuit, and a control circuit for performing the setting of the number of channels W (W is a natural number) used for performing the transfer from among the L channels in the transfer circuit in accordance with an operation mode, the image pickup circuit characterized by comprising:

serial conversion means for converting each of W image pickup signals, each of which is generated from one of the plurality of image pickup elements, into a serial signal, and synchronization-code generation means for generating an n-bit synchronization code regarding the image pickup signals before or after the conversion into the serial signal and for embedding the n-bit synchronization code into the serial signals.

11. An image processing circuit in an image pickup apparatus including an image pickup circuit having a plurality of image pickup elements, each of which generates an image pickup signal of n bits (n is a natural number) by photoelectrically converting light from a subject, an image processing circuit for performing predetermined signal processing on the image pickup signals, a transfer circuit for serially transferring the image pickup signals using L channels (L is a natural number) at the maximum from the image pickup circuit to the image processing circuit, and a control circuit for performing the setting of the number of channels W (W is a natural number) used for performing the transfer from among the L channels in the transfer circuit in accordance with an operation mode, the image processing circuit characterized by comprising:

parallel conversion means for performing parallel conversion on each of serial signals transferred via the W channels, thereby outputting W parallel signals of M bits (M is a natural number); and reconstruction means for detecting the synchronization code embedded in the parallel signals and for reconstructing the image pickup signals of n bits in accordance with the timing of the synchronization code.

* * * * *